(12) United States Patent
Mark

(10) Patent No.: US 10,259,160 B2
(45) Date of Patent: Apr. 16, 2019

(54) WEAR RESISTANCE IN 3D PRINTING OF COMPOSITES

(71) Applicant: MARKFORGED, INC., Watertown, MA (US)

(72) Inventor: Gregory Thomas Mark, Brookline, MA (US)

(73) Assignee: MARKFORGED, INC., Watertown, MA (US)

(*) Notice: Subject to any disclaimer, the term of this patent is extended or adjusted under 35 U.S.C. 154(b) by 0 days.

(21) Appl. No.: 15/436,216

(22) Filed: Feb. 17, 2017

(65) Prior Publication Data

US 2017/0232674 A1 Aug. 17, 2017

Related U.S. Application Data

(63) Continuation-in-part of application No. 15/404,816, filed on Jan. 12, 2017, and a continuation-in-part of
(Continued)

(51) Int. Cl.
*B29C 67/00* (2017.01)
*B29C 31/08* (2006.01)
(Continued)

(52) U.S. Cl.
CPC .......... *B29C 64/165* (2017.08); *B29C 31/042* (2013.01); *B29C 31/08* (2013.01);
(Continued)

(58) Field of Classification Search
CPC .............. B29C 31/042; B29C 67/0085; B29C 67/0081; B29C 64/209; B29C 64/218;
(Continued)

(56) References Cited

U.S. PATENT DOCUMENTS 4,291,841 A * 9/1981 Dalrymple ............. B65H 67/04
242/474.5
4,720,251 A * 1/1988 Mallay .................... B29B 9/065
165/158
(Continued)

FOREIGN PATENT DOCUMENTS

CN 1659320 A 8/2005
CN 101133107 A 2/2008
(Continued)

OTHER PUBLICATIONS

Bales, Steven, "Know Your Mold Coatings", Plastics Technology, http://www.ptonlinecom/articles/know-your-mold-coatings, Dec. 1, 2004, 8 pages.*
(Continued)

*Primary Examiner* — Alison L Hindenlang
*Assistant Examiner* — Emmanuel S Luk
(74) *Attorney, Agent, or Firm* — Lando & Anastasi, LLP

(57) ABSTRACT

A three dimensional printer which prints at using at least one composite material having an inherently abrasive filler or fiber material has a Mohs hardness greater than substantially 1, or a Knoop/Vickers hardness greater than substantially 300 kg/mm$^2$, or a Rockwell C hardness at least C30, and where a nozzle tip may contact a top surface of a previously deposited line of material may have a nozzle body includes a material having a thermal conductivity at least 35 w/M-K to conduct heat to the nozzle, and a nozzle throat and/or nozzle tip each include a material having a Rockwell C hardness at least C40, to resist wear from sliding contact of the nozzle tip with the previously deposited lines of the material being printed or another previously deposited material, or from the material being printed as it is printed through the nozzle throat.

19 Claims, 45 Drawing Sheets

Related U.S. Application Data application No. 15/407,740, filed on Jan. 17, 2017, said application No. 15/404,816 is a continuation-in-part of application No. 15/174,645, filed on Jun. 6, 2016, now Pat. No. 9,815,268, said application No. 15/407,740 is a continuation-in-part of application No. 15/174,645, which is a continuation-in-part of application No. 14/944,088, filed on Nov. 17, 2015, now Pat. No. 9,688,028, and a continuation-in-part of application No. 14/944,093, filed on Nov. 17, 2015, and a continuation-in-part of application No. 14/876,073, filed on Oct. 6, 2015, now Pat. No. 10,016,942, said application No. 14/944,088 is a continuation-in-part of application No. 14/491,439, filed on Sep. 19, 2014, now Pat. No. 9,694,544, which is a continuation-in-part of application No. 14/222,318, filed on Mar. 21, 2014, now abandoned, and a continuation-in-part of application No. 14/297,437, filed on Jun. 5, 2014, now Pat. No. 9,370,896, and a continuation-in-part of application No. 14/333,881, filed on Jul. 17, 2014, now Pat. No. 9,149,988.

(60) Provisional application No. 62/296,559, filed on Feb. 17, 2016, provisional application No. 62/277,953, filed on Jan. 12, 2016, provisional application No. 62/279,657, filed on Jan. 15, 2016, provisional application No. 62/429,711, filed on Dec. 2, 2016, provisional application No. 62/172,021, filed on Jun. 5, 2015, provisional application No. 62/080,890, filed on Nov. 17, 2014, provisional application No. 61/880,129, filed on Sep. 19, 2013, provisional application No. 61/881,946, filed on Sep. 24, 2013, provisional application No. 61/883,440, filed on Sep. 27, 2013, provisional application No. 61/902,256, filed on Nov. 10, 2013, provisional application No. 61/907,431, filed on Nov. 22, 2013, provisional application No. 61/804,235, filed on Mar. 22, 2013, provisional application No. 61/815,531, filed on Apr. 24, 2014, provisional application No. 61/831,600, filed on Jun. 5, 2013, provisional application No. 61/847,113, filed on Jul. 17, 2013, provisional application No. 61/878,029, filed on Sep. 15, 2013.

(51) Int. Cl.
| | | |
|---|---|---|
| *B33Y 50/02* | (2015.01) | |
| *B33Y 10/00* | (2015.01) | |
| *B33Y 30/00* | (2015.01) | |
| *B29C 31/04* | (2006.01) | |
| *B33Y 70/00* | (2015.01) | |
| *B29C 64/165* | (2017.01) | |
| *B29C 64/20* | (2017.01) | |
| *B29C 64/209* | (2017.01) | |
| *B29C 64/118* | (2017.01) | |
| *B29K 105/12* | (2006.01) | |
| *B29K 307/04* | (2006.01) | |

(52) U.S. Cl.
CPC ............ *B29C 64/118* (2017.08); *B29C 64/20* (2017.08); *B29C 64/209* (2017.08); *B33Y 10/00* (2014.12); *B33Y 30/00* (2014.12); *B33Y 70/00* (2014.12); *B29K 2105/12* (2013.01); *B29K 2307/04* (2013.01)

(58) Field of Classification Search
CPC ... B29C 64/307; B29C 64/321; B29C 64/343; B29C 31/08
See application file for complete search history.

(56) References Cited

U.S. PATENT DOCUMENTS

| | | | |
|---|---|---|---|
| 5,002,712 A | 3/1991 | Goldmann et al. | |
| 5,037,691 A | 8/1991 | Medney et al. | |
| 5,155,324 A | 10/1992 | Deckard et al. | |
| 5,340,433 A | 8/1994 | Crump | |
| 5,866,058 A | 2/1999 | Batchelder et al. | |
| 5,885,316 A * | 3/1999 | Sato ......................... C03B 7/00 | |
| | | | 425/549 |
| 5,906,863 A | 5/1999 | Lombardi et al. | |
| 5,936,861 A | 8/1999 | Jang et al. | |
| 5,955,119 A * | 9/1999 | Andris ..................... B29C 47/14 | |
| | | | 264/241 |
| 6,129,872 A * | 10/2000 | Jang ........................ B29C 41/36 | |
| | | | 264/245 |
| 6,153,034 A | 11/2000 | Lipsker | |
| 6,214,279 B1 | 4/2001 | Yang et al. | |
| 6,363,606 B1 | 4/2002 | Johnson, Jr. et al. | |
| 6,859,681 B1 | 2/2005 | Alexander | |
| 6,934,600 B2 | 8/2005 | Jang et al. | |
| 7,127,309 B2 | 10/2006 | Dunn et al. | |
| 7,625,200 B2 | 12/2009 | Leavitt | |
| 8,050,786 B2 | 11/2011 | Holzwarth | |
| 8,066,842 B2 | 11/2011 | Farmer et al. | |
| 8,221,669 B2 | 7/2012 | Batchelder et al. | |
| 8,815,141 B2 * | 8/2014 | Swanson ............ B29C 67/0055 | |
| | | | 264/308 |
| 8,916,085 B2 | 12/2014 | Jackson et al. | |
| 9,207,540 B1 | 12/2015 | Bhargava et al. | |
| 9,370,896 B2 | 6/2016 | Mark | |
| 9,427,399 B2 | 8/2016 | Adams et al. | |
| 9,511,544 B2 | 12/2016 | Hemingway et al. | |
| 2002/0009935 A1 | 1/2002 | Hsiao et al. | |
| 2002/0062909 A1 | 5/2002 | Jang et al. | |
| 2002/0079607 A1 | 6/2002 | Hawley et al. | |
| 2002/0102322 A1 * | 8/2002 | Gunther ............... B29C 45/2737 | |
| | | | 425/549 |
| 2002/0113331 A1 | 8/2002 | Zhang et al. | |
| 2002/0165304 A1 | 11/2002 | Mulligan et al. | |
| 2003/0044593 A1 | 3/2003 | Vaidyanathan et al. | |
| 2003/0056870 A1 | 3/2003 | Comb et al. | |
| 2003/0090034 A1 | 5/2003 | Mulhaupt et al. | |
| 2003/0186042 A1 | 10/2003 | Dunlap et al. | |
| 2003/0236588 A1 | 12/2003 | Jang et al. | |
| 2004/0166140 A1 | 8/2004 | Santini et al. | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2005/0279185 A1 * | 12/2005 | Cook .................... C22C 32/0073 | |
| | | | 75/244 |
| 2007/0003650 A1 | 1/2007 | Schroeder | |
| 2007/0151167 A1 * | 7/2007 | Cook .................... C04B 35/5805 | |
| | | | 51/307 |
| 2007/0225856 A1 | 9/2007 | Slaughter et al. | |
| 2007/0228592 A1 | 10/2007 | Dunn et al. | |
| 2007/0252871 A1 | 11/2007 | Silverbrook | |
| 2008/0176092 A1 | 7/2008 | Owens | |
| 2008/0206394 A1 * | 8/2008 | Bouti ..................... B29C 45/278 | |
| | | | 425/549 |
| 2008/0274229 A1 * | 11/2008 | Barnett ................... B29C 45/27 | |
| | | | 425/568 |
| 2009/0054552 A1 | 2/2009 | Yano et al. | |
| 2009/0065965 A1 | 3/2009 | Bowen | |
| 2009/0095410 A1 | 4/2009 | Oldani | |
| 2009/0174709 A1 | 7/2009 | Kozlak et al. | |
| 2009/0220632 A1 * | 9/2009 | Haque ................... B29C 45/278 | |
| | | | 425/191 |
| 2010/0024987 A1 * | 2/2010 | Saine ..................... B05C 5/0241 | |
| | | | 156/439 |
| 2010/0028641 A1 * | 2/2010 | Zhu ....................... C23C 14/0605 | |
| | | | 428/220 |
| 2010/0151072 A1 * | 6/2010 | Scheurich ................ B23P 9/00 | |
| | | | 425/461 |
| 2010/0191360 A1 | 7/2010 | Napadensky et al. | |
| 2010/0203351 A1 | 8/2010 | Nayfeh | |

(56) References Cited

U.S. PATENT DOCUMENTS

| | | | |
|---|---|---|---|
| 2010/0243764 A1* | 9/2010 | Okesaku | B28B 3/2645 239/589 |
| 2011/0032301 A1 | 2/2011 | Fienup et al. | |
| 2011/0143108 A1 | 6/2011 | Fruth et al. | |
| 2011/0178621 A1 | 7/2011 | Heide | |
| 2011/0222081 A1 | 9/2011 | Yi et al. | |
| 2011/0230111 A1 | 9/2011 | Weir et al. | |
| 2011/0289791 A1 | 12/2011 | Menchik et al. | |
| 2012/0060468 A1 | 3/2012 | Dushku et al. | |
| 2012/0231225 A1 | 9/2012 | Mikulak et al. | |
| 2012/0247655 A1 | 10/2012 | Erb et al. | |
| 2013/0004610 A1 | 1/2013 | Hartmann et al. | |
| 2013/0164498 A1 | 6/2013 | Langone et al. | |
| 2013/0205920 A1 | 8/2013 | Tow | |
| 2013/0209600 A1 | 8/2013 | Tow | |
| 2013/0233471 A1 | 9/2013 | Kappesser et al. | |
| 2013/0241102 A1* | 9/2013 | Rodgers | B29C 47/0014 264/132 |
| 2013/0327917 A1 | 12/2013 | Steiner et al. | |
| 2013/0337256 A1 | 12/2013 | Farmer et al. | |
| 2013/0337265 A1 | 12/2013 | Farmer | |
| 2014/0039663 A1 | 2/2014 | Boyer et al. | |
| 2014/0044822 A1* | 2/2014 | Mulliken | B29C 67/0088 425/113 |
| 2014/0061974 A1 | 3/2014 | Tyler | |
| 2014/0120197 A1 | 5/2014 | Swanson et al. | |
| 2014/0121813 A1 | 5/2014 | Schmehl | |
| 2014/0159284 A1 | 6/2014 | Leavitt | |
| 2014/0175706 A1 | 6/2014 | Kritchman | |
| 2014/0232035 A1 | 8/2014 | Bheda | |
| 2014/0268604 A1 | 9/2014 | Wicker et al. | |
| 2014/0277661 A1 | 9/2014 | Amadio et al. | |
| 2014/0287139 A1 | 9/2014 | Farmer et al. | |
| 2014/0291886 A1 | 10/2014 | Mark et al. | |
| 2014/0322383 A1 | 10/2014 | Rutter | |
| 2014/0328963 A1 | 11/2014 | Mark et al. | |
| 2014/0328964 A1 | 11/2014 | Mark et al. | |
| 2014/0361460 A1 | 12/2014 | Mark | |
| 2015/0014885 A1 | 1/2015 | Hofmann et al. | |
| 2015/0037446 A1 | 2/2015 | Douglass et al. | |
| 2015/0165666 A1 | 6/2015 | Butcher et al. | |
| 2015/0165690 A1 | 6/2015 | Tow | |
| 2015/0239178 A1 | 8/2015 | Armstrong | |
| 2015/0242737 A1 | 8/2015 | Glazberg et al. | |
| 2015/0266243 A1 | 9/2015 | Mark et al. | |
| 2015/0266244 A1 | 9/2015 | Page | |
| 2015/0287247 A1 | 10/2015 | Willis et al. | |
| 2015/0321427 A1 | 11/2015 | Gunnarsson et al. | |
| 2015/0342720 A1 | 12/2015 | Koc et al. | |
| 2016/0067927 A1 | 3/2016 | Voris et al. | |
| 2016/0068678 A1 | 3/2016 | Luo et al. | |
| 2016/0075089 A1 | 3/2016 | Duro Royo et al. | |
| 2016/0192741 A1 | 7/2016 | Mark | |
| 2016/0221259 A1 | 8/2016 | Kobida et al. | |
| 2016/0263832 A1 | 9/2016 | Bui et al. | |
| 2016/0346997 A1 | 12/2016 | Lewis et al. | |
| 2017/0021564 A1 | 1/2017 | Ooba et al. | |
| 2017/0057164 A1 | 3/2017 | Hemphill et al. | |
| 2017/0106594 A1 | 4/2017 | Gardiner | |
| 2017/0136707 A1* | 5/2017 | Batchelder | B29C 67/0088 |

FOREIGN PATENT DOCUMENTS

| | | |
|---|---|---|
| CN | 101193953 A | 6/2008 |
| CN | 101300299 A | 11/2008 |
| CN | 101484397 A | 7/2009 |
| CN | 101689229 A | 3/2010 |
| CN | 101801647 A | 8/2010 |
| CN | 102548737 A | 7/2012 |
| CN | 104149339 A | 11/2014 |
| DE | 4102257 A1 | 7/1992 |
| JP | S58-122116 A | 7/1983 |
| JP | 1-266231 A | 10/1989 |
| JP | H7-117141 A | 5/1995 |
| JP | 2003-534159 A | 11/2003 |
| JP | 2004-331706 A | 11/2004 |
| JP | 2010535117 A | 11/2010 |
| JP | 2012-97449 A | 5/2012 |
| KR | 20100004475 A | 1/2010 |
| KR | 100995983 B1 | 11/2010 |
| KR | 101172859 B1 | 8/2012 |
| WO | 0189714 A1 | 11/2001 |
| WO | 2009009137 A1 | 1/2009 |
| WO | 2013017284 A2 | 2/2013 |
| WO | 2015042422 A1 | 3/2015 |

OTHER PUBLICATIONS

"Thermal Conductivity of Metals", The Engineering Toolbox, http://www.engineeringtoolbox.com/thermal-conductivity-metals-d_858.html, Sep. 15, 2017, 6 pages.*
Liu et al, "Wear of Materials", 2003, p. 1345.*
ATI technical data sheet, ATI metals, Allegheny Technologies Incorporated, https://www.atimetals.com/Products/Documents/datasheets/stainless-specialty-steel/martensitic/ati_410_420_425_mod_440a_440c_tds_en2_v2.pdf (Year: 2014).*
Ahn et al., Anisoptropic material properties of fused deposition modeling ABS, Rapid Prorotyping vol. 8, No. 4, 2002, pp. 248-257.
August et al., Recent Developments in Automated Fiber Placement of Thermoplastic Composites, SAMPE Technical Conference Proceedings, Wichita, KS, Oct. 23, 2013.
Brett Compton, "3D printing of composites with controlled architecture," Engineering Conferences International, ECI Digital Archives, Composites at Lake Louise (CALL 2015), Fall Nov. 9, 2015, pp. 30.
Brett G. Compton and Jennifer A. Lewis, "3D-Printing of Lighweight Cellular Compsites," Advanced Materials 2014, 26, pp. 5930-5935.
Dell'Anno et al., Automated Manufacture of 3D Reinforced Aerospace Composite Structures, International Journal of Structural Integrity, 2012, vol. 3, Iss 1, pp. 22-40.
Devleig et al., High-Speed Fiber Placement on Large Complex Structures, No. 2007-01-3843. SAE International 2007.
Geek magazine—hacker daily blog "To Skolkovo created the Russia's first composite 3D-printer", Feb. 24, 2015, Retreived from the internet: <http://geek-mag.com/posts/246332/>.
Hasenjaeger, Programming and Simulating Automated Fiber Placement (AFP) CNC Machines, SAMPE Journal, vol. 49, No. 6, Nov./Dec. 2013.
Hossain et al, Improving Tensile Mechanical Properties of FDM-Manufactured Specimens via Modifying Build Parameters, Proceedings of Solid Freeform Fabrication Symposium, Austin, Texas, Aug. 16, 2013.
Lamontia et al, "Contoured Tape Laying and Fiber Placement Heads for Automated Fiber Placement of Large Composite Aerospace Structures," 34th ISTC, Baltimore, MD, Nov. 4-7, 2002.
Mondo et al., Overview of Thermoplastic Composite ATL and AFP Technologies, ITHEC 2012, Oct. 30, 2012, Messe Bremen, Germany.
Rower, Robot Driven Automatic Tapehead for Complex Composite Lay-ups, No. 10AMAF-0066, SAE International 2010, Aerospace Manufacturing and Automated Fastening Conference & Exhibition, Sep. 28, 2010.
Slocum, Alexander: "Kinematic Couplings: A Review of Design Principles and Applications", International Journal of Machine Tools and Manufacture 50.4 (2010): 310-327.
This 3D printer could allow ISS components to be created in space—YouTube. Published on May 20, 2016. Retreived from the internet: <URL:<https://www.youtube.com/watch?v=YwrTfOjEFtw>.
Zieman et al., Anisotropic Mechanical Properties of ABS Parts Fabricated by Fused Deposition Modelling, INTECH Open Access Publisher, 2012.
Compton, B. G. et al., "3D-Printing of Lightweight Cellular Composites," Advanced Materials 2014, vol. 26, pp. 5930-5935.
"Sandwich-structured Composite", wikipedia.com, Dec. 29, 2009 version, accessed Apr. 18, 2018 at https://en.wikipedia.org/w/index.php?title=Sandwich-structured_composite&oldid=334666649(Year: 2009).

(56) References Cited

OTHER PUBLICATIONS

Donghong, Ding et al: "A tool-path generation strategy for wire and arc additive manufacturing," The International Journal of Advanced Manufacturing Technology, vol. 73, No. 1-4, Apr. 11, 2014 (Apr. 11, 2014), pp. 173-183, XP055472255, London, ISSN: 0268-3768, DOI: 10.1007/s00170-014-5808-5.
Gray IV, R.W., Baird, D.G. and Bøhn, J.H., 1998. Thermoplastic composites reinforced with long fiber thermotropic liquid crystalline polymers for fused deposition modeling. Polymer composites, 19(4), pp. 383-394. (Year: 1998).

\* cited by examiner

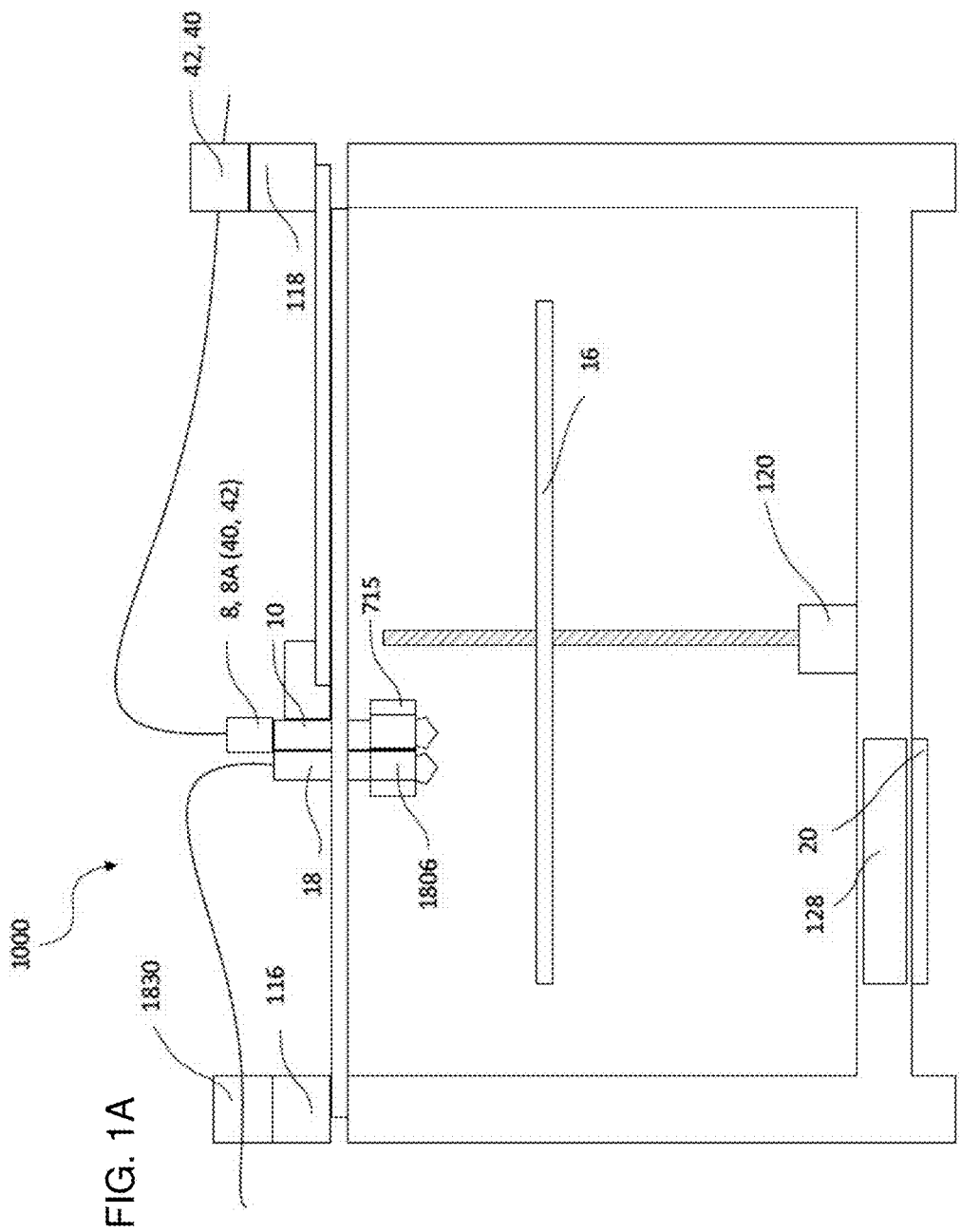

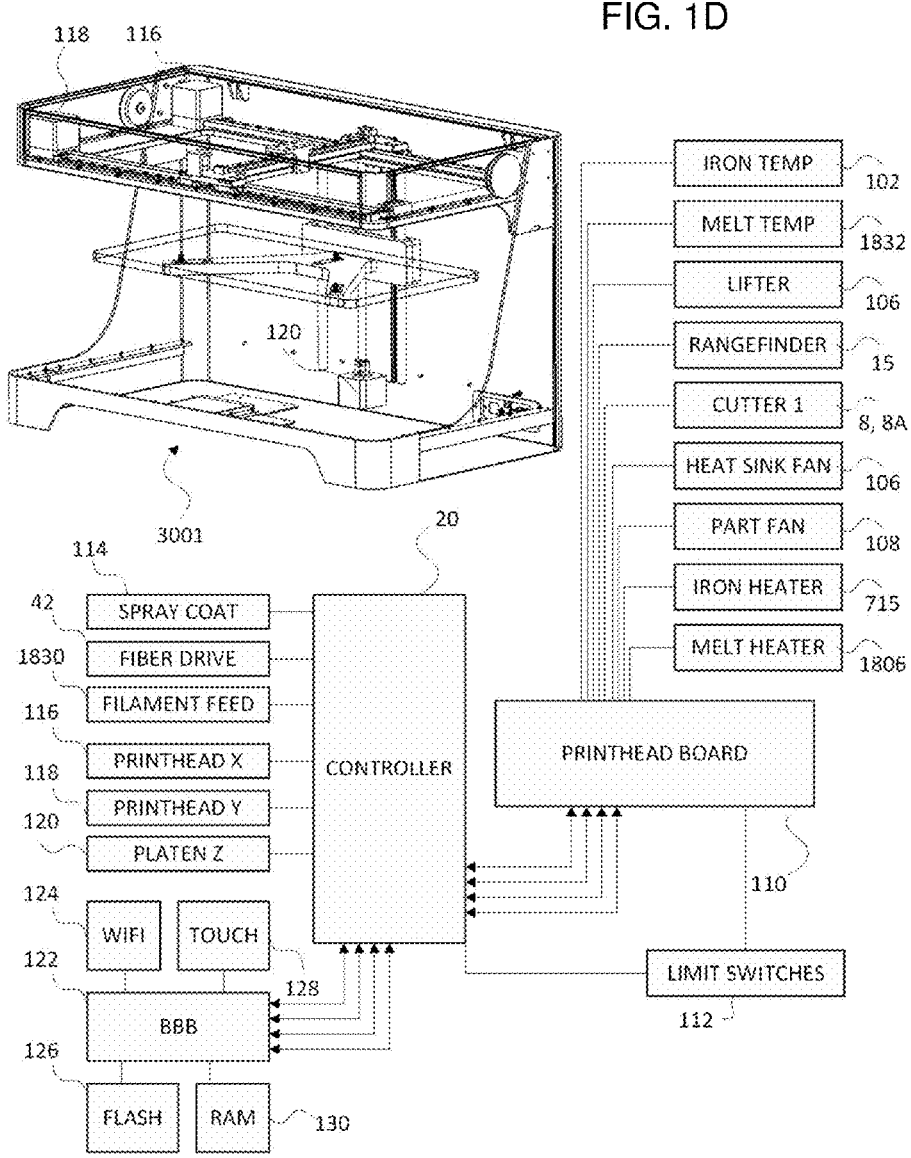

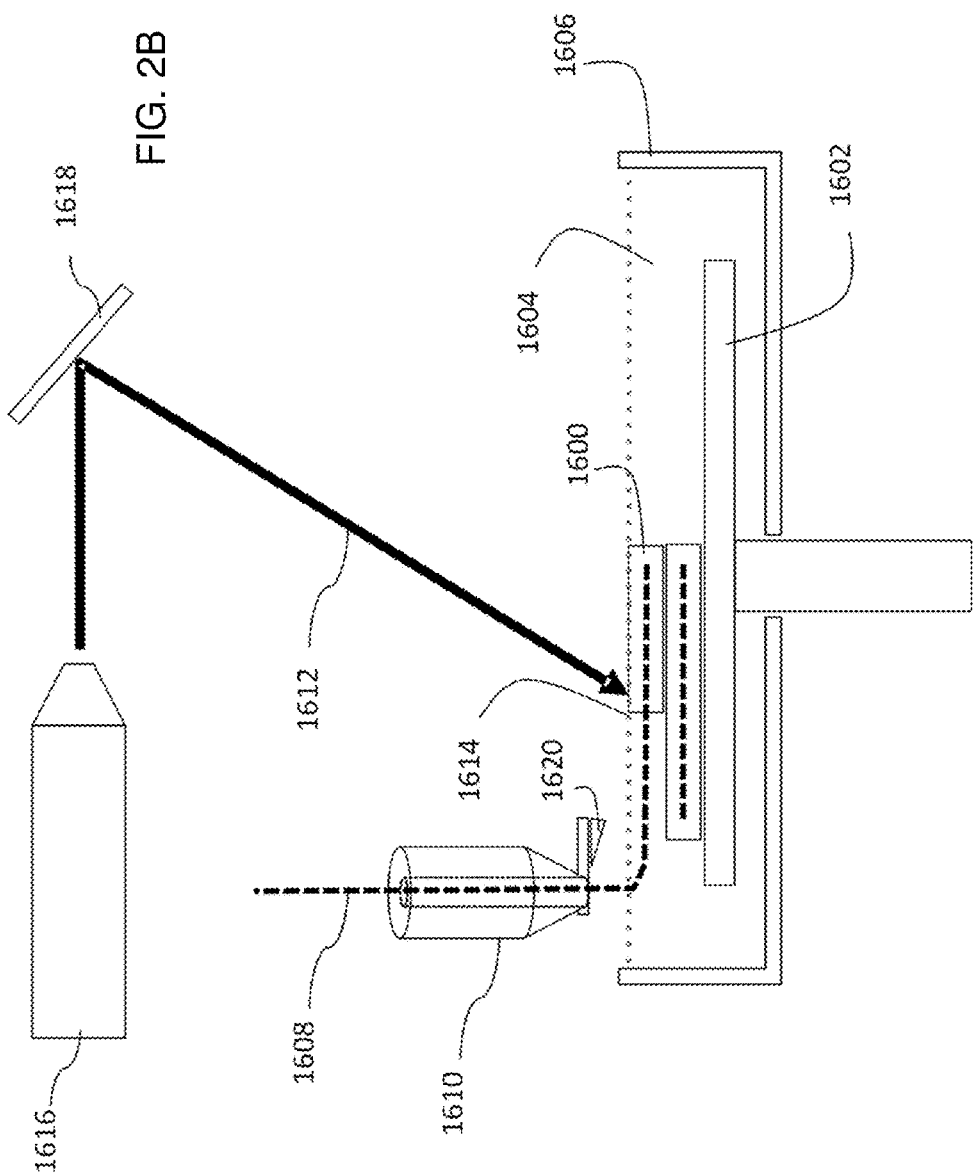

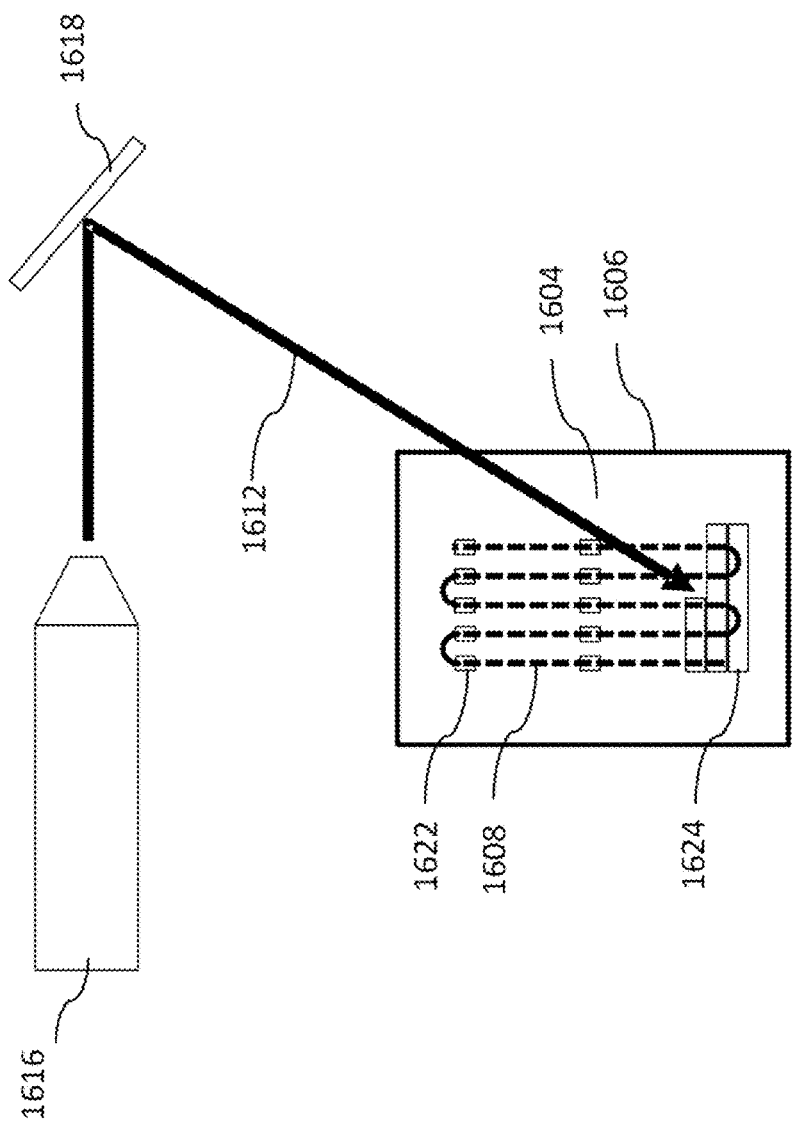

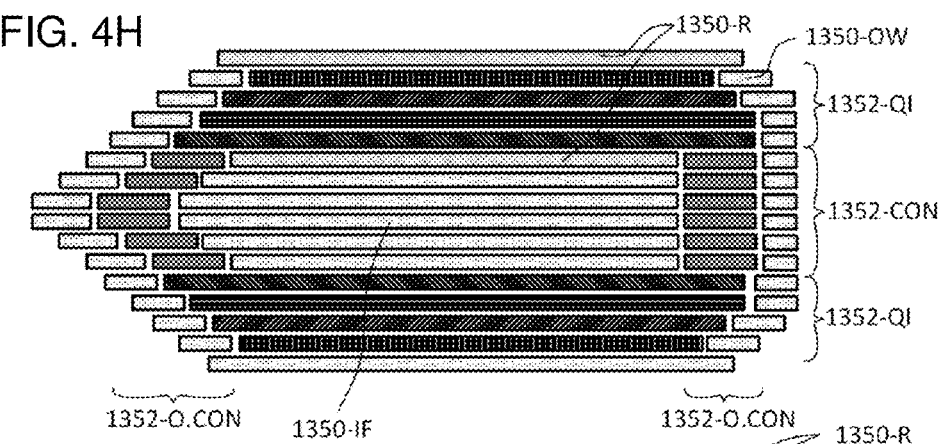
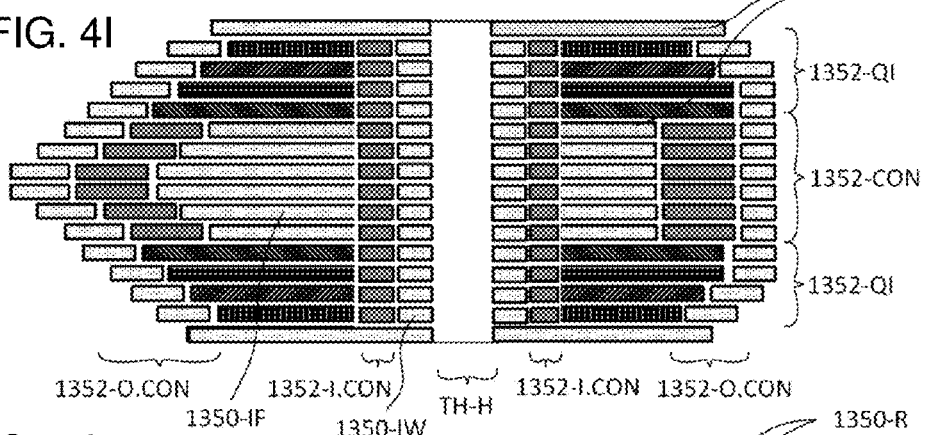
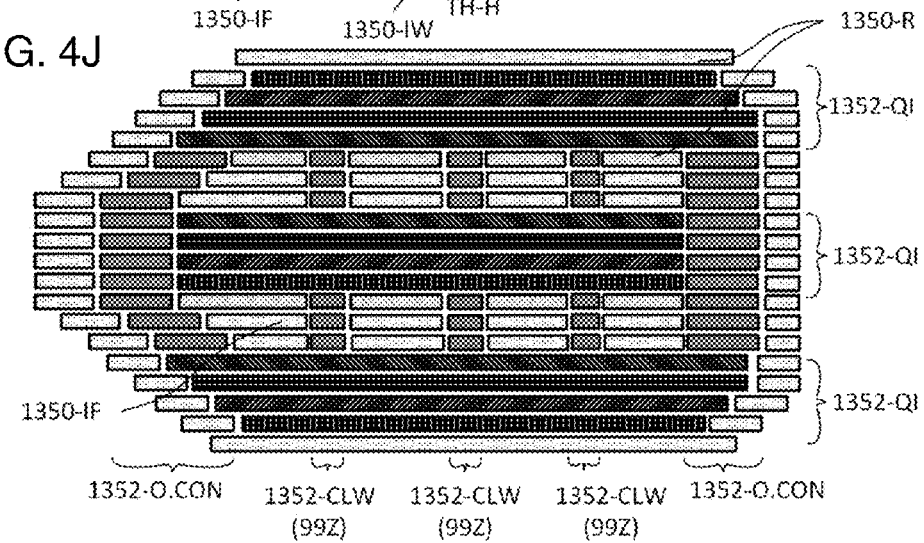

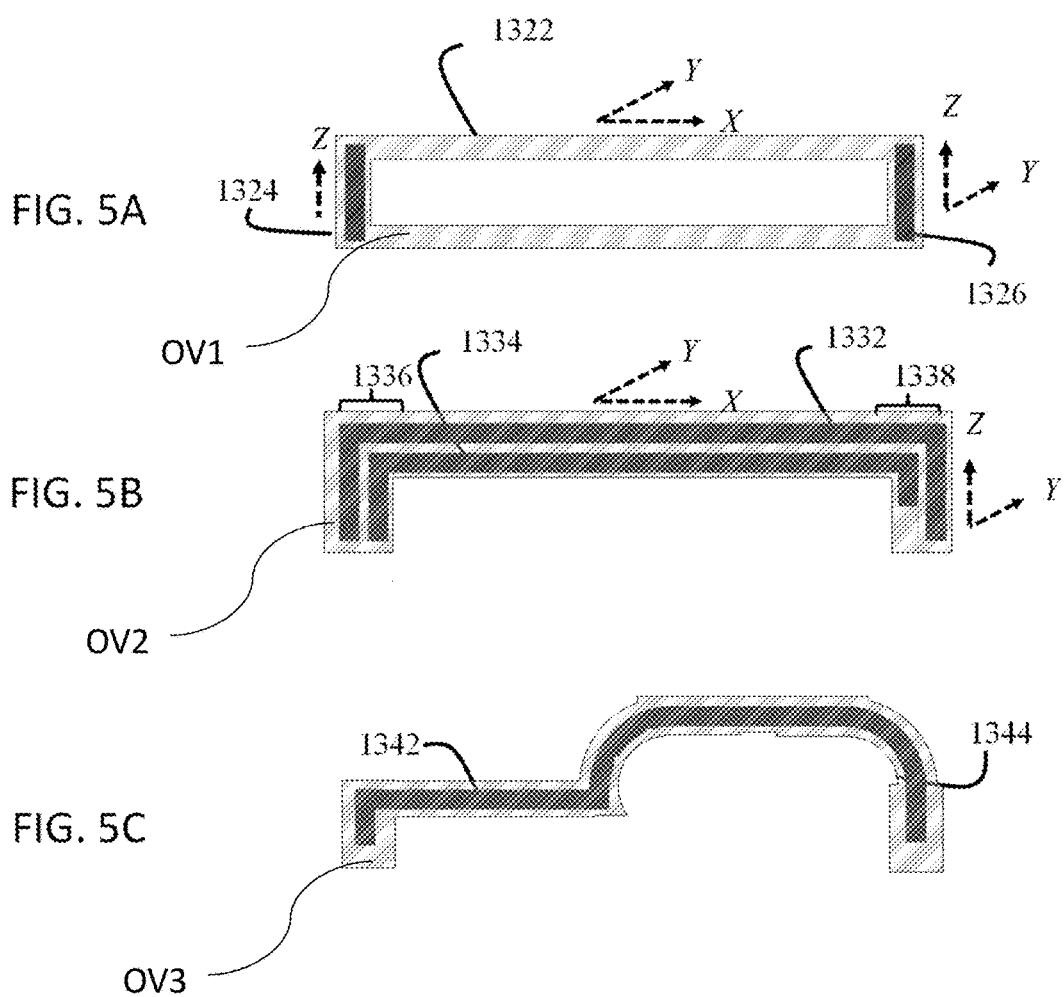

1340a

1352

OV4  1340a

1352

OV5  1340a

1352

OV5  1340a

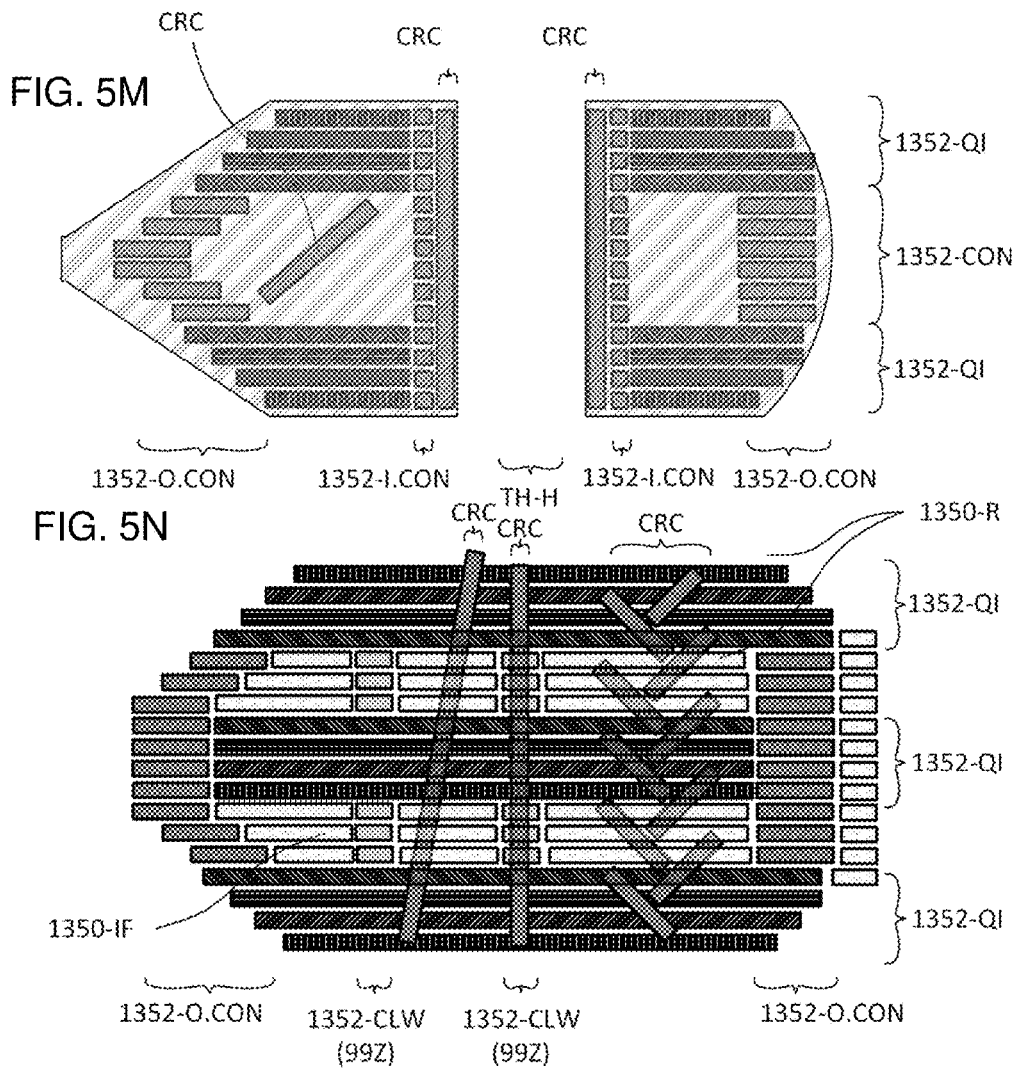

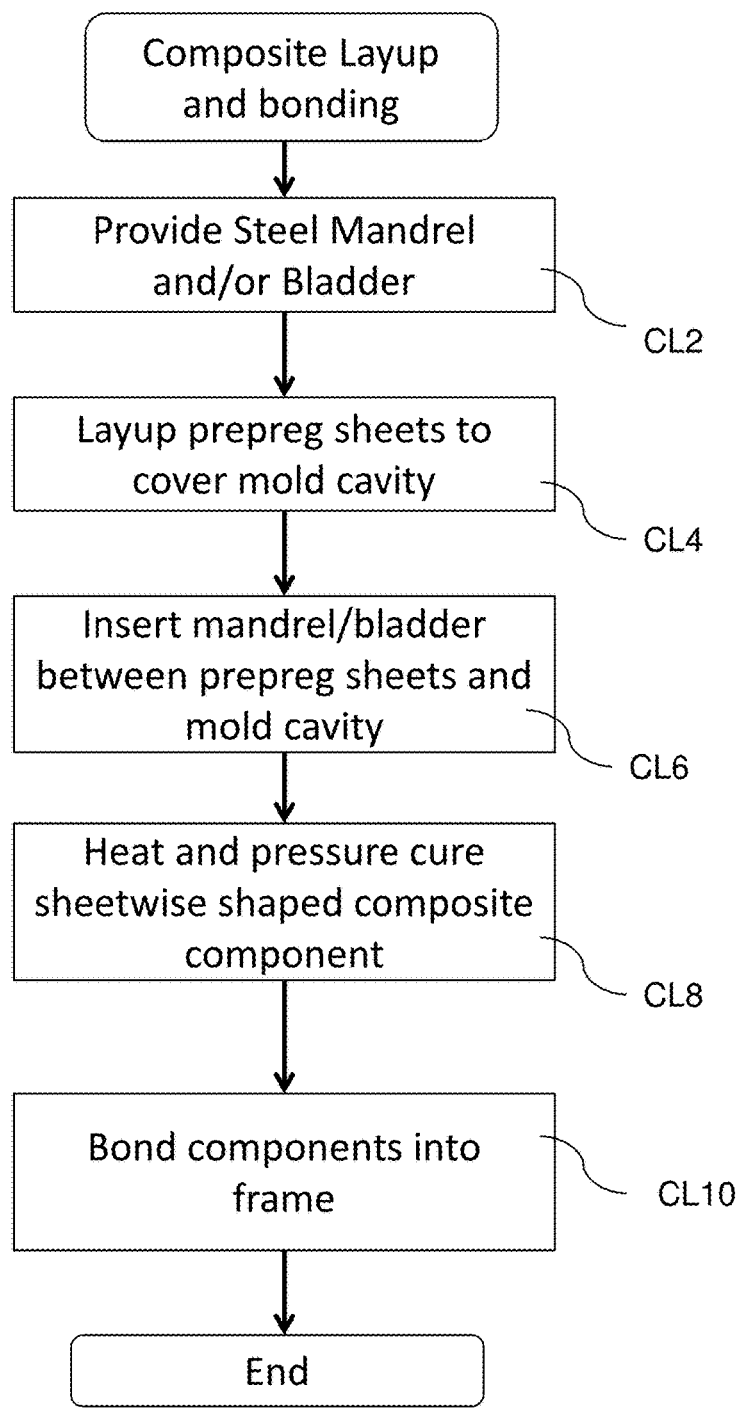

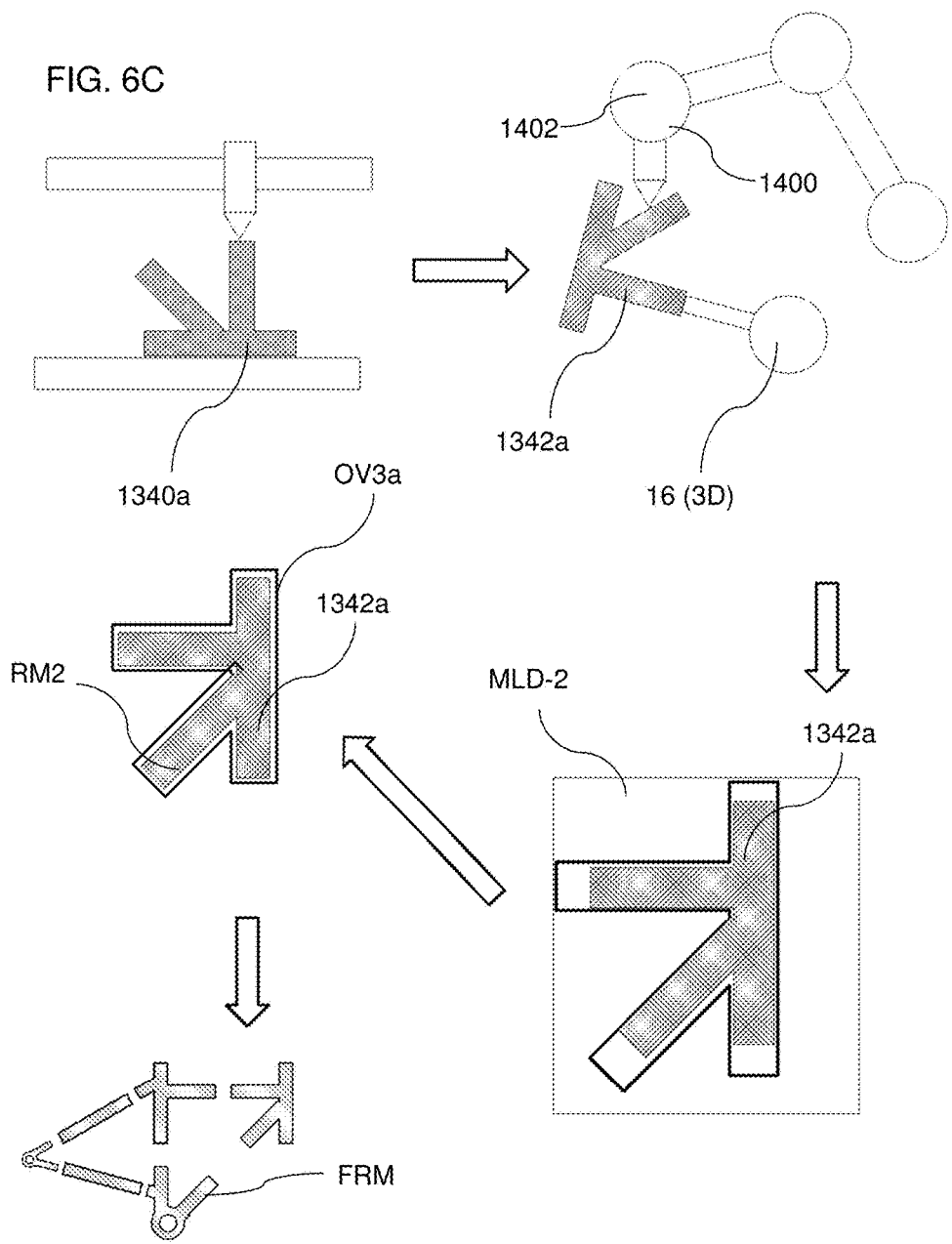

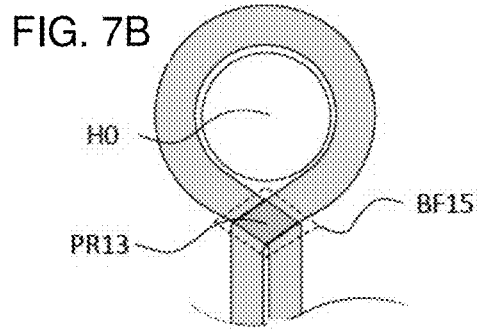
FIG. 7B
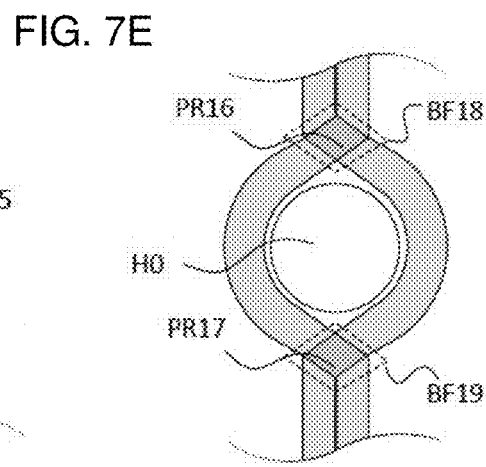
FIG. 7E
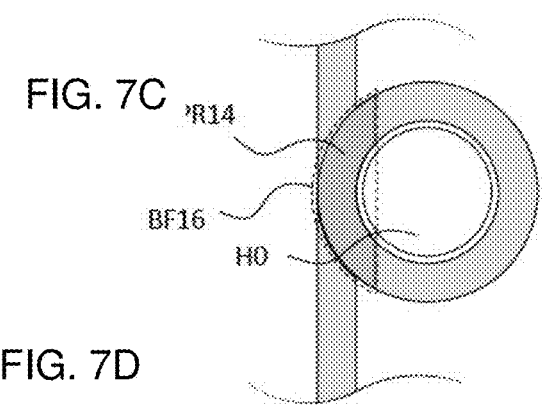
FIG. 7C
FIG. 7D
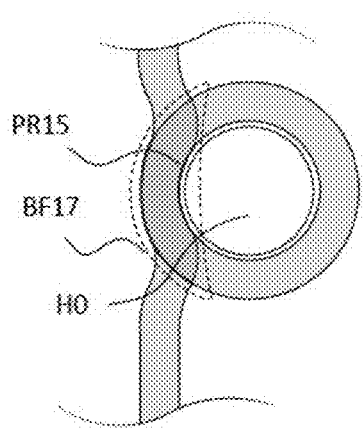
FIG. 7F
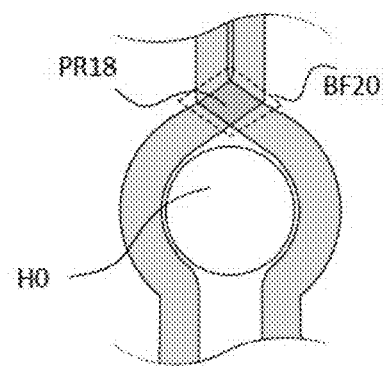

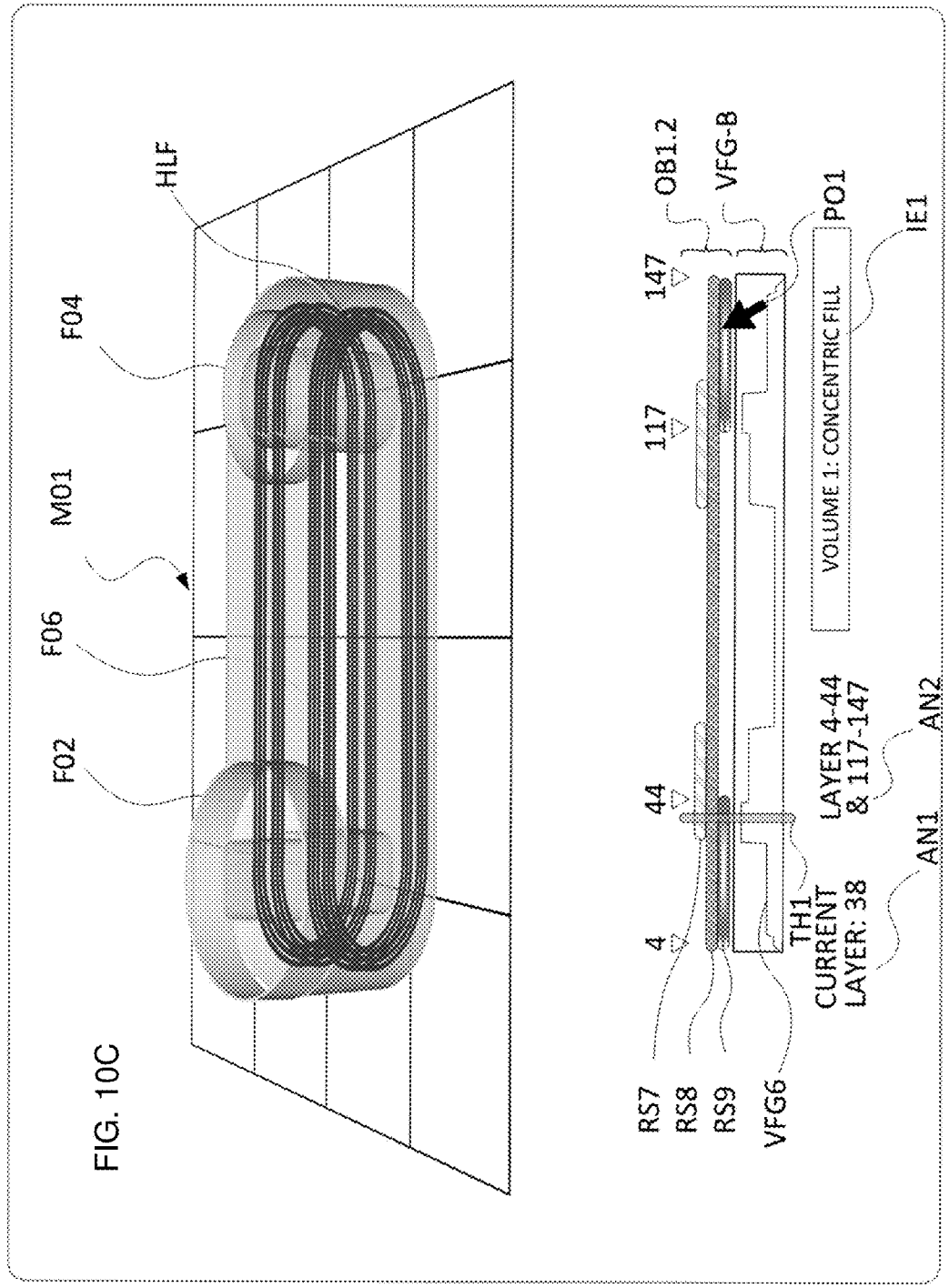

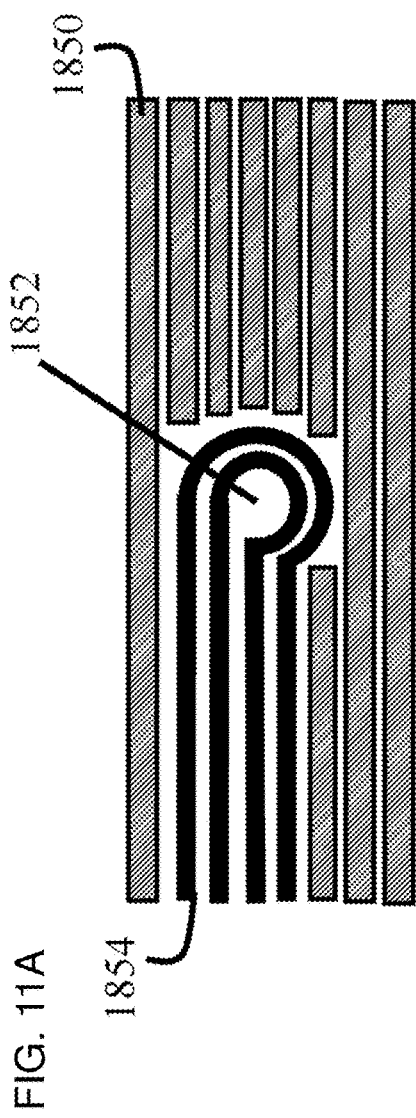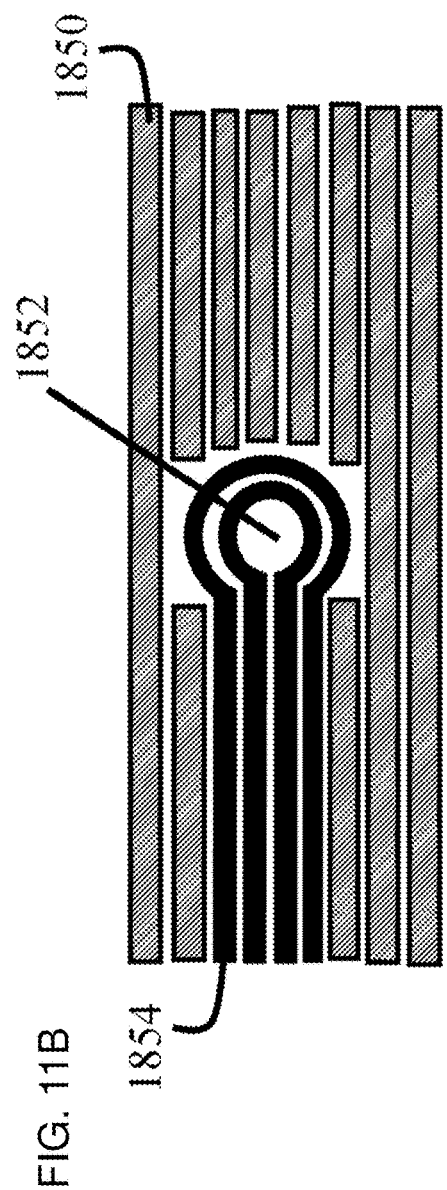

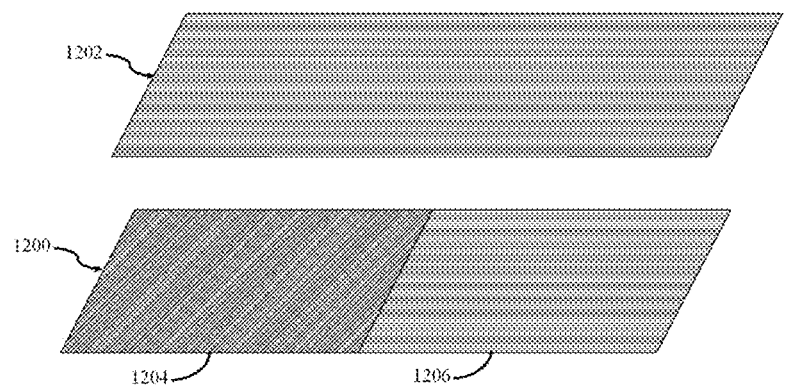
FIG. 11C
FIG. 12
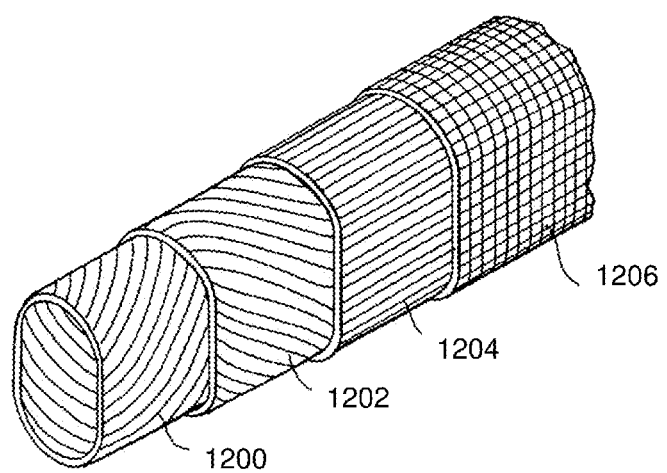

WEAR RESISTANCE IN 3D PRINTING OF COMPOSITES

CROSS REFERENCE TO RELATED APPLICATIONS

This application claims the benefit under 35 U.S.C. § 119(e) of U.S. provisional application Ser. No. 62/296,559, filed Feb. 17, 2016, is a continuation-in-part of U.S. patent application Ser. No. 15/404,816, filed Jan. 12, 2017, and is a continuation-in-part of U.S. patent application Ser. No. 15/407,740, filed Jan. 17, 2017, the disclosures of which are all herein incorporated by reference in their entireties. U.S. patent application Ser. No. 15/404,816 claims the benefit under 35 U.S.C. § 119(e) of U.S. provisional application Ser. No. 62/277,953, filed Jan. 12, 2016, and is a continuation-in-part of U.S. patent application Ser. No. 15/174,645, filed Jun. 6, 2016, the disclosures of which are both herein incorporated by reference in their entireties. U.S. patent application Ser. No. 15/407,740 claims the benefit under 35 U.S.C. § 119(e) of U.S. provisional application Ser. No. 62/279,657, filed Jan. 15, 2016, and 62/429,711, filed Dec. 2, 2016, the disclosures of which are both herein incorporated by reference in their entireties. U.S. patent application Ser. No. 15/407,740 is also a continuation-in-part of U.S. patent application Ser. No. 15/174,645, filed Jun. 6, 2016. U.S. patent application Ser. No. 15/174,645 claims the benefit under 35 U.S.C. § 119(e) of U.S. provisional application Ser. No. 62/172,021, filed Jun. 5, 2015, the disclosure of which is herein incorporated by reference in its entirety; and is a continuation-in-part of each of U.S. patent application Ser. No. 14/944,088, filed Nov. 17, 2015, Ser. No. 14/944,093, filed Nov. 17, 2015, and Ser. No. 14/876,073, filed Oct. 6, 2015, the disclosures of which are herein incorporated by reference in their entirety. U.S. patent application Ser. No. 14/944,088 claims the benefit under 35 U.S.C. § 119(e) of U.S. provisional application Ser. No. 62/172,021, filed Jun. 5, 2015, and 62/080,890 filed Nov. 17, 2014, the disclosures of which are herein incorporated by reference in their entirety; and is a continuation-in-part of U.S. patent application Ser. No. 14/491,439 filed Sep. 19, 2014, the disclosure of which is herein incorporated by reference in its entirety. U.S. patent application Ser. No. 14/491,439 claims the benefit under 35 U.S.C. § 119(e) of U.S. provisional application Ser. No. 61/880,129, filed Sep. 19, 2013; 61/881,946, filed Sep. 24, 2013; 61/883,440, filed Sep. 27, 2013; 61/902,256, filed Nov. 10, 2013, 61/907,431, filed Nov. 22, 2013; 61/804,235, filed Mar. 22, 2013; 61/815,531, filed Apr. 24, 2014; 61/831,600, filed Jun. 5, 2013; 61/847,113, filed Jul. 17, 2013, and 61/878,029, filed Sep. 15, 2013, the disclosures of which are herein incorporated by reference in their entirety; and is a continuation-in-part of each of U.S. patent application Ser. No. 14/222,318, filed Mar. 21, 2014; Ser. No. 14/297,437 [now U.S. Pat. No. 9,370,896], filed Jun. 5, 2014; and Ser. No. 14/333,881 [now U.S. Pat. No. 9,149,988], filed Jul. 17, 2014; the disclosures of which are herein incorporated by reference in their entirety.

FIELD

Aspects relate to three dimensional printing.

BACKGROUND

"Three dimensional printing" as an art includes various methods such as Stereolithography (SLA) and Fused Filament Fabrication (FFF). SLA produces high-resolution parts, typically not durable or UV-stable, and is used for proof-of-concept work; while FFF extrudes through a nozzle successive filament beads of ABS or a similar polymer.

In the art of "Composite Lay-up", preimpregnated ("prepreg") composite sheets of fabric impregnated with a resin binder are layered into a mold, heated, and cured. In "Composite Filament Winding" sticky "tows" including multiple thousands of individual carbon strands are wound around a custom mandrel to form a rotationally symmetric part.

Continuous fiber prepreg materials (continuous tows of multiple fiber strands with a thermoplastic, thermosetting, or energy curing resin matrix) may be manufactured, and may be 3D printed with certain devices and/or processes.

SUMMARY OF INVENTION

According to one aspect and some embodiments of the present invention, a three dimensional printer prints a part with a composite material including a thermoplastic matrix and a chopped fiber filler having a hardness more than two times the hardness of the thermoplastic matrix. The printer includes a drive wheel for advancing the composite material, and a heated nozzle through which the composite material is deposited. The heated nozzle includes a nozzle body through which heat is applied to the composite material, the nozzle body being formed from a material having a thermal conductivity of at least substantially 35 w/M-K. An interior nozzle throat within the nozzle body through which the composite material exits and abrades the nozzle throat may be formed from a material having a Rockwell C hardness at least substantially C50. An exterior nozzle tip that contacts and rubs against a top surface of a previously deposited part and is abraded by the chopped fiber filler may be formed from a material having a Rockwell C hardness at least substantially C40.

Optionally, the nozzle body is formed from a material having a thermal conductivity of substantially 50 w/M-K or higher. The nozzle throat may be formed from a material having a Rockwell C hardness at least substantially C60. The nozzle throat and nozzle tip may each be formed from a material having a Rockwell C hardness at least substantially C60. The nozzle body, the nozzle throat, and nozzle tip may be unitarily formed from a material having a thermal conductivity of at least substantially 60 w/M-K as well as Rockwell C hardness of at least substantially C60. Optionally, a portion of the nozzle body, the nozzle throat, and nozzle tip may be unitarily formed from one of a sintered carbide and a sintered nitride.

Further optionally, and more advantageously with respect to heat transfer, wear, and available commercial materials, a majority of the thermal mass of the nozzle body may include a material having a thermal conductivity of substantially 200 w/M-K or higher, while the nozzle throat and nozzle tip may be formed within a nozzle tip insert having a thermal conductivity of at least substantially 100 w/M-K as well as at least a Rockwell C hardness of substantially C60.

Still further optionally, the insert may be a tapered insert having a nozzle tip with a surface area lower than a nozzle cross sectional area adjacent the tip, such that the nozzle tip increases in area and wears at a lower rate as material is worn away. The nozzle body may include a cavity behind the nozzle throat of larger internal diameter than the nozzle throat diameter, and/or may include a chamfer leading from the larger cavity diameter to the smaller nozzle throat diameter. A nozzle throat and nozzle tip may be unitary in a nozzle insert held within the nozzle body by one of a crimp and a braze. The printer may include a cutter arranged along a composite material supply path from a supply of composite material to the nozzle tip, the cutter positioned following the drive wheel for advancing the material, wherein the cutter includes a blade having a Rockwell C hardness at least substantially C60, and/or a curved guide tube arranged along the material supply path, the curved guide tube having at least one curved or curvable section formed in one or more pieces from a material having a Rockwell C hardness at least substantially C25. The printer may include one drive wheel for advancing the composite material, the at least one drive wheel having a drive surface including a material having a Rockwell C hardness of at least substantially C25. At least one drive wheel may be at least one of roughened, textured, hobbed, and stepped. Alternatively, one drive wheel may oppose one idle wheel, in which one of the drive wheel and the idle wheel is at least one of roughened, textured, hobbed, and stepped and the remaining one of the drive wheel and the idle wheel is substantially smooth. One drive wheel opposing one idle wheel, in which both opposing wheels are formed from a material having a Rockwell C hardness at least substantially C25. When one drive wheel opposes one idle wheel, and at least one of the drive wheel and idle wheel may include a relative or absolute encoder for measuring at least one of rotation speed and motor stall.

In another aspect and some embodiments of the present invention, in a method for additively manufacturing a part, a reinforced axial fiber filament may be supplied including a matrix material, a plurality of axial fiber strands extending substantially continuously within the matrix material, and a multiplicity of fiber rods between 0.2-10 mm long dispersed throughout the matrix material. At least some of the dispersed fiber rods may be oriented transversely to the axial fiber strands.

A composite fill may be supplied separately from the continuous/random fiber reinforced composite filament, including a multiplicity of fiber rods between 0.2-10 mm long dispersed throughout the composite fill, the fiber rods having hardness at least twice that of a matrix of the composite fill. The reinforced axial fiber filament may be deposited in a first region formed in an outward portion of a part that is closer to an outer wall of the part than to a centroid of the part, through a nozzle throat formed from a material having a thermal conductivity of at least substantially 35 w/M-K or higher adjacent a nozzle tip formed from a material having a Rockwell C hardness at least substantially C40.

Optionally, heated pressure may be applied to continuously melt and spread the reinforced axial fiber filament. Heated pressure may also be applied to continuously embed a proportion of the first dispersed fiber rods against a previously deposited reinforced axial fiber filament. The reinforced axial fiber filament may be deposited within a first region formed in an outward portion of a part that is closer to an outer wall of the part than to a centroid of the part, through a nozzle throat formed from a material having a thermal conductivity of at least substantially 35 w/M-K or higher adjacent a nozzle tip formed from a material having a Rockwell C hardness at least substantially C50.

The matrix material of the reinforced axial fiber filament and a first proportion of the fiber rods reinforced axial fiber filament may be flowed interstitially among the axial fiber strands. A second proportion of the fiber rods of the reinforced axial fiber filament may be forced against previously deposited portions of the part.

Alternatively, a method for additively manufacturing a part according to the some embodiments of the invention may include supplying a reinforced axial fiber filament including a matrix material, with a plurality of axial fiber strands extending substantially continuously within the matrix material, and a multiplicity of fiber rods between 0.2-10 mm long dispersed throughout the matrix material, at least some of the dispersed fiber rods being oriented transversely to the axial fiber strands. A composite fill may be supplied separately from the continuous/random fiber reinforced composite filament, including a multiplicity of fiber rods between 0.2-10 mm long dispersed throughout the composite fill, the fiber rods having hardness at least twice that of a matrix of the composite fill. The composite fill may be deposited through a nozzle throat formed from a material having a thermal conductivity of at least substantially 35 w/M-K or higher adjacent a nozzle tip formed from a material having a Rockwell C hardness at least substantially C40.

Alternatively, a method for additively manufacturing a part according to the some embodiments of the invention may include additively manufacturing a part, the method comprising supplying a composite fill including a multiplicity of fiber rods between 0.2-10 mm long dispersed throughout the composite fill, the fiber rods having hardness at least twice that of a matrix of the composite fill. The composite fill may be deposited through a nozzle having a nozzle body through which heat is applied to the composite material, an interior nozzle throat within the nozzle body through which the composite material exits and abrades the nozzle throat, and adjacent an exterior nozzle tip that contacts and rubs against a top surface of a previously deposited part and is abraded by the chopped fiber filler. Optionally, a majority of the thermal mass of the nozzle body includes a material having a thermal conductivity of at least substantially 100 w/M-K or higher, and the interior nozzle throat and exterior nozzle tip are formed having a thermal conductivity of at least substantially 60 w/M-K as well as at least a Rockwell C hardness of substantially C50. Alternatively, and more advantageously with respect to heat transfer, wear, and available commercial materials, a majority of the thermal mass of the nozzle body may induce a material having a thermal conductivity of substantially 200 w/M-K or higher, and the interior nozzle throat and exterior nozzle tip are formed having a thermal conductivity of at least substantially 100 w/M-K as well as at least a Rockwell C hardness of substantially C60.

BRIEF DESCRIPTION OF THE DRAWINGS

FIG. 1A is a schematic view of a continuous core reinforced filament deposition and fill material filament extrusion printer.

FIG. 1D is a block diagram and schematic representation of a three dimensional printer as discussed herein, applicable to all embodiments.

FIGS. 1E through 1G are cross-sections of 3D printed structures that may be deposited by the method and printer of the present disclosure, wherein FIG. 1E shows continuous/random core fiber reinforced filament deposited together with polymer, ceramic, or metal fill material, deposited by a 3D printer (e.g., FDM, SLA, or other technique); FIG. 1F shows continuous/random core fiber reinforced filament overmolded with a polymer, ceramic, or injection or other molding, or continuous (substantially non-layered or microlayered) additive manufacturing; and FIG. 1G shows continuous/random core fiber reinforced filament deposited together and interacting with polymer, ceramic, or metal fill material that includes a proportion (e.g., 5-20%) of short (e.g., ⅒ to 2 mm length) chopped fiber (e.g., carbon, glass, aramid or the like).

FIGS. 2A through 2C are schematic representations of a three dimensional printing system using a continuous core reinforced filament together with stereolithography or selective laser sintering in which FIGS. 2A and 2B are schematic views of a continuous core reinforced filament-SLA/SLS printer and FIG. 2C is a schematic view of a tacking process.

FIGS. 4H-4J show exemplary weighted distributions of 3D printed composite lay-up according to the present embodiments, e.g., to form sandwich panel shell and fiber cellular interior structures, using both quasi-isotropic sets of shells or layers and concentrically reinforced shells or layers, to increase effective moment of inertia about the entire surface of the part as well as increase crushing and torsional resistance.

FIGS. 5A-5D show the structures of FIGS. 4A-4D in which the internal structures are additively deposited as soluble preforms instead of structural resin (although in FIGS. 5A-5J the internal resin structures may also be deposited in part or in whole as structural resin, either solid or partial, e.g., honeycombed, infill).

FIG. 5M-5N show structures similar to those of FIGS. 5I and 5J, in which continuous reinforcing columns bridging layers extend through multiple layers.

FIGS. 6A and 6B show successive steps in a process of multi-component composite lay-up to build an exemplary bicycle frame.

FIGS. 6C and 6D show successive steps in a process of additive soluble preform and additive continuous fiber reinforcement preform to build an exemplary bicycle frame.

FIGS. 7B-7F shows various crossing turns made about a hole (e.g., a lace aperture or through hole), in reinforcement formations of composite swath or multi-swath track approaches near the center of the hole and departs beside and parallel to its entry; approached near a tangent to the hole and departs from the hole opposite to and parallel to its entry; and in which a bight, open loop or touching loop may be made away from the reinforced hole from which the reinforcement formation of composite swath or multi-swath track returns toward the hole.

FIG. 10A-10C shows an exemplary on-screen part rendering and logic structure for the rule propagation procedure of FIG. 9.

FIGS. 11A-11B show schematic representations of a printed part including a reinforced holes formed therein.

FIG. 11C shows exemplary composite layup via 3D printing of composite fibers as disclosed herein in contrasting directions.

FIG. 12 shows a multi-layer laminate as FIG. 11C deposited successively in a tubular form.

DETAILED DESCRIPTION

Figure 1B:
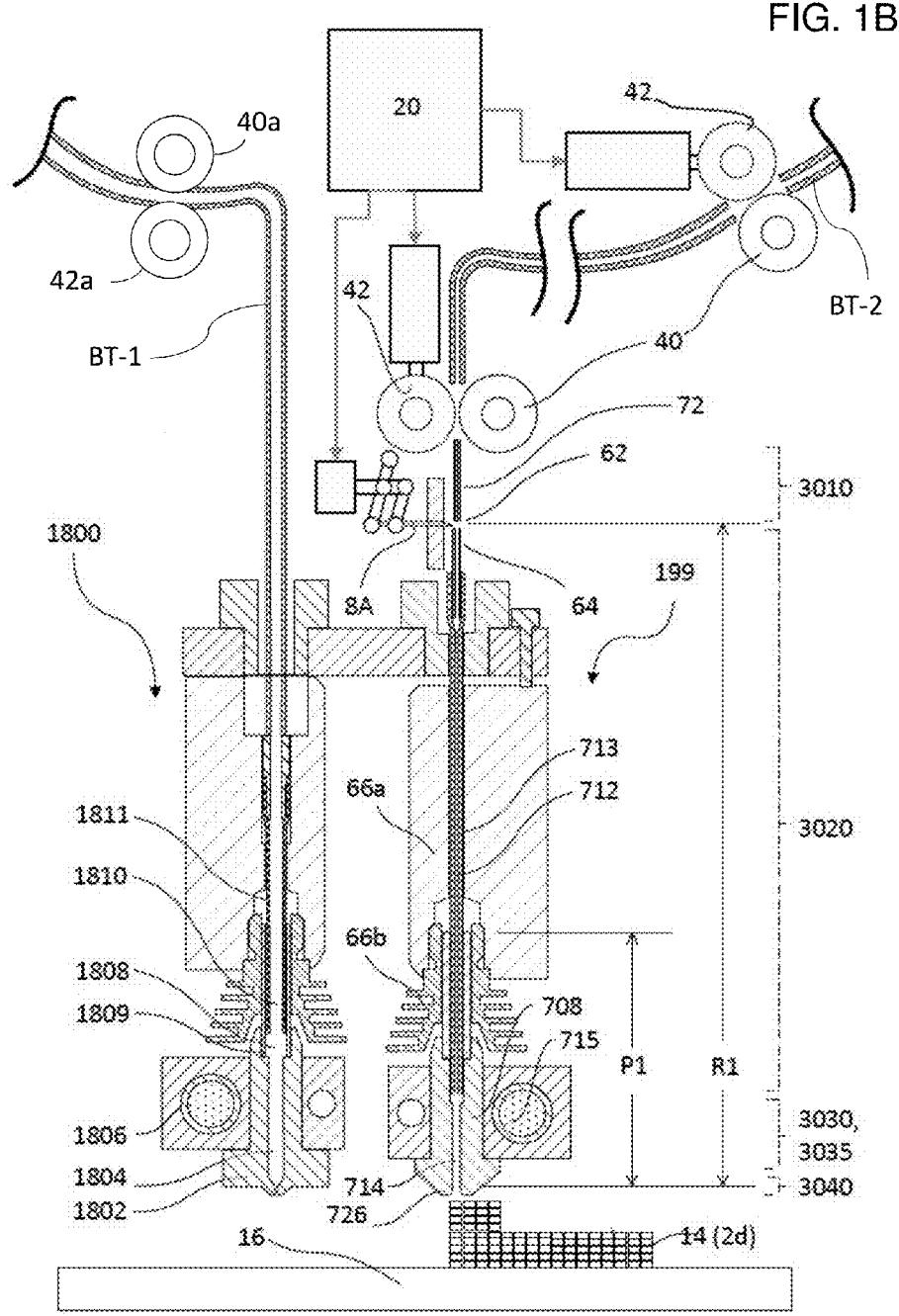
FIG. 1B is a cross-sectional and schematic view of a compound extrusion and fiber printhead assembly.

This patent application incorporates the following disclosures by reference in their entireties: U.S. patent application Ser. Nos. 61/804,235; 61/815,531; 61/831,600; 61/847,113; 61/878,029; 61/880,129; 61/881,946; 61/883,440; 61/902,256; 61/907,431; 62/080,890; 62/172,021; 14/222,318; 14/297,437; 14/333,881; and Ser. No. 14/491,439 which may be referred to herein as "Composite Filament Fabrication patent applications" or "CFF patent applications".

Definitions

In the present disclosure, "3D printer" is inclusive of both discrete printers and/or toolhead accessories to manufacturing machinery which carry out an additive manufacturing sub-process within a larger process. With reference to FIGS. 1-5, 3D printer is controlled by a motion controller 20 which interprets dedicated G-code 1102 and drives various actuators of the 3D printer in accordance with the G-code 1102.

As used herein, "extrusion" shall have its conventional meaning, e.g., a process in which a stock material is pressed through a die to take on a specific shape of a lower cross-sectional area than the stock material. Fused Filament Fabrication (FFF) is an extrusion process. Similarly, "extrusion nozzle" shall have its conventional meaning, e.g., a device designed to control the direction or characteristics of an extrusion fluid flow, especially to increase velocity and/or restrict cross-sectional area, as the fluid flow exits (or enters) an enclosed chamber. The present disclosure shall also use the coined word "conduit nozzle" or "nozzlet" to describe a terminal printing head, in which unlike a FFF nozzle, there is no significant back pressure, or additional velocity created in the printing material, and the cross sectional area of the printing material, including the matrix and the embedded fiber(s), remains substantially similar throughout the process (even as deposited in bonded ranks to the part). As used herein, "deposition head" shall include extrusion nozzles, conduit nozzles, and/or hybrid nozzles. Also as used herein, a reference to a Figure numbers with no following letter suffix shall refer also to all letter suffixes of the same Figure number, e.g., a reference to "FIG. 1" refers to all of FIGS. 1A, 1B, 1C, 1D, 1E, 1F, and 1G (or any other letter suffix).

Lastly, in the three-dimensional printing art, "filament" typically refers to the entire cross-sectional area of a spooled build material, while in the composites art, "filament" refers to individual fibers of, for example, carbon fiber (in which, for example, a "1K tow" will have 1000 individual strands). For the purposes of the present disclosure, "filament" shall retain the meaning from three-dimensional printing, and "strand" shall mean individual fibers that are, for example, embedded in a matrix, together forming an entire composite "filament".

3D Printing System

The printer(s) of FIGS. 1A-1D, with at least two print heads 18, 10 and/or printing techniques, deposit with one head a fiber reinforced composite filament (e.g., reinforced axial fiber filament), and with a remaining head apply pure or neat matrix resin or fill material (e.g., in some cases a composite fill) 18a (thermoplastic or curing). The fiber reinforced composite filament 2 (also referred to herein as continuous core reinforced filament) may be substantially void free and include a polymer or resin that coats, permeates or impregnates an internal continuous single core or multistrand core. It should be noted that although the print head 18 is shown as an extrusion print head, "fill material print head" 18 as used herein includes optical or UV curing, heat fusion or sintering, or "polyjet", liquid, colloid, suspension or powder jetting devices—not shown—for depositing fill material.

Although FIGS. 1A-1D in general show a Cartesian arrangement for relatively moving the print-heads in 3 orthogonal translation directions, other arrangements are considered within the scope of, and expressly described by, a drive system or drive or motorized drive that may relatively move a print head and a build plate supporting a 3D printed part in at least three degrees of freedom (i.e., in four or more degrees of freedom as well). For example, for three degrees of freedom, a delta, parallel robot structure may use three parallelogram arms connected to universal joints at the base, optionally to maintain an orientation of the print head (e.g., three motorized degrees of freedom among the print head and build plate) or to change the orientation of the print head (e.g., four or higher degrees of freedom among the print head and build plate). As another example, the print head may be mounted on a robotic arm having three, four, five, six, or higher degrees of freedom; and/or the build platform may rotate, translate in three dimensions, or be spun.

The fiber reinforced composite filament 2, 2a is fed, dragged, and/or pulled through a conduit nozzle 10, 199 optionally heated to a controlled temperature selected for the matrix material to maintain a predetermined viscosity, force of adhesion of bonded ranks, melting properties, and/or surface finish.

After the matrix material or polymer 4, 4a is substantially melted, the continuous core reinforced filament 2 is applied onto a build platen 16 to build successive layers 14 to form a three dimensional structure. The relative position and/or orientation of the build platen 16 and conduit nozzle 10 are controlled by a controller 20 to deposit the continuous core reinforced filament 2 in the desired location and direction.

A cutter 8 controlled by the controller 20 may cut the continuous core reinforced filament during the deposition process in order to (i) form separate features and components on the structure as well as (ii) control the directionality or anisotropy of the deposited material and/or bonded ranks in multiple sections and layers. At least one secondary print head 18 may print fill material 18a to form walls, infill, UV resistant and/or scratch resistant protective coatings, and/or removable, dissolvable, or soluble support material.

The supplied filament includes at least one axial fiber strand 6, 6a extending within a matrix material 4, 4a of the filament, for example a nylon matrix 4a that impregnates hundreds or thousands of continuous carbon, aramid, glass, basalt, or UHMWPE fiber strands 6a. The fiber strand material has an ultimate tensile strength of greater than 300 MPa.

The driven roller set 42, 40 push the unmelted filament 2 along a clearance fit zone that prevents buckling of filament 2. In a threading or stitching process, the melted matrix material 6a and the axial fiber strands 4a of the filament 2 are pressed into the part 14 and/or into the swaths below 2d, at times with axial compression. As the build platen 16 and print head(s) are translated with respect to one another, the end of the filament 2 contacts the ironing lip 726 and is subsequently continually ironed in a transverse pressure zone 3040 to form bonded ranks or composite swaths in the part 14.

FIG. 1B depicts a cross section of a compound (e.g., at least dual) print head with an extrusion printhead 1800 (as head 18) and extrusion nozzle 1802 for FFF and a fiber deposition printhead 199 (as head 10) and conduit nozzle 708 for continuous fiber reinforced thermoplastic deposition. Like numbered features are similar to those described with respect to FIG. 1A.

The feed rate (the tangential or linear speed of the drive 42, 40) and/or printing rate (e.g., the relative linear speed of the platen/part and print head) may be monitored or controlled to maintain compression, neutral tension, or positive tension within the unsupported zone as well as primarily via axial compressive or tensile force within fiber strand(s) 6a extending along the filament 2.

Figure 1C:
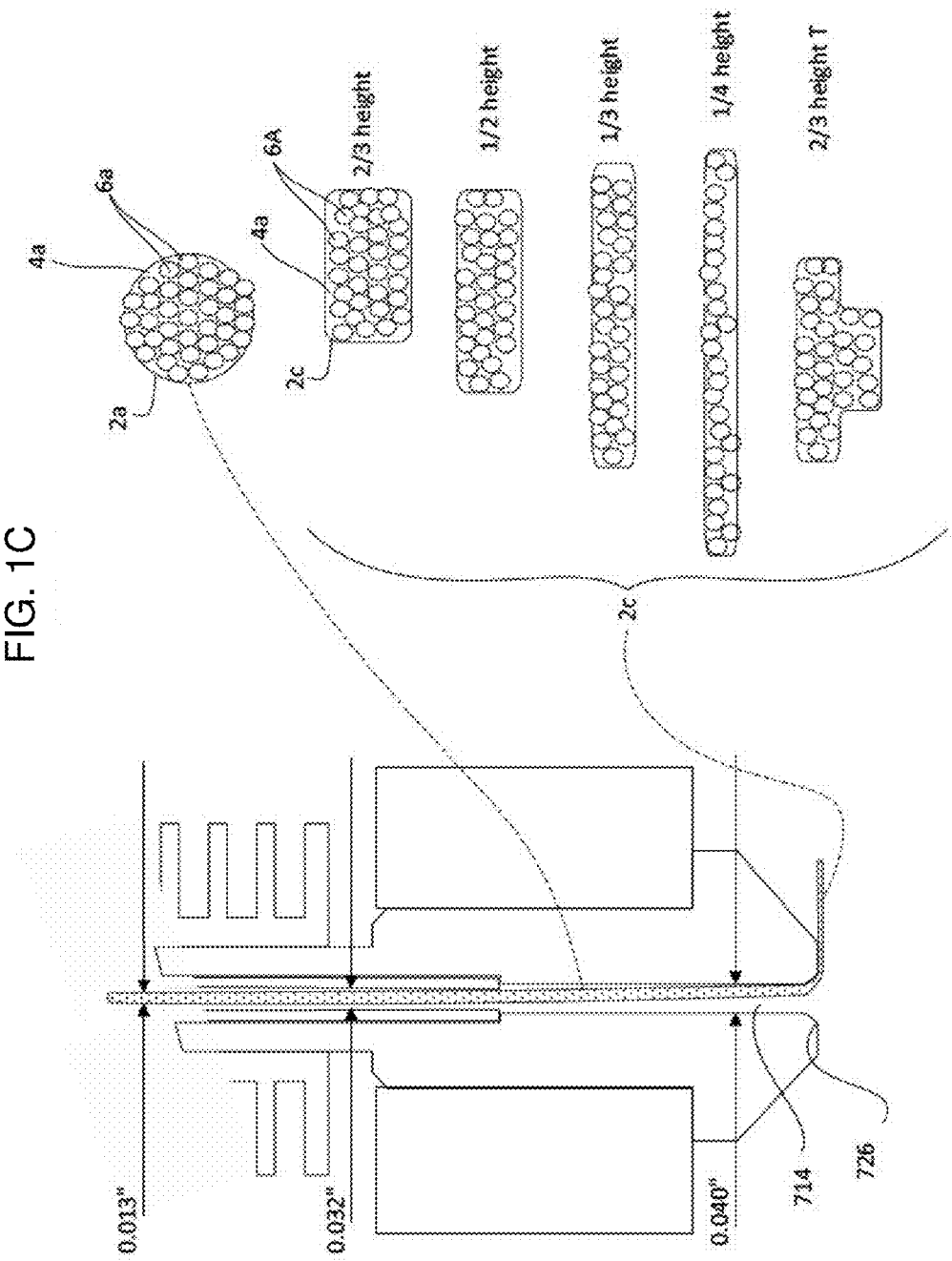
FIG. 1C is a close-up cross-section of a fiber printhead assembly and a set of different possible compression/consolidation shapes, including continuous/random core reinforced filament shapes.

As shown in FIGS. 1B and 1C, a transverse pressure zone 3040 includes an ironing lip 726 that reshapes the filament 2. This ironing lip 726 compacts or presses the filament 2 into the part and may also melt, heat to cross glass transition into a non-glassy state, and/or liquefy the matrix material 4a in the transverse pressure zone 3040. Optionally, the ironing lip 726 in the transverse pressure zone 3040 flattens the melted filament 2 on the "top" side (i.e., the side opposite the part 14), applying an ironing force to the melted matrix material 4a and the axial fiber strands 6a as the filament 2 is deposited in bonded ranks or composite swaths 2c. For example, the controller 20 maintains the height of the bottom of the ironing lip 726 to the top of the layer below as less than the diameter of the filament (e.g., to compress to ½ the height of the filament, at least at ½ the filament height; to compress to ⅓ the height of the filament, at least at ⅓ the filament height, and so on). The controller 20 may maintain the height at of the bottom of the ironing lip 726 to the layer below at zero (e.g., in which case the amount of consolidation/compression and the fiber swath 2c height may be a function of system stiffness). Another reshaping force is applied as a normal reaction force from the platen 16 or part 14 itself, which flattens the bonded ranks or composite swaths 2c on at least two sides as the melted matrix material 4a and the axial fiber strands 6a are ironed to form laterally and vertically bonded ranks (i.e., the ironing also forces the bonded ranks 2c into adjacent ranks).

As shown in FIG. 1C, if the underlying layer or swaths 2d includes channels, the normal reaction force from the part 14 may create T-shapes instead. The pressure and heat applied by ironing improves diffusion and fiber penetration into neighboring ranks or swaths (laterally and vertically).

As shown in FIG. 1B, unmelted fiber reinforced filament may be severed in a gap 62 between a guide tube 72 (having a clearance fit) and the conduit nozzle 708; or within the conduit nozzle 708, e.g., upstream of the non-contact zone 3030; and/or at the clearance fit zone 3010, 3020 or at the ironing lip 726.

After the matrix material 6a is melted by the ironing lip or tip 726, the feed and/or printing rate can be controlled by the controller 20 to maintain neutral to positive tension in the composite filament 2 between the ironing lip 726 and the part 14 primarily via tensile force within the fiber strands 4a extending along the filament 2. A substantially constant cross sectional area of the fiber reinforced composite filament is maintained in the clearance fit zone, the unsupported zone, the transverse pressure zone, and also as a bonded rank is attached to the workpiece or part 14.

With reference to FIG. 1B, each of the printheads 1800 and 199 may be mounted on the same linear guide or different linear guides or actuators such that the X, Y motorized mechanism of the printer moves them in unison. As shown, the FFF printhead 1800 includes an extrusion nozzle 1802 with melt zone or melt reservoir 1804, a heater 1806, a high thermal gradient zone 1808 formed by a thermal resistor or spacer 1809 (optionally an air gap), and a Teflon or PTFE tube 1811. A 1.75-1.8 mm; 3 mm; or larger or smaller thermoplastic filament is driven through, e.g., direct drive or a Bowden tube provides extrusion back pressure in the melt reservoir 1804.

The companion continuous fiber embedded filament printhead 199, as shown, includes the conduit nozzle 708, the composite ironing tip 728, and the limited contact cavity 714, in this example each within a heating block heated by a heater 715. A cold feed zone 712 may be formed within a receiving tube 64, including a capillary-like receiving tube of rigid material and a small diameter (e.g. inner diameter of 32 thou) Teflon/PTFE tube extending into the nozzle 708. The cold feed zone is surrounded in this case by an insulating block 66a and a heat sink 6b, but these are fully optional. In operation, an unattached terminal end of the fiber-embedded filament may be held in the cold feed zone, e.g., at height P1. Distance P1, as well as cutter-to-tip distance R1, are retained in a database for permitting the controller 20 to thread and advance the fiber-embedded filament as discussed herein. If P1 and R1 are very similar (e.g., if the cutter location is near or within the cold feed zone), P1 may be set to be the same or similar to R1. Further as shown, the controller 20 is operatively connected to the cutter 8, 8A, and feed rollers 42 facing idle rollers 40.

FIG. 1C shows a schematic close-up cross section of the conduit nozzle 708. As shown in FIG. 1C, the inner diameter of the receiving tube 64 (in this case, at a position where a Teflon/PTFE inner tube forms the inner diameter) may be approximately 1½ to 2½ times (at, e.g., 32 thou) the diameter of the filament 2 (at, e.g., 12-15, or 13 thou) shown therewithin. The inner diameter or inner width of the terminal cavity 714 (at, e.g., 40 thou) is from two to six times the diameter of the filament 2 shown therein. These are preferred ranges, it is considered the diameter of the receiving tube may be from 1 1/10 to 3 times the diameter of the filament, and the inner diameter of the terminal cavity from two to 12 times the diameter of the filament. The terminal cavity is preferably of larger diameter than the receiving tube.

FIG. 1C is a close-up cross-section of a fiber printhead assembly and a set of different possible compression/consolidation shapes, including continuous/random core reinforced filament shapes. That is, in the present disclosure, all descriptions referring to the continuous fiber filament 2, 2a or fiber reinforced composite filament 2, 2a may refer to a fiber reinforced composite filament 2, 2a including only continuous fibers 6a extending along the filament and a matrix material 4, 4a (e.g., polymer, ceramic, or metal) but also to a fiber reinforced composite filament 2, 2a including continuous fibers 6a extending along the filament and embedding a 1-20% (higher percentages, such as 30% or 40% are possible) volumetric proportion of short chopped fibers 6b (referred to as "chopped fiber", "fiber rods", or "short fiber" herein). The short chopped fibers 6b may be of the same material as the continuous fiber 6a or a different materiel. For example, a filament according to the present disclosure may include a carbon fiber continuous tow reinforcement 6a interspersed with short rods 6b of fiberglass, or a glass fiber continuous tow reinforcement interspersed with short rods 6b of carbon fiber, or any such combination. The short rods 6b may be randomly dispersed and oriented in random directions, but processes may also be applied during formation to orient at least a proportion of the rods nonrandomly. In either case, at least a proportion of the short rods 6b may extend transverse to the filament 2, and some rods 6b may stick out or be forced partially out of a filament to a neighboring swath of filament 2c or a neighboring bead of fill material 18a, either during deposition or during compaction. Some such rods 6b may extend in a direction with a Z component (e.g., vertically, or at an angle), or otherwise partially normal to an external surface of a deposited swath 2c, and some of these rods 6b may bridge layers in a Z direction or bridge neighboring fiber swaths 2c or beads 18a in X and/or Y directions.

It should be noted that neither the continuous fiber reinforcement 6a nor the "rods" are shown to scale in the drawings herein. A continuous fiber reinforcement may typically consist of 500, 1000, 2000 or more strands of fiber 6a within the filament 2. The aspect ratio of a rod (e.g., length:diameter) may be 20:1-200:1, commonly 40-60:1. The rods 6c may be strands of a fiber chopped to 0.05-2 mm length (optionally 0.2 mm up to 10 mm in length).

In addition, as shown in FIG. 1C, the heated composite filament ironing tip 726 is moved relative to the part, at a height above the part 14 of less than the filament diameter and scaled according to a desired proportion of composite swath, to iron the fiber reinforced composite filament 2 as it is deposited to reshape a substantially oval or circular bundle of inelastic axial fiber strands 6a within the fiber reinforced composite filament (including any embedded short or chopped fiber rods 6b) to a substantially flattened block of inelastic fibers strands within a bonded rank 2c of the part. Axial compression and/or laterally pressing the melted matrix filament 2 into bonded ranks may enhance final part properties by acting on either the strands 6a or the rods 6b or both. For example, FIG. 1C shows a composite fiber reinforced filament 2 applied with a compaction force, axial compression, or lateral pressure 62. The compaction pressure from axial compression and flattening from the ironing lip, compresses or reshapes the substantially circular cross-section filament 2a into the preceding layer below and into a second, substantially rectangular cross-section compacted shape 2c, as well as forcing rods 6b at or near the surface of the compacted shape 2c and/or layer below 2d or adjacent ranks to interact with or extend into any of fill material 18a, matrix 4a, neighboring strands 6a or neighboring rods 6b. The entire filament 2a forms a bonded rank 2c (i.e., bonded to the layer below 2d and previous ranks on the same layer) as it is shaped.

The filament 2c and/or interior strands 6a of the filament 2c and/or interior rods 6b spread and intrude into adjacent bonded ranks 2c or 2d on the same layer and the matrix material 4a and strands 6a or rods 6b are compressed into the underlying shaped filament or bonded rank of material 2d. This pressing, compaction, or diffusion of shaped filaments or bonded ranks 2c, 2d reduces the distance between reinforcing fibers, and increases the strength of the resultant part (and replaces techniques achieved in composite lay-up using post-processing with pressure plates or vacuum bagging). Accordingly, in some embodiments or aspect of the invention discussed herein, the axial compression of the filament 2 and/or especially the physical pressing by the printer head 70, conduit nozzle or ironing lip 726 in zone 3040 may be used to apply a compression/compaction/consolidation pressure directly to the deposited material or bonded ranks or composite swaths 2c to force them to spread or compact or flatten into the ranks beside and/or below. Additionally, the pressure may force rods 6b to interact with or extend into neighboring ranks beside or below and any of their components (fill material, matrix, strands 6a, rods 6b). Cross-sectional area is substantially or identically maintained.

Alternatively or in addition, pressure may be applied through a trailing pressure plate behind the print head; a full width pressure plate and/or roller 2138 (see, e.g., FIG. 2E) spanning the entire part that applies compaction pressure to an entire layer at a time; and/or heat, pressure, or vacuum may be applied during printing, after each layer, or to the part as a whole to reflow the resin in the layer and achieve the desired amount of compaction (forcing of walls together and reduction and elimination of voids) within the final part.

Figure 1E:
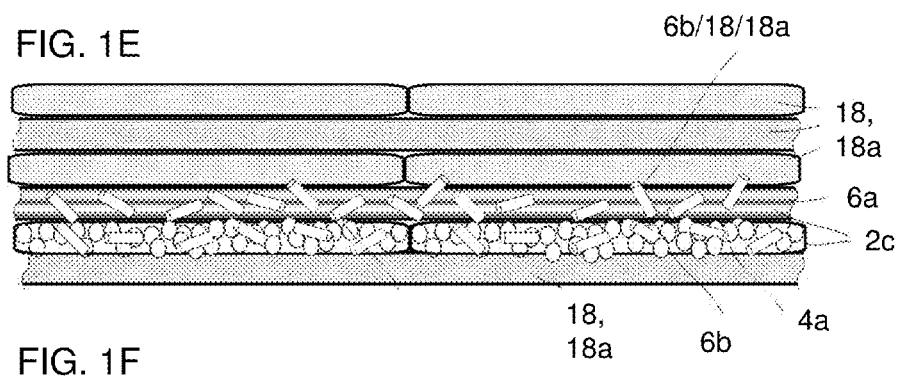
Figure 1F:
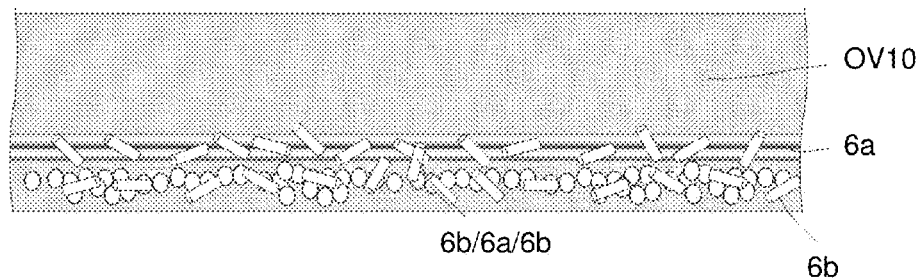
Figure 1G:
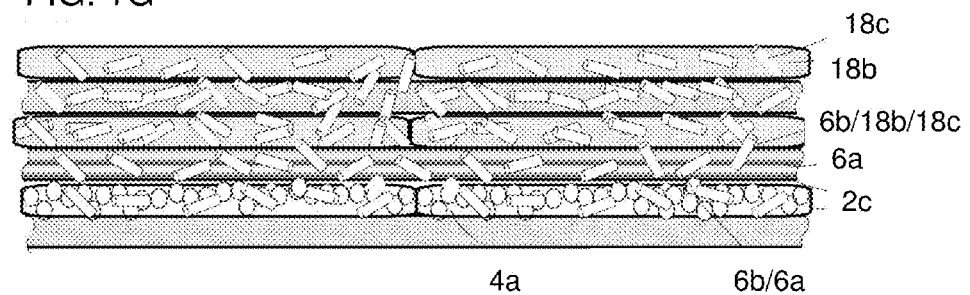

FIGS. 1E through 1G are cross-sections of 3D printed structures that may be deposited by the method and printer of the present disclosure, wherein FIG. 1E shows continuous/random core fiber reinforced filament deposited together with polymer, ceramic, or metal fill material, deposited by a 3D printer (e.g., FDM, SLA, or other technique); FIG. 1F shows continuous/random core fiber reinforced filament overmolded with a polymer, ceramic, or injection or other molding OV10, or continuous (substantially non-layered or micro-layered) additive manufacturing; and FIG. 1G shows continuous/random core fiber reinforced filament deposited together and interacting with polymer, ceramic, or metal fill material that includes a proportion (e.g., 5-20%) of short (e.g., 1/10 to 2 mm length, but potentially up to 10 mm) chopped fiber (e.g., carbon, glass, aramid or the like).

In the example shown in FIG. 1E, the lowest layer shown may be at or near a floor of a part and the pattern of FIG. 1E may be substantially similar at or near a roof of a part. As shown in FIG. 1E, the lowest layer is a layer of 3D printed resin, polymer, ceramic or metal fill material 18a. Two ranks 2c are shown deposited upon the lowest layer, next to one another. Within each rank, continuous fiber strands 6a extend along the length of the deposited core reinforced filament or swath, and short fiber rods 6b are substantially randomly arranged within the ranks. As shown, at least a proportion of the short fiber rods 6b extend, under the application pressure that flattens the filament, into neighboring (below or beside) swaths or layers. The third layer depicted extends with fiber strands 6a oriented in a direction substantially 90 degrees turned from the strands 6a in the layer below, with ranks of fiber reinforcement in this layer also including continuous strands 6a extending substantially along the entire filament (e.g., for the lengths of entire segments of filament as they are deposited and cut) as well as rods 6b dispersed therein. This arrangement creates strong reinforcement in each of the directions of the continuous fiber strands 6a as well as strong interactions between the swaths and beads of fiber reinforcement 2 and fill material 18a. As noted herein, further layers of fiber reinforcement may be deposited in quasi-isotropic, concentric, or other patterns. Three layers of fill material 18a (in FIG. 1E, the fourth through sixth layers from the bottom) are deposited above the last fiber swaths 2c.

In the example shown in FIG. 1F, as discussed with respect to injection molding and overmolding herein, either the fill material 18a or the matrix 4a of FIG. 1E, or both, would have been deposited instead as soluble material or in the same material as an injection molding material to overmold the FIG. 1E with overmold OV10, treating FIG. 1E in this instance as either a soluble preform or a fiber reinforcement preform or both. FIG. 1F shows the fiber material, both fiber strands 6a and short fiber rods 6b, overmolded with overmold OV10 and embedded in an overmolded reinforced molding. In this instance, the short fiber rods 6b bridge between the continuous fibers 6a and the injection molding material of the overmold OV10.

In the example shown in FIG. 1G, in contrast to the example shown in FIG. 1E, the fill material 18 now includes both a matrix material 18a and short fiber rods 18b. Accordingly, continuous reinforced fiber filament is printed together with randomly reinforced fiber filament. Additionally, the continuously reinforced fiber filament reinforced with continuous fibers 6a is additionally randomly or omnidirectionally reinforced by rods 6b. As shown in FIG. 1G, the lowest layer is a layer of 3D printed fill material 18a having a polymer, ceramic, or metal matrix and a random or omnidirectionally dispersed short chopped fiber 18b. Again, two ranks 2c are shown deposited upon the lowest layer, next to one another. Within each rank 2c, continuous fiber strands 6a extend along the length of the deposited core reinforced filament or swath, and short fiber rods 6b are substantially randomly arranged within the ranks. As shown, at least a proportion of the short fiber rods 6b extend, under the application pressure that flattens the filament, into neighboring (below or beside) swaths or layers. Distinct from FIG. 1E, in this case, the neighboring swaths or layers also include short fiber rods 6b. The third layer depicted extends with fiber strands 6a oriented in a direction substantially 90 degrees turned from the strands 6a in the layer below, with ranks of fiber reinforcement in this layer also including continuous strands 6a extending substantially along the entire filament 2 (e.g., for the lengths of entire segments of filament 2 as they are deposited and cut) as well as rods 6b dispersed therein. This arrangement creates strong reinforcement in each of the directions of the continuous fiber strands 6a as well as strong interactions between the swaths and beads of fiber reinforcement 2 (and its matrix 4a and strands and rods 6a, 6b) and fill material 18a (and its matrix and rods 18b). As noted herein, further layers of fiber reinforcement may be deposited in quasi-isotropic, concentric, or other patterns. Three layers of fill material 18 (in FIG. 1E, the fourth through sixth layers from the bottom) are deposited above the last fiber swaths 2c.

In one variation, as shown in FIG. 1F, the chopped rod 18b reinforced fill material 18a may be used together with pure polymer, ceramic, or metal fill material 18a (e.g., as shown, in the lowest layer). In another variation, not shown, core reinforced filament 2 without fiber rods 6b but only with continuous fiber 6a may be deposited together with any of pure polymer, ceramic, or metal fill material 18a, and/or chopped fiber reinforced fill material 18a (with polymer, ceramic, or metal matrix and chopped fiber rods 18b), and/or core reinforced filament 2 including both continuous fiber 6a and dispersed chopped rods 6b. As noted herein, none of the materials of the reinforcement need be the same among the reinforcing rods 18b of the chopped reinforced fill material 18a, the reinforcing continuous strands 6a of the core reinforced filament, or the reinforcing chopped short fiber rods 6b of the core reinforced filament; however, the matrix material 4a and/or fill material matrix and/or fill material 18a should be of the same polymer; of related polymer; of related copolymer; of compatible polymer or copolymer; or of strongly adhering polymers.

As discussed herein, a three dimensional printer 1000 for additive manufacturing of a part may include a supply of a combined continuous/random fiber reinforced composite filament 2 including a plurality of axial fiber strands 6a extending substantially continuously within a matrix material 4 of the fiber reinforced composite filament as well as a multiplicity of short chopped fiber rods 6c extending at least in part randomly within the same matrix material 4. A a deposition head (e.g., 10, 199) including a conduit continuously transitioning to a substantially rounded outlet tipped with an ironing lip 726 may be driven by a deposition head drive that drives the ironing lip to flatten the fiber reinforced composite filament 2 against previously deposited portions of the part, as the matrix material 4, and a first proportion of the short chopped fiber rods 6b, are flowed (e.g., short rods 6b internal to the filament, amongst the inner strands 6a, may move with the flow) interstitially among the axial fiber strands 6a spread by the ironing lip 726, and force a second proportion of the short chopped fiber rods 6b (e.g., those near the outer surface, on the outer surface or extending through the outer surface of the filament 2) against previously deposited portions of the part. A filament drive may push an upstream portion of the solidified fiber reinforced composite filament (e.g., more force transmitted along the filament by the continuous strands 6a than the dispersed rods 6b) to force the unattached terminal end of the fiber filament 2 through the conduit to exit the conduit at the ironing lip 726. A controller 20 operatively connected to the filament drive and the deposition head drive may direct these actions.

Alternatively, or in addition, a method for manufacturing a part 14 may include supplying a core reinforced filament 2 having a solidified matrix material 4 impregnating reinforcing strands 6a aligned along the core reinforced filament 2 and impregnating reinforcing chopped fiber rods 6b in part transverse to the core reinforcing strands 6a. The core reinforced filament 2 may be received in a cutter 8 and cut there. The cut core reinforced filament 2 may be received in a nozzle 708 and heated as it 2 is displaced out of the nozzle 708. A dragging force may be applied from the part 14 via the reinforcing strands 6a but not via the reinforcing chopped fiber rods 6b (or, the dragging force may be greater via the reinforcing strands 6a than via the reinforcing rods 6b). Pressure may be applied with the nozzle 708 to continuously compact the core reinforced filament 2 as the core reinforced filament 2 is fused into the part 14, and also to continuously embed a proportion of the short chopped fiber rods 6b (e.g., those near the outer surface, on the outer surface or extending through the outer surface of the filament 2) against previously deposited portions of the part 14. The compacted core reinforced filament 2c, 2d may be fused into the part.

Alternatively, or in addition, a method for manufacturing a part 14 may include supplying a core reinforced filament 2 having a matrix material impregnating continuous reinforcing strands 6a extending along the entire length of the core reinforced filament 2 and a proportion of first chopped fiber rods 6b, at least some of which are oriented transversely to the continuous reinforcing strands 6a. A fill material 18a may be supplied separately from the core reinforced filament 2 and including a second chopped fiber rods 18b. The core reinforced filament 2, as shown in FIGS. 1D-1F and/or 5A-5N and/or 4A-4J, may be deposited within a first region formed in an outward portion of a part 14 that is closer to an outer wall of the part than to a centroid of the part 14. Pressure may be applied with a heated nozzle tip 726 to continuously melt and compact the core reinforced filament 2, 2c as the core reinforced filament 2, 2c is fused into the layer of the part 14 and to continuously embed a proportion of the first chopped fiber rods 6b against a previously deposited core reinforced filament 2 including first chopped fiber rods 6b. Pressure may also be applied with the heated nozzle tip 726 to continuously melt and compact the core reinforced filament 2, 2c as the core reinforced filament 2, 2c is fused into the layer of the part 14 and to continuously embed a proportion of the first chopped fiber rods 6b against a previously deposited fill material 18 including second chopped fiber rods 18c. The fill material 18, as shown in FIGS. 1D-1F and/or 5A-5N and/or 4A-4J, may be deposited within a second region formed in a portion of the part 14 that is positioned inward from the first region.

Figure 2A:
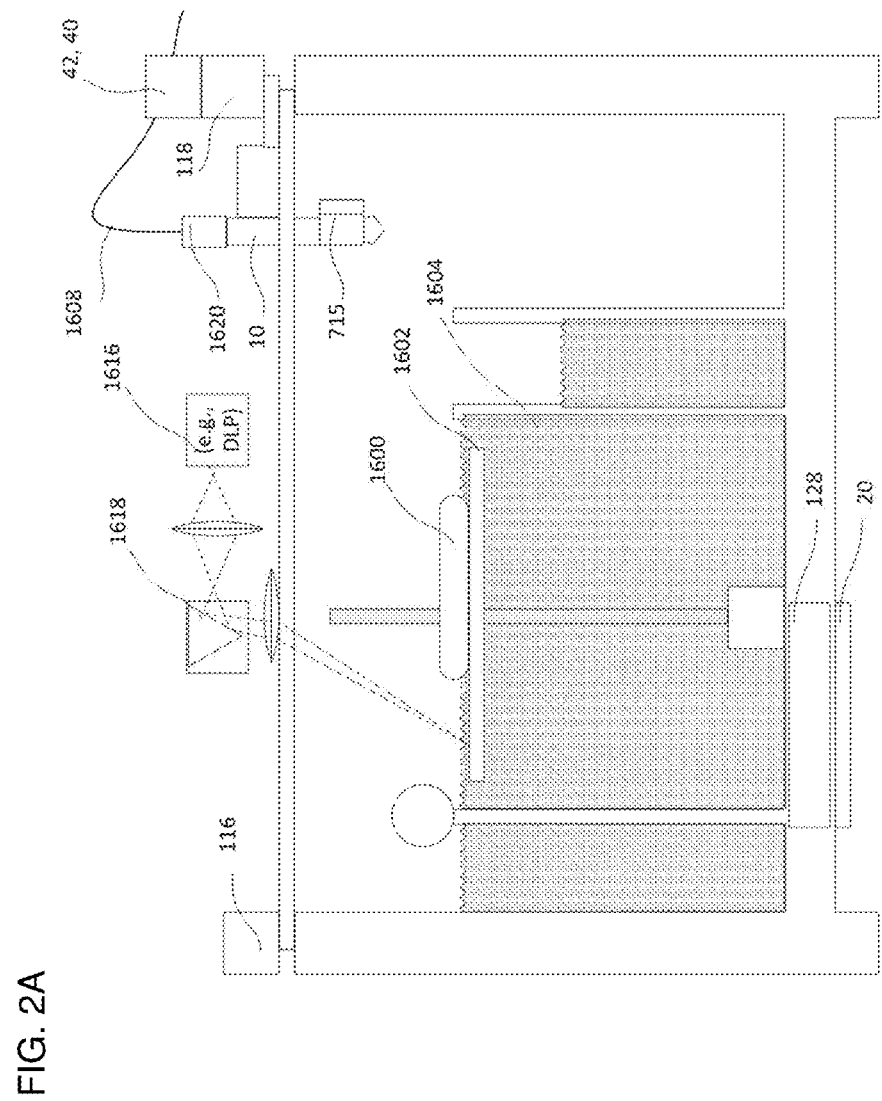

FIGS. 2A-2H depict embodiments of a three dimensional printer in applying a fiber reinforced composite filament 2 together with DLP-SLA, SLA, SLS, "polyjet" or other techniques to build a structure. Like numbered or like appearance features may be similar to those described with respect to FIG. 1. FIGS. 2A and 2B depict a hybrid system employing stereolithography (and/or selective laser sintering) to provide the matrix about the embedded fiber, i.e.

processes in which a continuous resin in liquid or powder form is solidified layer by layer by sweeping a focused radiation curing or melting beam (laser, UV) in desired layer configurations. In order to provide increased strength as well as the functionalities associated with different types of continuous core filaments including both solid and multistrand materials, the stereolithography process associated with the deposition of each layer can be modified into a two-step process that enables construction of composite components including continuous core filaments in desired locations and directions. A continuous core or fiber may be deposited in a desired location and direction within a layer to be printed, either completely or partially submerged in the resin. After the continuous fiber is deposited in the desired location and direction, the adjoining resin is cured to harden around the fiber. This may either be done as the continuous fiber is deposited, or it may be done after the continuous fiber has been deposited. In one embodiment, the entire layer is printed with a single continuous fiber without the need to cut the continuous fiber. In other embodiments, reinforcing fibers may be provided in different sections of the printed layer with different orientations. In order to facilitate depositing the continuous fiber in multiple locations and directions, the continuous fiber may be terminated using a cutter as described herein, or by the laser that is used to harden the resin.

FIG. 2B depicts a part 1600 being built on a platen 1602 using stereolithography or selective layer sintering. The part 1600 is immersed in a liquid resin (photopolymer) material or powder bed 1604 contained in a tray 1606. During formation of the part 1600, the platen 1602 is moved by a layer thickness to sequentially lower after the formation of each layer to keep the part 1600 submerged. During the formation of each layer, a continuous core filament 1608 is fed through a conduit nozzle 1610 and deposited onto the part 1600. The conduit nozzle 1610 is controlled to deposit the continuous core filament 1608 in a desired location as well as a desired direction within the layer being formed. The feed rate of the continuous core filament 1608 may be equal to the speed of the conduit nozzle 1610 to avoid disturbing the already deposited continuous core filaments. As the continuous core filament 1608 is deposited, appropriate electromagnetic radiation (e.g., laser 1612) cures or sinters the resin surrounding the continuous core filament 1608 in a location 1614 behind the path of travel of the conduit nozzle 1610. The distance between the location 1614 and the conduit nozzle 1610 may be selected to allow the continuous core filament to be completely submerged within the liquid resin or powder prior to curing. The laser is generated by a source 1616 and is directed by a controllable mirror 1618. The three dimensional printer also includes a cutter 1620 to enable the termination of the continuous core filament as noted above.

Optionally, the deposited filament is held in place by one or more "tacks", which are a sufficient amount of hardened resin material that holds the continuous core filament in position while additional core material is deposited. As depicted in FIG. 2C, the continuous core filament 1608 is tacked in place at multiple discrete points 1622 by the laser 1612 as the continuous core filament is deposited by a nozzle, not depicted. After depositing a portion, or all, of the continuous core filament 1608, the laser 1612 is directed along a predetermined pattern to cure the liquid resin material 1604 and form the current layer. Similar to the above system, appropriate electromagnetic radiation (e.g., laser 1612), is generated by a source 1616 and directed by a controllable mirror 1618. The balance of the material can be cured to maximize cross linking between adjacent strands is maximized, e.g., when a sufficient number of strands has been deposited onto a layer and tacked in place, the resin may be cured in beads that are perpendicular to the direction of the deposited strands of continuous core filament. Curing the resin in a direction perpendicular to the deposited strands may provide increased bonding between adjacent strands to improve the part strength in a direction perpendicular to the direction of the deposited strands of continuous core filament. If separate portions of the layer include strands of continuous core filament oriented in different directions, the cure pattern may include lines that are perpendicular or parallel to the direction of the strands of continuous fibers core material in each portion of the layer.

Figure 2D:
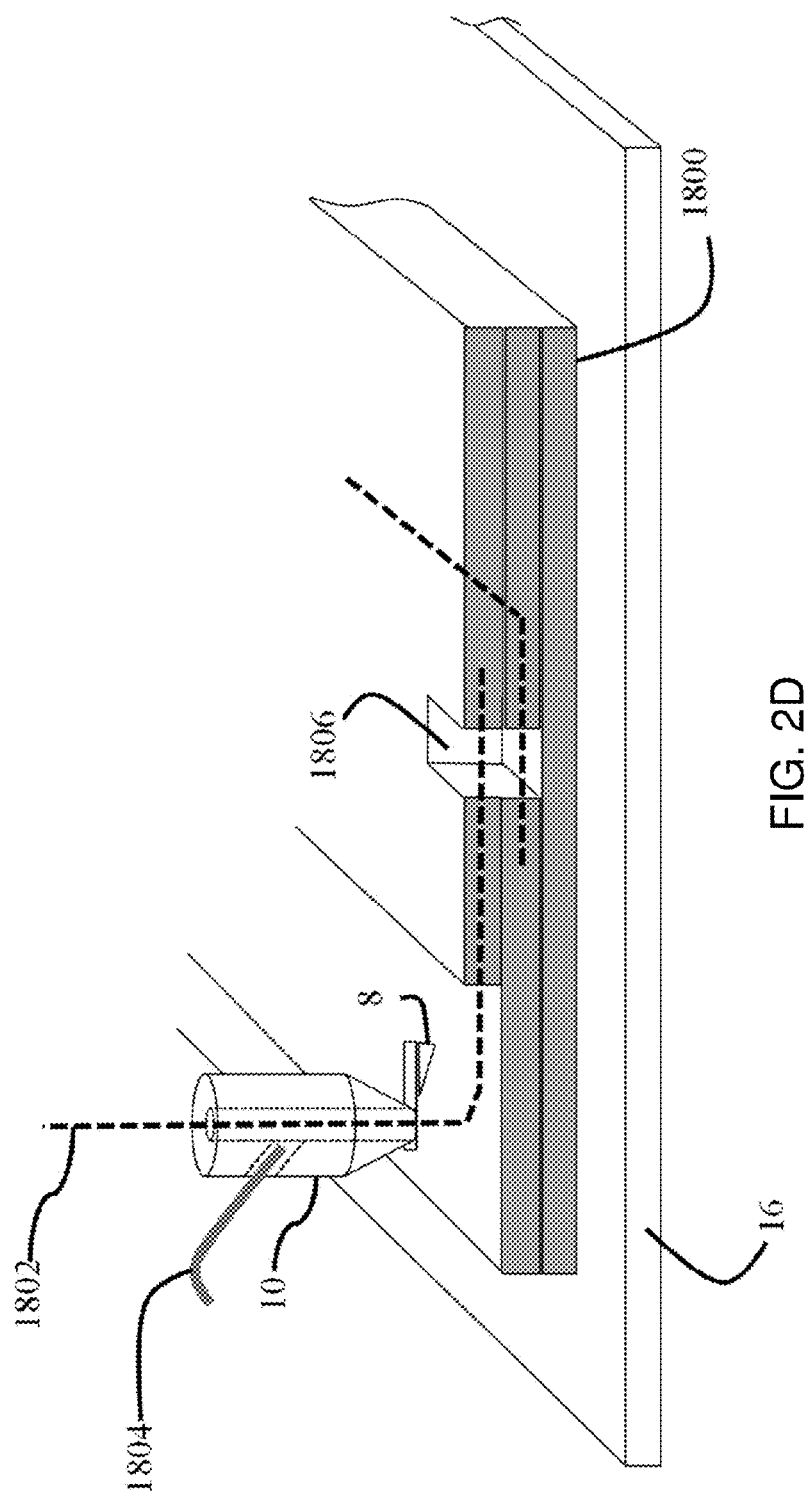
FIG. 2D is a schematic representation of a three dimensional printing system being used to form multiple layers in a printed circuit board, which may be embedded in a reinforced molding as disclosed herein.

FIG. 2D depicts printing of a multi-layer PCB 1800, on a build platen 16. The PCB 1800 is formed with a conductive core material 1802 and an insulating material 1804 which are deposited using a printer head including a heated extrusion nozzle 10 and cutting mechanism 8. Similar to the multielement printer head, the conductive core material 1802 and insulating material 1804 may be selectively deposited either individually or together. Further, in some embodiments the conductive core material 1802 is solid to minimize the formation of voids in the deposited composite material. When the conductive core material 1802 is printed without the insulating material 1804 a void 1806 can be formed to enable the subsequent formation of vias for use in connecting multiple layers within the PCB 1800. Depending on the desired application, the void 1806 may or may not be associated with one or more traces made from the conductive core material 1802.

Figure 2E:
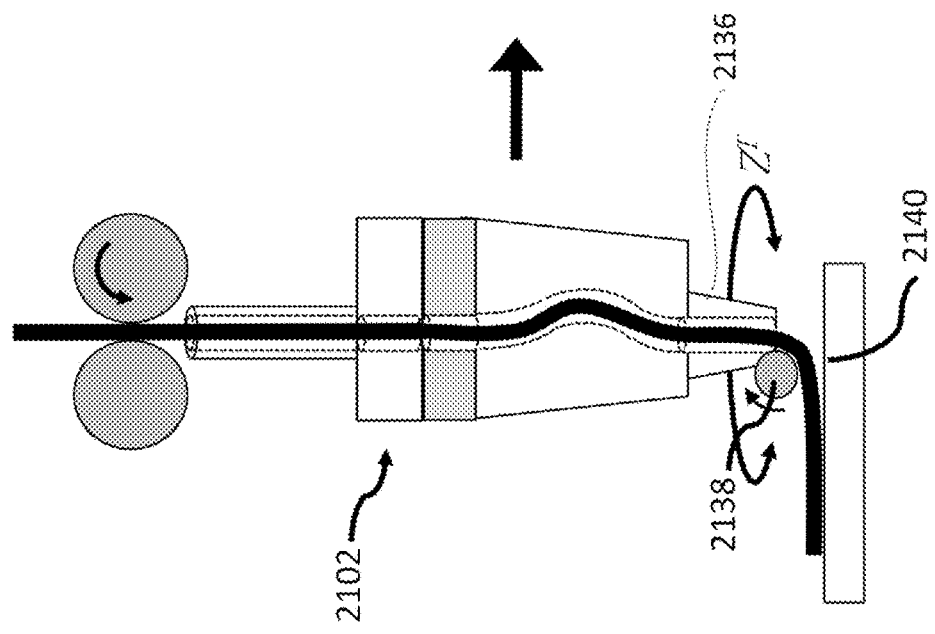
FIG. 2E is a schematic representation of a rotatable printing nozzle including a following feeding and compression roller.

When desirable, a precision roller set can be used to maintain a constant thickness along a relatively wider width of material output from a print head 2102. Such an embodiment may be of use when dealing with wider materials such as flat towpregs. FIG. 2E shows a print head 2102 translating in a first direction. A nozzle 2136 of the print head is attached to a trailing compression roller 2138. The roller 2138 imparts a compressive force to the material deposited onto print bed 2140. Depending on the embodiment, the trailing roller 2138 can articulate around the Z axis using any number of different mechanisms. For example, in one embodiment, the print head 2102 is free-rotating on a bearing (e.g., adding a fourth degree of freedom), such that the roller always trails the direction of travel of the print head. In another embodiment, the entire print head 402 is constructed to rotate (e.g., adding a fourth degree of freedom). Alternatively or in addition, the print bed 2140 may be rotated (e.g., as a fourth or fifth degree of freedom) to achieve the desired trailing and displacement.

Figure 2F:
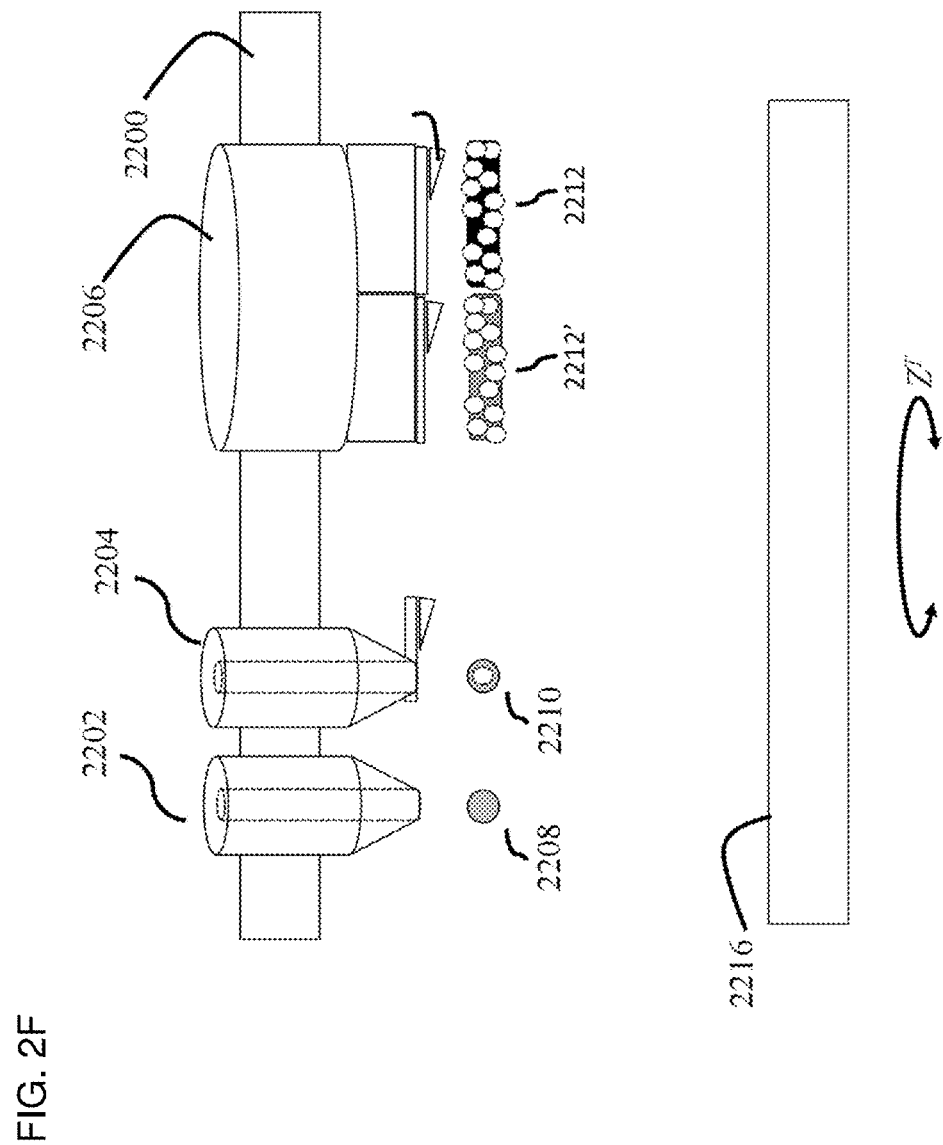
FIG. 2F is a schematic representation of a multi-nozzle three-dimensional printer.

FIG. 2F shows one embodiment of a high-speed continuous core printer capable of using the above described materials. In the depicted embodiment, the printer includes a print arm 2200 including a plurality of nozzles. The nozzles include a pure resin nozzle 2202 adapted to print pure resin (e.g., as fill material) 2208. The print arm 2200 also includes a continuous core filament nozzle 2204 adapted to print a continuous core filament 2210 for use in fine detail work. Additionally, the print arm 2200 includes a tape dispensing head 2206 capable of printing one or more printable tapes 2212. The tape dispensing head enables large infill sections to be printed quickly using the noted printable tapes. However, fine detail work and gaps that cannot be filled in by the tape can be filled by either the pure resin nozzle 2202 or continuous core filament nozzle 2204. The above noted method and system using wide tape fills greatly improves the speed of a printer, enabling higher throughput, and commensurately lower cost.

Figure 2G:
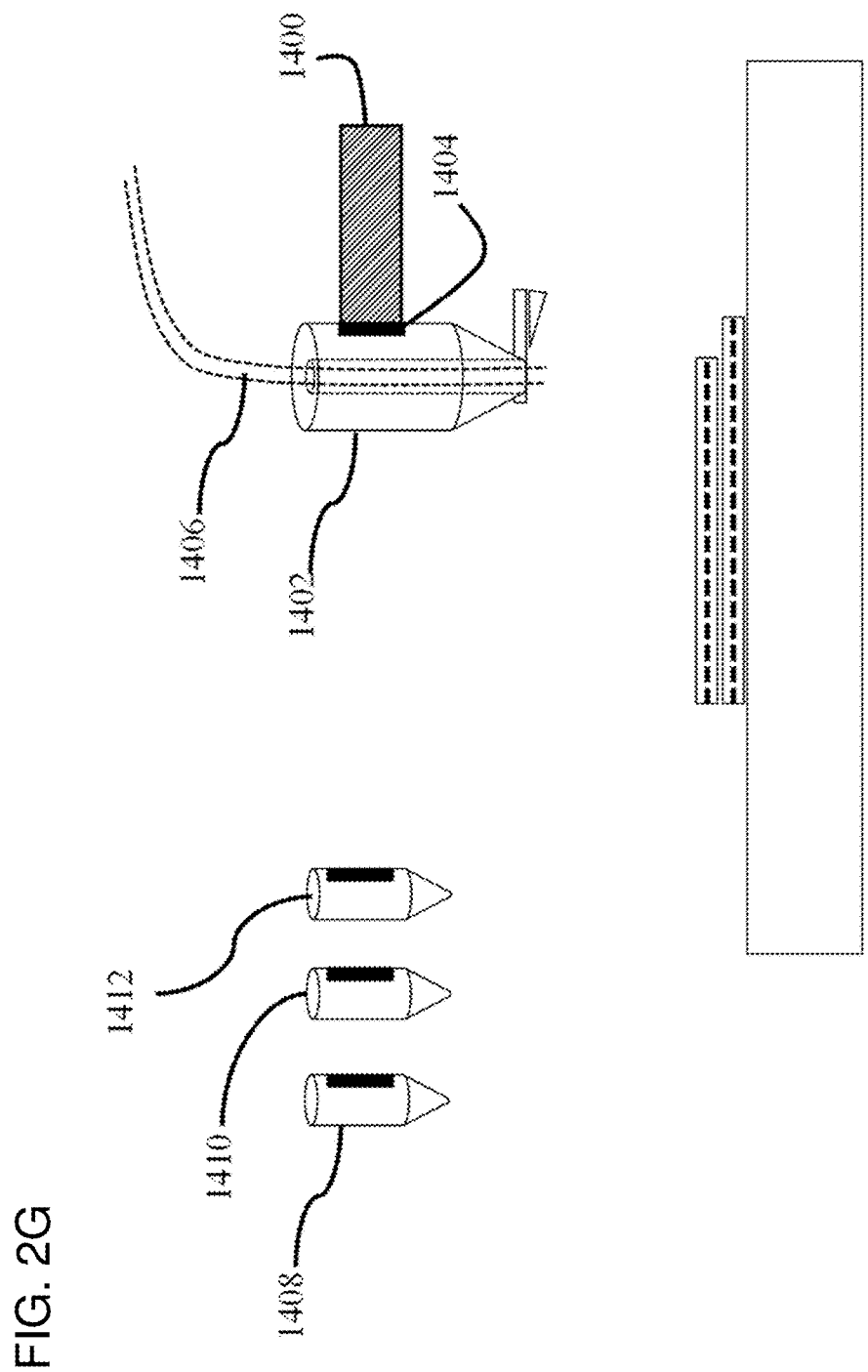
FIG. 2G is a schematic representation of a three dimensional printing system including a print arm (e.g., a robot arm having 4 or more degrees of freedom) and selectable printer heads.

In FIG. 2G, an (e.g., robot arm) print arm 1400 is capable of attaching to printer head 1402 at a universal connection 1404. A continuous core reinforced filament 1406 may be fed into the printer head 1402 before or after attachment to the printer 1400. The print arm 1400 may return the printer head 1402 to an associated holder or turret and then pick up printer head 1408 or 1410 for printing filament and other consumables different in size, material, color, coating, and/ or spray; or even a vision system 1412 (e.g., camera, rangefinder) for part inspection.

Figure 2H:
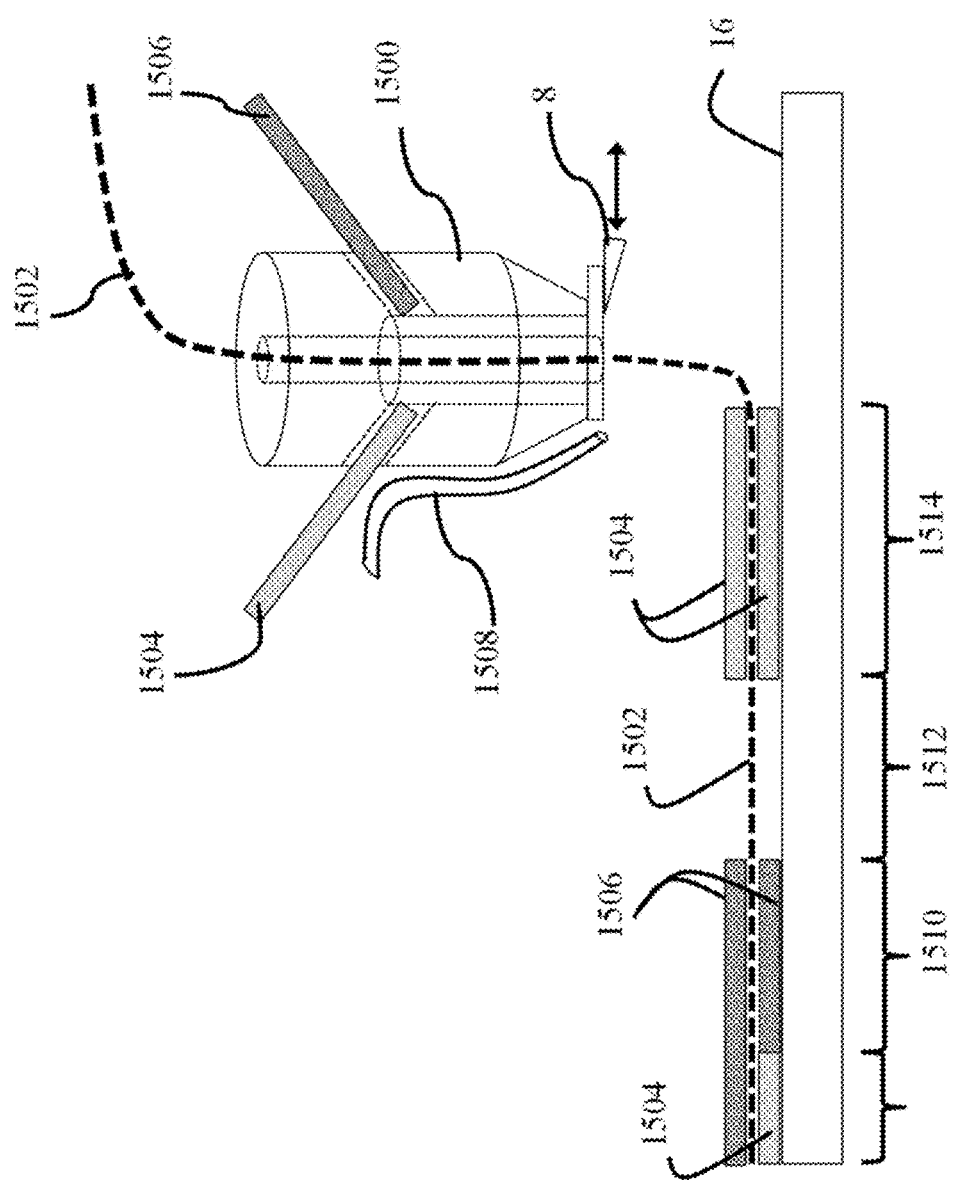
FIG. 2H is a schematic representation of a multi-element printer head for use in the printing system.

The continuous core reinforced filament may be formed by adding a resin matrix or coating to a solid continuous core or a prepreg in a heated conduit or extrusion nozzle. FIG. 2H depicts a multi-element printer head 1500 that selectively combines (in any feasible combination) and extrudes material feed options core 1502 (e.g., continuous copper wire, continuous fiber, stranded prepreg wire or fiber), matrix 1504 (e.g., binding resin such as nylon), and support 1506 (e.g., a dissolvable support material). For example, a core 1502 might be surrounded by a matrix binder 1504 on the bottom surface and a dissolvable/soluble support 1506 on the top surface (e.g., section 1508). The multi-element printer head 1500 may also deposit the core 1502 coated with either the matrix binder 1504 or soluble support 1506 separately (e.g., sections 1510 and 1514), or e.g., deposit any of the materials individually (e.g., the bare core or copper wire at section 1512).

As shown in FIG. 2H, multi-element printer head 1500 (or any other print head embodiment depicted herein) may include an air nozzle 1508 which enables pre-heating of the print area and/or rapid cooling of the extruded material to aid in forming structures such as flying leads, gap bridging, and other similar features. For example, a conductive core material may be deposited by the multi-element printer head 1500 with a co-extruded insulating plastic, to form a trace in the printed part. The end of the trace may then be terminated as a flying lead (the multi-element printer head lifts and deposits the core and jacket), optionally cooling the insulating jacket with the air nozzle 1508. The end of the wire could then be printed as a "stripped wire" where the conductive core is extruded without the insulating jacket. The cutting mechanism 8 may then terminate the conductive core. Formation of a flying, uninsulated lead in the above-noted manner may be used to eliminate a later stripping step.

Fully optionally, in addition, one of the two opposing wheels, typically the idler wheel, may include a relative or absolute encoder for rotation count or speed, enabling the controller 20 to sense either or both of a slip or a jam in the fiber or an out-of-fiber condition (e.g., if gap between wheels 40, 42 is a fixed gap advancing the fiber, and the drive wheel 40 is commanded to advance the fiber, yet the idler wheel encoder does not advances, this may mean the fiber is slipping or jammed or no longer supplied, with a stall condition of the motor in addition being determined to be a slip or jam rather than an out-of-fiber condition).

Figure 3:
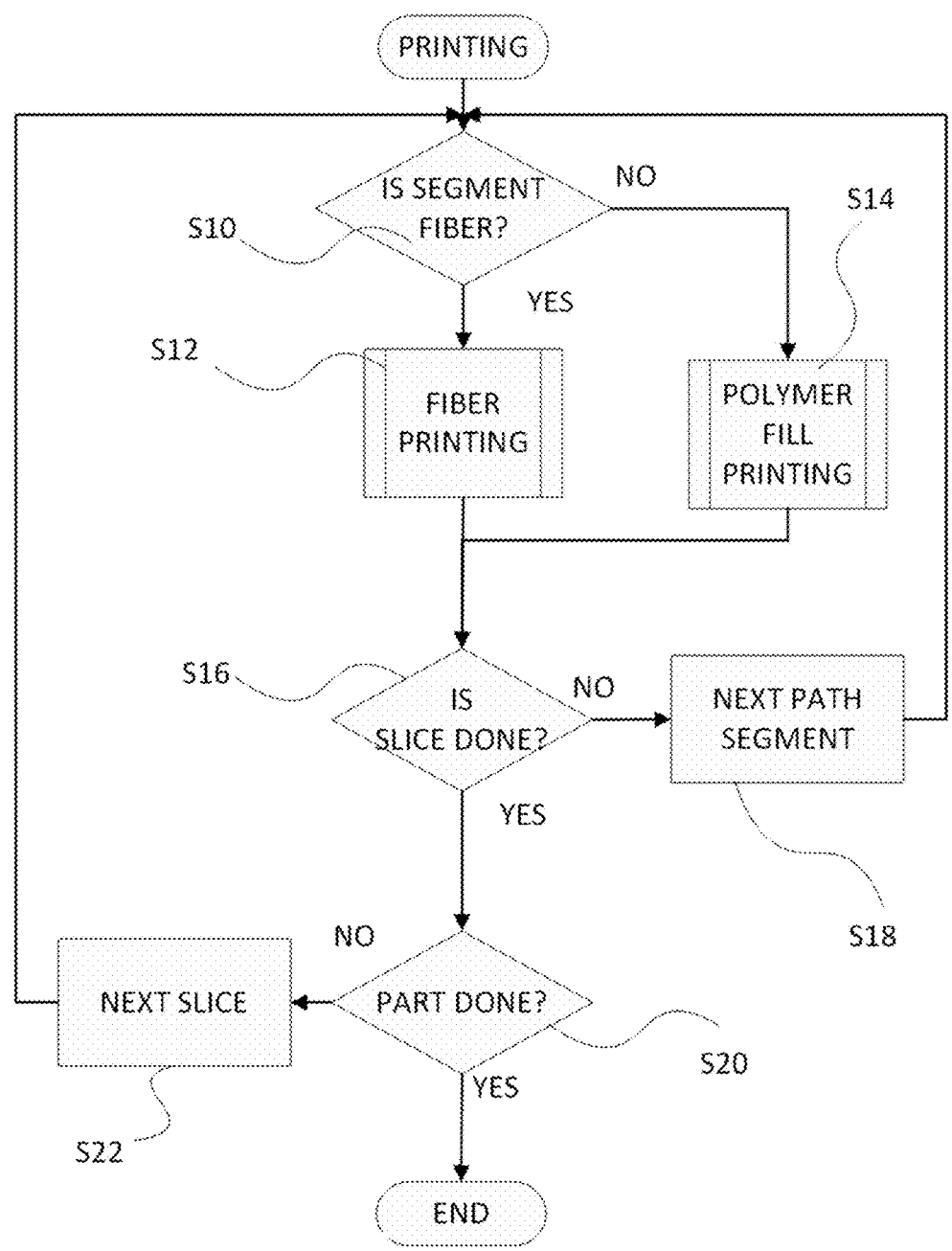
FIG. 3 is a flow chart describing the overall operation of the 3D printer of FIG. 3.

FIG. 3 depicts a block diagram and control system of the three dimensional printer which controls the mechanisms, sensors, and actuators therein, and executes instructions to perform the control profiles depicted in and processes described herein. A printer is depicted in schematic form to show possible configurations of e.g., three commanded motors 116, 118, and 120. It should be noted that this printer may include the compound assembly of printheads 199, 1800 depicted in FIG. 1C.

As depicted in FIG. 1D, the three-dimensional printer 3001 includes a controller 20 which is operatively connected to the fiber head heater 715, the fiber filament drive 42 and the plurality of actuators 116, 118, 120, wherein the controller 20 executes instructions which cause the filament drive to deposit and/or compress fiber into the part. The instructions are held in flash memory and executed in RAM (not shown; may be embedded in the controller 20). An actuator 114 for applying a spray coat, as discussed herein, may also be connected to the controller 20. In addition to the fiber drive 42, a filament feed 1830 be controlled by the controller to supply the extrusion printhead 1800. A printhead board 110, optionally mounted on the compound printhead 199, 1800 and moving therewith and connected to the main controller 20 via ribbon cable, breaks out certain inputs and outputs. The temperature of the ironing tip 726 may be monitored by the controller 20 by a thermistor or thermocouple 102; and the temperature of the heater block holding nozzle 1802 of any companion extrusion printhead 1800 may be measured by a thermistor or thermocouple 1832. A heater 715 for heating the ironing tip 726 and a heater 1806 for heating the extrusion nozzle 1802 are controlled by the controller 20. A heat sink fan 106 and a part fan 108, each for cooling, may be shared between the printheads 199, 1800 and controlled by the controller 20. Rangefinder 15 is also monitored by the controller 20. The cutter 8 actuator, which may be a servomotor, a solenoid, or equivalent, is also operatively connected. A lifter motor for lifting one or either printhead 199, 1800 away from the part (e.g., to control dripping) may also be controlled. Limit switches 112 for detecting when the actuators 116, 118, 120 have reached the end of their proper travel range are also monitored by the controller 20.

As depicted in FIG. 1D, an additional breakout board 122, which may include a separate microcontroller, provides user interface and connectivity to the controller 20. An 802.11 Wi-Fi transceiver connects the controller to a local wireless network and to the Internet at large and sends and receives remote inputs, commands, and control parameters. A touch screen display panel 128 provides user feedback and accepts inputs, commands, and control parameters from the user. Flash memory 126 and RAM 130 store programs and active instructions for the user interface microcontroller and the controller 20.

FIG. 3 depicts a flowchart showing a printing operation of the printers 1000 in FIGS. 1-2. FIG. 3 describes, as a coupled functionality, control routines that may be carried out to alternately and in combination use the co-mounted FFF extrusion head 1800 and fiber reinforced filament printing head 199 of FIG. 1A-1D.

In FIG. 3, at the initiation of printing, the controller 20 determines in step S10 whether the next segment to be printed is a fiber segment or not, and routes the process to S12 in the case of a fiber filament segment to be printed and to step S14 in the case of other segments, including e.g., base, fill, or coatings. Step S12 is described in detail with reference to FIG. 2. After each or either of routines S12 and S14 have completed a segment, the routine of FIG. 3 checks for slice completion at step S16, and if segments remain within the slice, increments to the next planned segment and continues the determination and printing of fiber segments and/or non-fiber segments at step S18. Similarly, after slice completion at step S16, if slices remain at step S20, the routine increments at step S22 to the next planned slice and continues the determination and printing of fiber segments and/or non-fiber segments. "Segment" as used herein corresponds to "toolpath" and "trajectory", and means a linear row, road, or rank having a beginning and an end, which may be open or closed, a line, a loop, curved, straight, etc. A segment begins when a printhead begins a continuous deposit of material, and terminates when the printhead stops depositing. A "slice" is a single layer or lamina to be printed in the 3D printer, and a slice may include one segment, many segments, lattice fill of cells, different materials, and/or a combination of fiber-embedded filament segments and pure polymer segments. A "part" includes a plurality of slices to build up the part. FIG. 3's control routine permits dual-mode printing with two different printheads, including the compound printheads 199, 1800 of FIG. 1A-1D.

All of the printed structures previously discussed may be embedded within a molded article during a molding process, as discussed herein, expressly including reinforced fiber structures of any kind, sparse, dense, concentric, quasi-isotropic or otherwise as well as fill material or plain resin structures. In addition, in all cases discussed with respect to embedding in injection molding, structures printed by fill material head 18 using thermoplastic extrusion deposition may be in each case replaced with soluble material (e.g., soluble thermoplastic or salt) to form a soluble preform which may form a printing substrate for fiber reinforcement and then removed, leaving a continuous fiber reinforced preform. All continuous fiber structures discussed herein, e.g., sandwich panels, shells, walls, reinforcement surrounding holes or features, etc., may be part of a continuous fiber reinforced preform.

That is, the present disclosure contemplates a method of fabricating a reinforced molding, where a "molding" is used as a noun and a reinforced molding comprises a molded, finished article with a skeletal or dense internal reinforcement formed by a continuous fiber structure. Using the 3D printer herein discussed with reference to FIGS. 1-3 inclusive, which may deposit either fill material, soluble material, or continuous fiber, the reinforcing fiber is additively deposited in a reinforcement volume to form a continuous fiber reinforcement preform. A preform may be a substrate against which further layers of 3D printing are deposited (fill material, soluble material, or continuous fiber) or a shape to be embedded within a molded article, or both. For example, a continuous fiber reinforcement preform is located within a mold of a molding apparatus (such as an injection mold's internal cavity, large enough and shaped appropriately to receive the reinforcement preform). The mold is loaded (e.g., injected or otherwise filled) with molten, flowable and/or optionally substantially isotropic molding material (e.g., thermoplastic, curable plastic, thermoset, metal, or the like, optionally including chopped fibers or dispersed particulates). Injection under heat and pressure of fluidized thermoplastic is "loading". The molding material is hardened (e.g., cooled or cured) to overmold the continuous fiber reinforcement preform with the molding material, thereby forming a reinforced molding surrounding an internal continuous fiber reinforcement preform with a hardened substantially isotropic molding material. The reinforcement volume is smaller than a volume of the entire reinforced molding.

Figure 13:
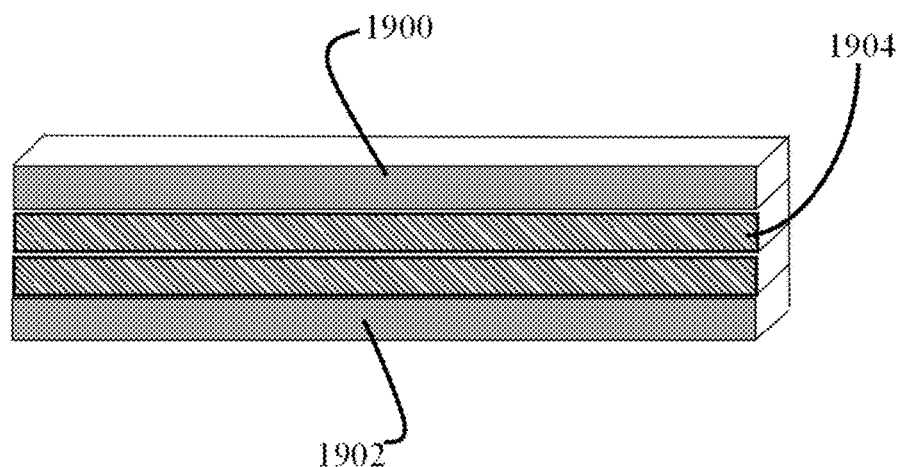
FIG. 13 is a schematic representation of a composite part formed using three-dimensional printing methods.

For example, a schematic representation of a composite structure is depicted in FIG. 13 which shows a sandwich panel composite part. This sandwich panel composite part may form part of or the entirety of a continuous fiber reinforcement preform that is later embedded in a molded article (reinforced molding). The top section 1900, and bottom section 1902, are printed using a continuous core reinforced filament to form relatively solid portions. In contrast, the middle section 1904 may be printed such that it has different properties than the top section 1900 and the bottom section 1902. The middle section 1904 may be printed either as fill material (to be retained within the reinforced molding), soluble material or a soluble preform (to be dissolved away before or during overmolding of the sandwich panel structure within the mold) or as fiber honeycomb (again, to be retained within the reinforced molding). For example, the middle section 1904 may include multiple layers printed in a honeycomb pattern using a continuous core reinforced filament, a pure resin, or even a three dimensionally printed foaming material. This enables the production of a composite part including a lower density core using a three dimensional printer, and this part may be a skeletal or reinforcement structure for a reinforced molding.

Figure 14:
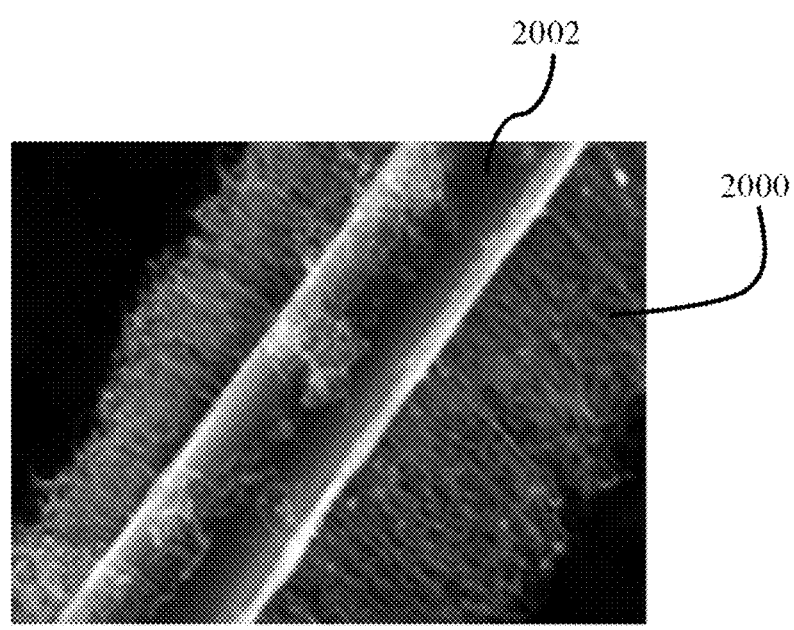
FIG. 14 is a scanning electron microscope image of a reinforcing carbon fiber and perpendicularly arranged carbon nanotubes.

In addition to using the continuous core reinforced filaments to form various composite structures with properties in desired directions using the fiber orientation, each of which may form part of the reinforcement preform and be embedded in a reinforced molding, in some embodiments it is desirable to provide additional strength in directions other than the fiber direction. For example, the continuous core reinforced filaments might include additional composite materials to enhance the overall strength of the material or a strength of the material in a direction other than the direction of the fiber core. For example, FIG. 14 shows a scanning electron microscope image of a carbon fiber core material 2000 that includes substantially perpendicularly loaded carbon nanotubes 2002. Loading substantially perpendicular small fiber members on the core increases the shear strength of the composite, and advantageously increases the strength of the resulting part in a direction substantially perpendicular to the fiber direction. Such an embodiment may help to reduce the propensity of a part to delaminate along a given layer.

Figure 4A:
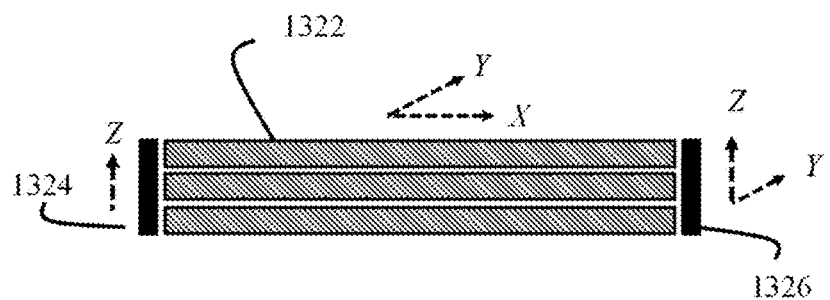
FIGS. 4A-4C show exemplary six-axis shell layup in contrasting directions.

FIGS. 4A-5P depict various parts formed using the printer head(s) depicted in FIGS. 1A-1D and/or 2A-2G. FIGS. 4A, 5A and 5O show a part including a plurality of sections 1322 deposited as two dimensional layers in the XY plane. These sections 1322 may be deposited as fill material 18 or as soluble material. If they are deposited as soluble material, they may form the soluble preform. Sections 1324 and 1326 are subsequently deposited in the ZY plane to give the part increased strength in the Z direction. As shown in FIGS. 4A and 5A, if sections 1322 are formed as the soluble preform or as soluble material and are dissolved away or removed prior to, during, or after overmolding and/or hardening the molding material to overmold OV1 the continuous fiber reinforcement preform, a fiber reinforced molding with an overmold OV1 surrounding an internal continuous fiber reinforcement preform is formed, the overmold OV1 being a hardened substantially isotropic molding material. In FIGS. 4A and 5A, a box-like or canister-like reinforced molding is formed with reinforcement concentrated along outer walls. Conversely, as shown in FIG. 5O, if the support preform is not soluble and both the support preform and any continuous fiber reinforcement preform are overmolded with overmold OV11, a molding having both an internal/embedded support preform (which may be, as discussed herein, reinforced with rods, chopped, short, long, or particulate reinforcement) and an internal/embedded fiber reinforcement preform surrounding the support preform may be formed.

Figure 4B:
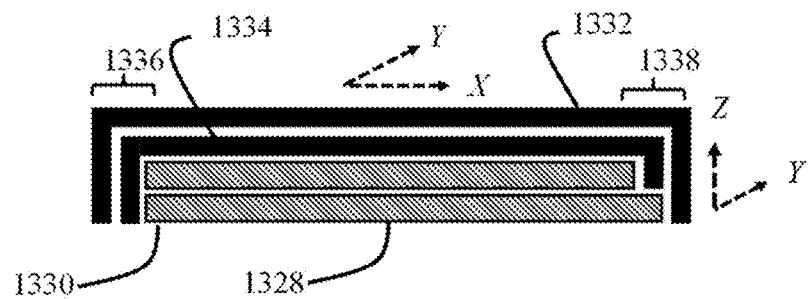
Figure 5D:
Figure 5E:
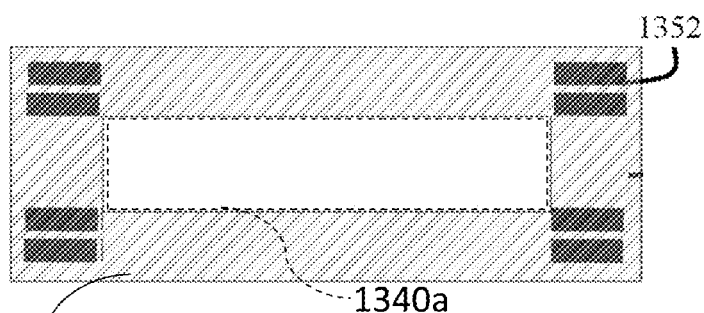
FIGS. 5E-5G show the structures of FIGS. 4E-4G in which the internal structures are additively deposited as soluble preforms instead of structural resin.
Figure 5F:
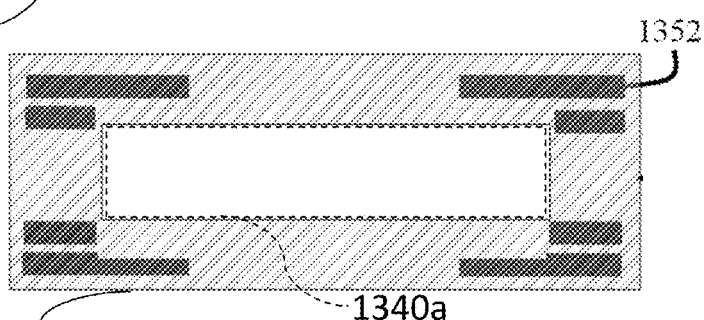
Figure 5G:
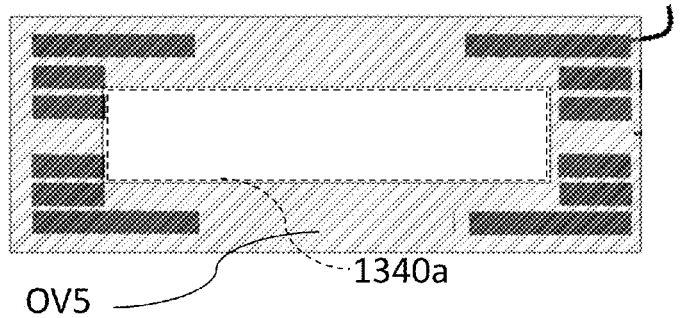
Figure 5H:
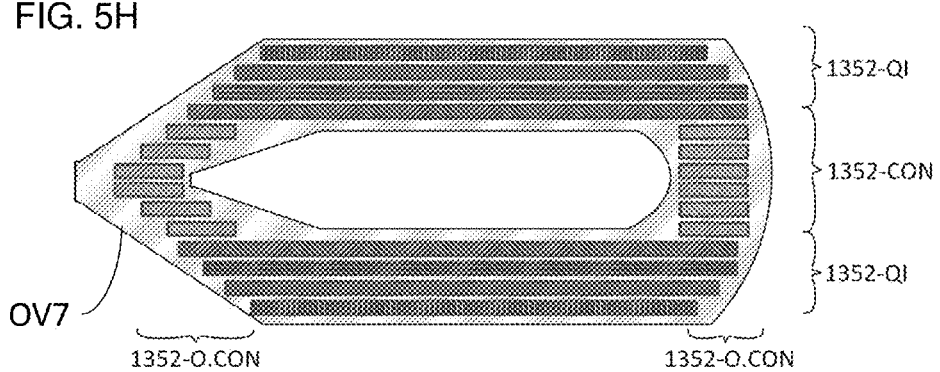
FIGS. 5H-5J show the structures of FIGS. 4H-4J in which some internal structures are additively deposited as soluble preforms instead of structural resin.
Figure 5I:
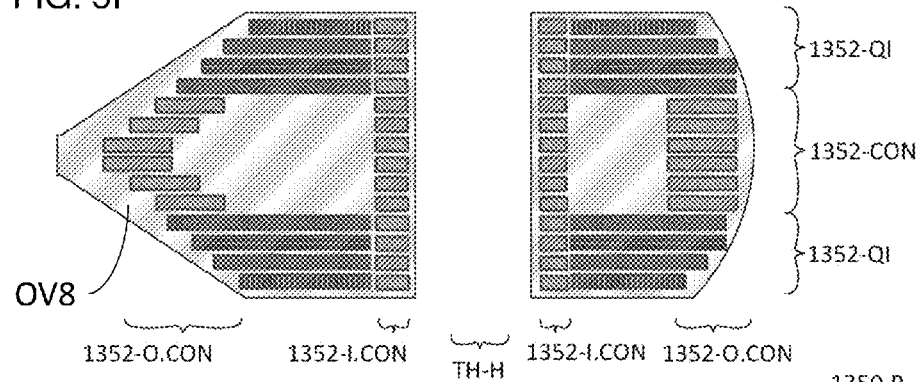
Figure 5J:
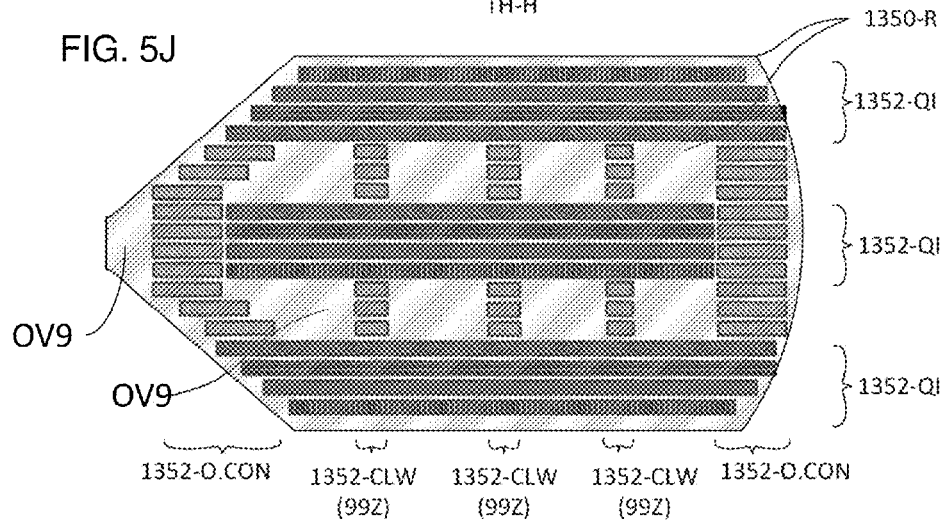
Figure 5K:
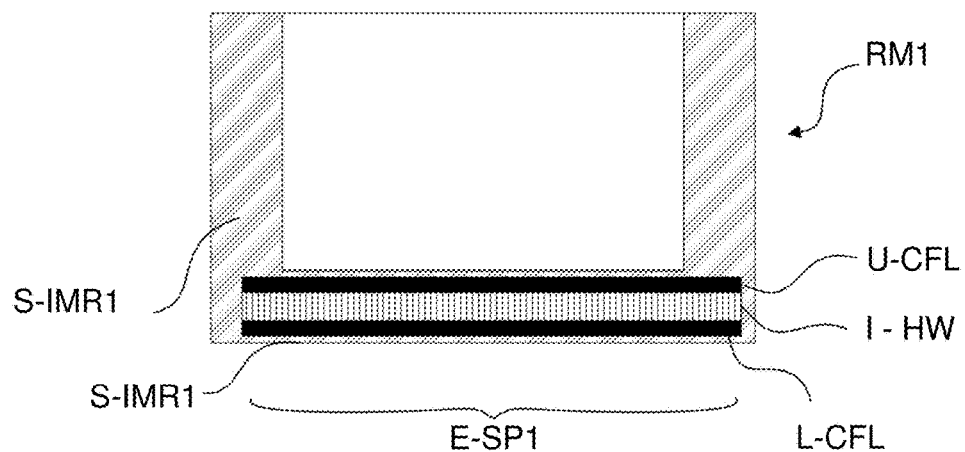
FIGS. 5K-5L show the structures similar to those in FIGS. 4A-4J and 5A-5J in which some internal structures are additively deposited as sandwich panels.
Figure 5L:
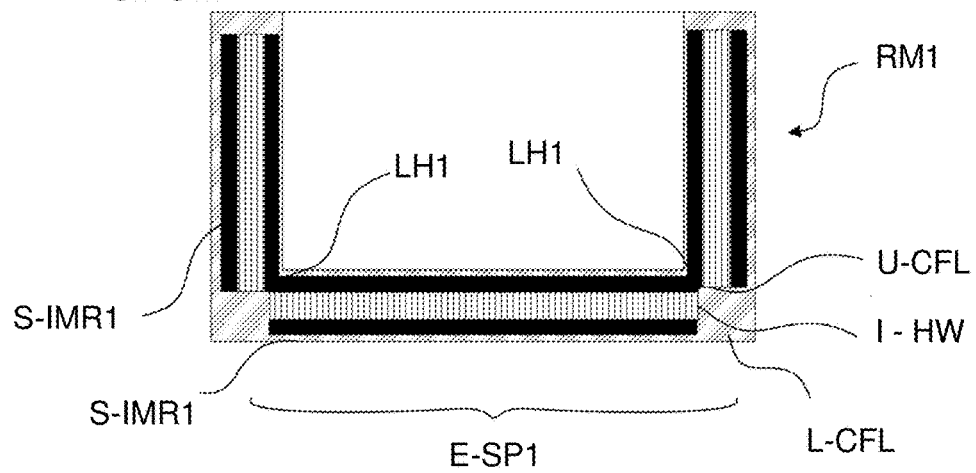
Figure 5O:
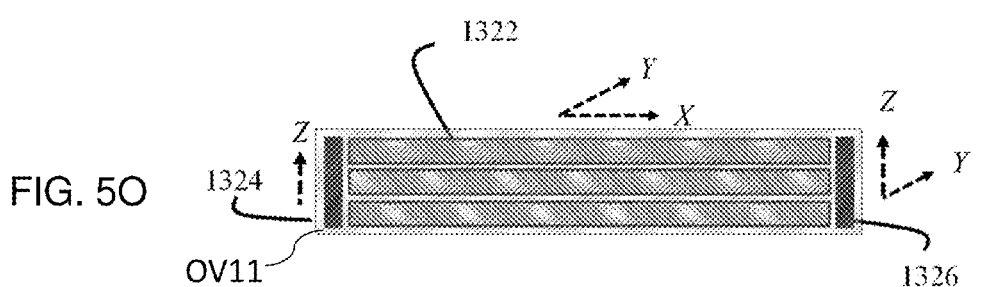
FIGS. 5O-5Q show the structures of FIGS. 5A-5C in which the internal structures are additively deposited as non-soluble preforms.
Figure 5P:
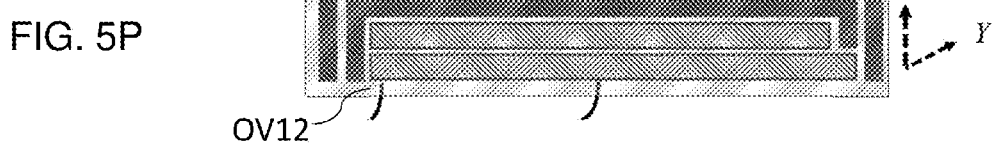

FIGS. 4B, 5B and 5P shows a related method of shell printing, where layers 1328 and 1330 are formed in the XY plane and are overlaid with shells 1332 and 1334 which extend in both the XY and ZY planes. As depicted in the figure, the shells 1332 and 1334 may either completely overlap the underlying core formed from layers 1328 and 1330, see portion 1336, or one or more of the shells may only overly a portion of the underlying core. For example, in portion 1338 shell 1332 overlies both layers 1328 and 1330. However, shell 1334 does not completely overlap the layer 1328 and creates a stepped construction as depicted in the FIGS. 4B and 5B, if sections 1328 are formed as the soluble preform or as soluble material and are dissolved away or removed prior to, during, or after overmolding and/or hardening the molding material to overmold OV2 the continuous fiber reinforcement preform, a fiber reinforced molding with an overmold OV2 surrounding an internal continuous fiber reinforcement preform is formed, the overmold OV2 being a hardened substantially isotropic molding material. In FIGS. 4A and 5B, a shell-like, cup-like, or open box reinforced molding is formed, with reinforcement following the contour of the shell or walls of the cup or open box. Again, as shown in FIG. 5P, if the support preform is not soluble and both the support preform and any continuous fiber reinforcement preform are overmolded with overmold OV12, a molding having both an internal/embedded support preform (which may be, as discussed herein, reinforced with rods, chopped, short, long, or particulate reinforcement) and an internal/embedded fiber reinforcement preform cupping the support preform may be formed.

Figure 4C:
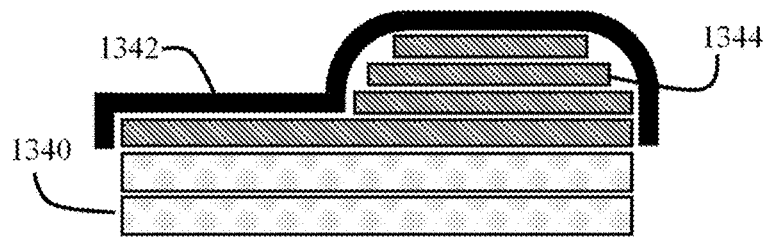
Figure 4D:
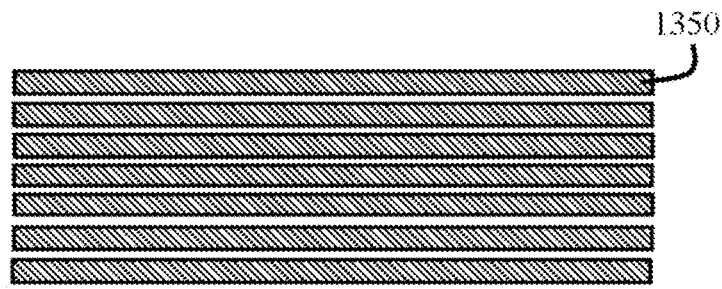
FIGS. 4D-4G show exemplary weighted distributions of 3D printed composite lay-up according to the present embodiments, e.g., to form sandwich panel structures, to increase effective moment of inertia.
Figure 5Q:
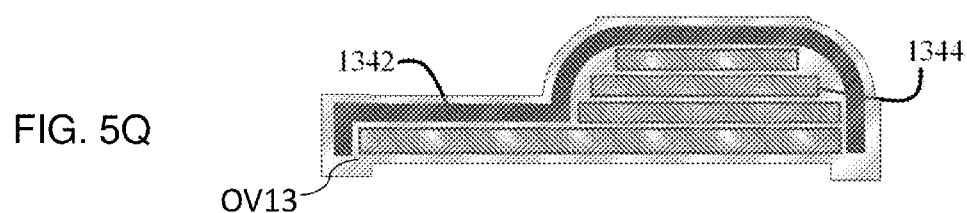

FIGS. 4C and 5C show an alternative embodiment where a support material 1340 is added to raise the part relative to a build platen, or other supporting surface, such that the pivoting head of the three dimensional printer has clearance between the part and the supporting surface to enable the deposition of the shell 1342 onto the underlying layers 1344 of the part core. Again, as shown in FIGS. 4B, 4C and 5B, 5C if sections 1344 and/or 1340 are formed as the soluble preform or as soluble material and are dissolved away or removed prior to, during, or after overmolding and/or hardening the molding material to overmold OV3 the continuous fiber reinforcement preform, a fiber reinforced molding with an overmold OV3 surrounding an internal continuous fiber reinforcement preform is formed, the overmold OV3 being a hardened substantially isotropic molding material. In FIGS. 4C and 5C, a multi-level reinforced molding is formed, with both flat and curved shapes in multiple orientations, and reinforcement following the walls. It should be noted that any of the layers or shells of fiber reinforcement shown in FIG. 4A-4C or 5A-5C may be a multi-layer laminate of differing fiber orientations (e.g., a quasi-isotropic pattern or an anisotropic, directional pattern). Again, as shown in FIG. 5Q, if the support preform is not soluble and both the support preform and any continuous fiber reinforcement preform are overmolded with overmold OV14, a molding having both an internal/embedded support preform (which may be, as discussed herein, reinforced with rods, chopped, short, long, or particulate reinforcement) and an internal/embedded fiber reinforcement preform cupping the support preform may be formed.

The above described printer head may also be used to form a part with discrete subsections including different orientations of a continuous core reinforced filament. The orientation of the continuous core reinforced filament in one subsection may be substantially in the XY direction, while the direction in another subsection may be in the XZ or YZ direction.

The path planning and printing processes may utilize a fill pattern that uses high-strength composite material in selected areas and filler material (e.g., less strong composite or pure resin such as nylon) in other locations, see FIGS. 4D-4G and 5E-5G, which depict stacks of layers in cross section. As discussed with reference to the sandwich panel global or region rule, in some cases, reinforcement is conducted by identifying an internal volume or volumes in the shape of simplified beams or panel, e.g., an interior prism or volume spanning and extending beyond bending load and/or support points. In addition, the part may be oriented during planning for deposition such that layers within the volume span the anticipated load and/or support points. Fiber may be fiber added within the interior prism volume remote from a centroid of a cross section of the volume, to increase effective moment of inertia (particularly for bending or compression loads). Fibers may be deposited in multiple adjacent bonded ranks and/or layers, to increase fiber rank interaction and reinforcement of neighbors (particularly for compression and tension loads). Through holes or mounts through which or into which load members are expected to be inserted may each be smoothly looped by fiber, optionally directly at the wall of such mount (particularly for tension and torsion loads, looping may permit fewer stress concentrations and the transmission of tension through smooth paths).

Especially for beam and panel bending, the strength to weight performance of a beam is optimized by placing fiber ranks as far as possible (i.e., at the farthest position both within the part and that does not violating any higher priority rules in effect at the boundary of the part) from the centroid of a cross-section to increase effective moment of inertia. A part formed completely from the fill material or soluble material 1350, and or a complete soluble preform, is contemplated.

Figure 4E:
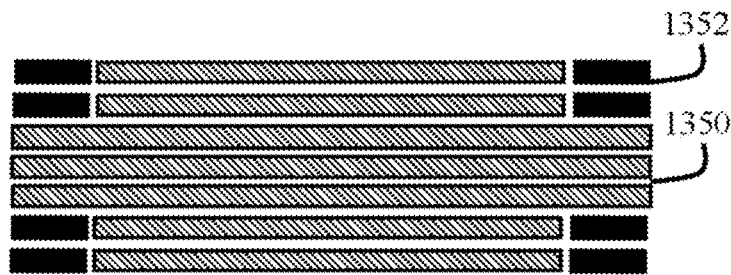
Figure 4F:
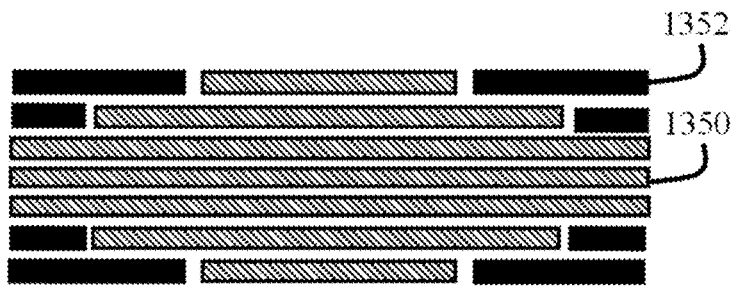
Figure 4G:
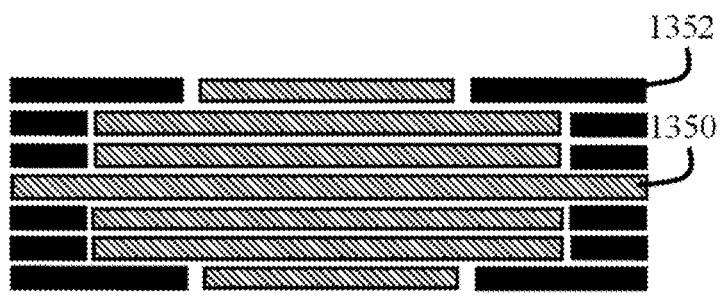

In FIGS. 4E and 5E, a composite material 1352 is deposited at the radially outward most portions of the part and extending inwards for a desired distance to provide a desired increase in stiffness and strength. The remaining portion of the part is formed with the fill material 1350. A user may extend the use of composite versus filler either more or less from the various corners of the part as illustrated by the series of figures FIGS. 4D-4G and 5E-5G. For example, a control algorithm controlled by controller 20 may use a concentric fill pattern that traces the outside corners and wall sections of the part, for a specified number of concentric infill passes, the remainder of the part may then be filled using a desired fill material. FIG. 5D shows a dissolved soluble preform 1340a (as a dotted line). As shown in FIGS. 4D-4F and 5D-5F, if fill material sections 1350 are instead formed as the soluble preform 1340a or as soluble material and are dissolved away or removed prior to, during, or after overmolding and/or hardening the molding material to overmold OV4-OV6 the continuous fiber reinforcement preform, a fiber reinforced molding with an overmold OV4-OV6 embedding an internal continuous fiber reinforcement preform is formed, the overmold OV4-OV6 being a hardened substantially isotropic molding material. In FIG. 4E-4G or 5E-5G, a box-like, canister-like, or tube-like reinforced molding is formed with reinforcement concentrated as described.

FIGS. 4H-4J and 5H-5J depict further parts formed using the printer head(s) depicted in FIGS. 1A-1D and/or 2A-2G.

Where FIGS. 4E through 4G or 5E through 5G do not expressly show outer walls of the part formed from fill material 1350 (e.g., the parts in FIGS. 4E-4G may have outer wall(s) of fill material 1350 or outer walls of composite material 1352), FIGS. 4H through 4J show cross sections of parts with the outer wall 1350-OW specifically shown.

As shown by FIGS. 5H-5J, in the following description with reference to FIGS. 4H-4J, if the fill material 1350 is selectively or entirely replaced with soluble material or considered to form the soluble preform, the soluble material may be dissolved away prior to, during, or following overmolding of any of the fiber reinforcement structures shown in FIGS. 4H-4J and/or FIGS. 5H-5J. As depicted in FIG. 5H, following the removal of the material labeled 1350 as a soluble preform or as other soluble material, a hollow cored reinforcement molding is formed which an overmold OV7 of hardened isotropic material surrounds outer walls, floor, and ceiling of a continuous fiber reinforcement preform formed from the quasi-isotropic laminates 1352-QI and concentric laminates 1352-CON. As depicted in FIG. 4I or 5I, following the removal of the material labeled 1350 as a soluble preform or as other soluble material, a through-holed but otherwise solid cored reinforcement molding is formed which an overmold OV8 of hardened isotropic material surrounds inner walls of the through-hole TH-H, outer walls, floor, ceiling of a continuous fiber reinforcement preform formed from the quasi-isotropic laminates 1352-QI and concentric laminates 1352-CON. As depicted in FIG. 4J or 5J following the removal of the material labeled 1350 as a soluble preform or as other soluble material, a solid cored reinforcement molding is formed which an overmold OV9 of hardened isotropic material surrounds inner walls of the through-hole TH-H, outer walls, floor, ceiling of a continuous fiber reinforcement preform formed from multiple quasi-isotropic laminates 1352-QI and concentric laminates 1352-CON and bridging laminates 1352-CLW.

Specifically, in FIG. 4H or 5H, a part is built up from the lowest layer or down from the highest layer, depending on the printing type or approach. In FIG. 4H, an outer layer of fill material 1350 is formed by a floor layer of fill material 1350 (the outer layer may be 1-3 or more successive floor layers). As in FIGS. 4E-4G, an internal sandwich panel is built of composite material 1352, in this case as two quasi-isotropic sets 1352-QI separated by infill material 1350-IF. In this case, a quasi-isotropic set 1352-QI is formed by four parallel shells or layers of anisotropic fill or composite fiber swaths, in which the dominant direction of the fiber swaths is rotated by 45 degrees (in a known manner for quasi-isotropic laminates of four layers) between each layer (as noted herein, a quasi-isotropic set of layers or shells tends be composed of 3 or more layers, the layers together having a substantially isotropic stiffness behavior as a laminate). As discussed, the quasi-isotropic sets 1352-QI are deposited adjacent or proximate the top and bottom of the part to provide a higher moment of inertia and bending stiffness. The quasi-isotropic sets 1352-QI also provide twisting or torsion stiffness. As shown, in contrast to FIGS. 4E-4G, in FIG. 5H outer walls 1350-OW (including 1-3 or more beads of isotropic fill material) optionally surround the sets 1352-QI of quasi-isotropic layers so that the outer surface of the part is fill material 1352.

Figure 10A:
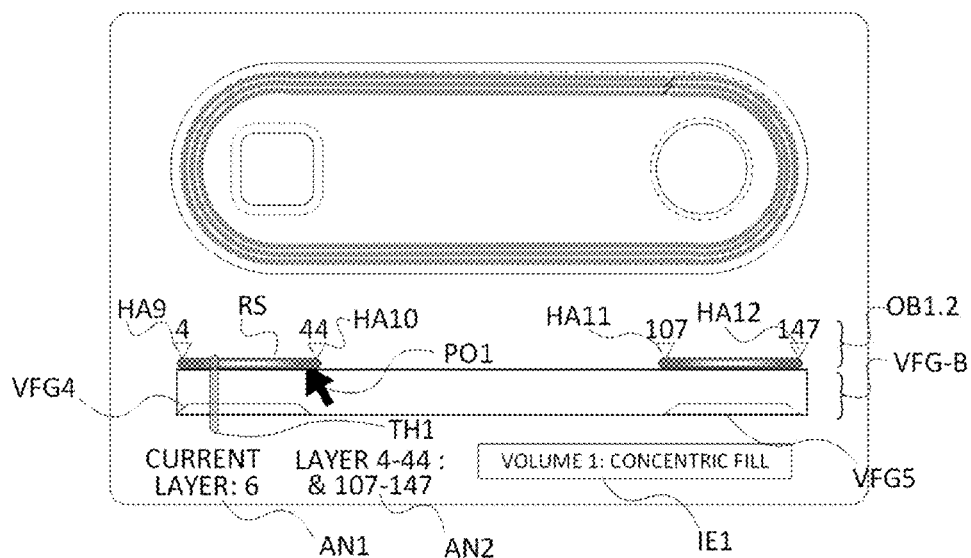
Figure 10B:
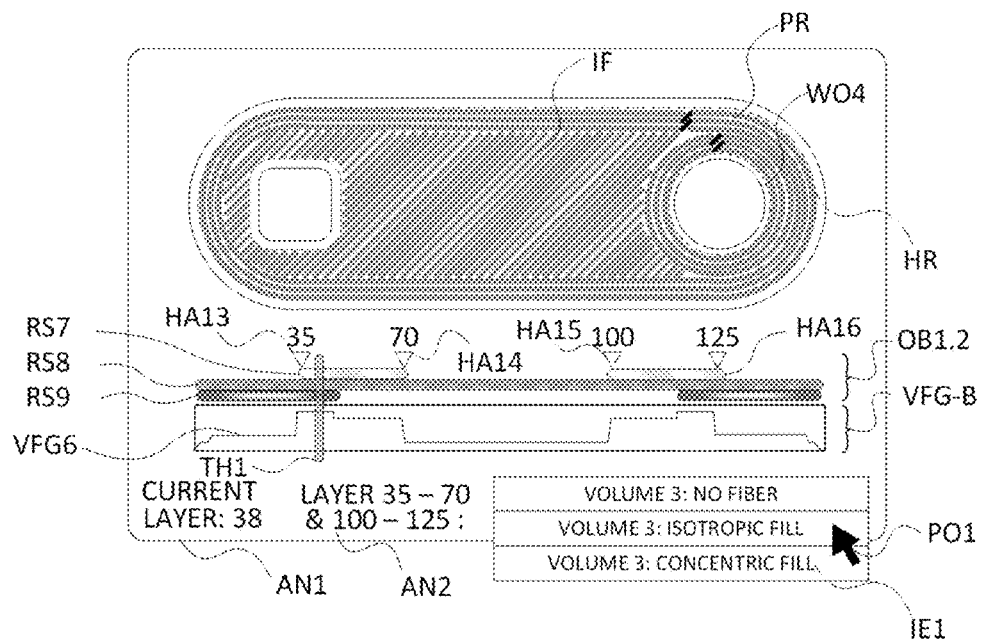

Further in contrast to FIGS. 4E-4G, the middle fill material section 1350-IF is surrounded by outer concentrically deposited anisotropic composite fiber swaths 1352-CON (e.g., as shown in single layer form in FIG. 10A, 10B, or 10C). Each concentric fiber swath fill section 1352-CON may be any number of concentric loops, e.g., 1-10 or higher. Again, optionally, outer walls 1350-OW (including 1-3 or more beads of isotropic fill material) optionally surround the sets 1352-CON of quasi-isotropic layers and fill material 1352 so that the outer surface of the part is fill material 1352. In addition, the upper quasi-isotropic layer set 1352-QI is additionally covered by a roof fill of fill material 1350-R (again, 1-3 or more layers of isotropic fill material 1350). In this manner, the entire outer surface of the part is optionally sheathed in fill material 1352, but immediately adjacent the fill material 1352 outer surfaces and displaced outwardly from a centroid of the part, composite material 1352 is deposited to increase effective moment of inertia in either anisotropically deposited quasi-isotropic sets 1352-QI, and/or concentrically deposited layers 1352-CON. Accordingly, outer contours, perimeters, roofs, and floors of the 3D geometry, whether formed from layers or shells of the 3D printing process or formed from walls, beads, or swaths within a respective layer or shell of the 3D printing process, are surrounded by an inner shell of composite material 1352. It should be further noted that one exemplary fill approach for the concentrically deposited outer layers 1352-CON is concentric loops, spirals, or offsets starting at an outer region perimeter or contour and spiraling inward 1352-O.CON (outer concentric fill).

In a variation of the part of FIG. 4H of a part having a through-hole TH-H as shown in FIG. 4I, the general approach of FIG. 4H may be followed. In contrast, in FIG. 4I, the negative contours or holes found in each layer having anisotropically deposited and/or oriented fiber fill, quasi-isotropic sets of layers 1350-R, and also found in each layer having anisotropically deposited and/or oriented fiber fill, outer concentric layers 1352-CON, are surrounded by these respective fills as well as isotropic, resin or fill material infill 1350-F. However, immediately adjacent the negative contour, a reinforcing column formed from an optional inner wall of isotropic, resin or fill material 1350-IW and an inner wall of anisotropically deposited and/or oriented fiber fill, inner fill concentric layers 1352-I.CON (e.g., a tube of concentric fiber and/or concentric fill material surrounding the through hole TH-H). A non-through, terminating hole may be similarly structured (e.g., the sides of the hole being similarly concentric inner fill of fiber 1352-I.CON and/or inner wall resin or fill material fill 1350-IW, and the bottom of the hole being terminated with, as permitting, a quasi-isotropic set 1352-QI and/or a roof layer 1350-R). As shown, the reinforcing column may extend through the infill 1350-IF, the outer concentrically reinforced layers 1352-O.CON or 1352-CON, as well as the quasi-isotropic sets of layers 1352-QI, such that two or three or more regions, fill patterns, or toolpath generation approaches are used in these layers, either in exclusive regions or in overlapping regions with a set priority among generation rules. As an example, a layer depicted in FIG. 10B includes an outer concentric fiber fill surrounding both of an anisotropically deposited and oriented infill IF that is one layer of a quasi-isotropic set, as well as an inner concentric fiber fill surrounding a negative contour. The reinforcing column formed from inner wall resin fill 1350-IW and/or inner concentric fiber fill 1352-I.CON may surround more than one hole or negative contour in each layer, e.g., two holes or three holes, etc., or may be a reinforcing structure distributed among different layers in a set or laminate. In this manner, negative contours, through-holes, and similar structures, whether formed from layers or shells of the 3D printing process or formed as walls within a layer or shell of the 3D printing process, also are surrounded by an inner shell of composite material.

It should be noted that the reinforcing columns may be or include or one or more continuous fiber columns CRC injected, inserted, drilled, drawn, lain, stitched, guided, or otherwise deposited to join layers in the Z-axis direction and resist Z-axis delamination; and need not surround a through-hole.

FIG. 5M-5N show structures similar to those of FIGS. 5I and 5J, in which continuous reinforcing columns bridging layers extend through multiple layers. These continuous reinforcing columns may be orthogonal/vertical/perpendicular to one or more 2D layers LA$_n$, at an angle to one or more layers, or curving through one or more layers, or take paths joining orthogonal, angled, or curved paths. For example, the reinforcing columns labeled may include either concentric fiber surround, concentric fiber surround combined with continuous reinforcing column(s), or just continuous reinforcing columns extending parallel to the through hole. As shown in FIG. 5M, a continuous reinforcing column CRC bridging layers may extend along the internal surface of a through-hole; may be embedded in injection overmolding as in FIGS. 5H-5J, or may extend at an angle through multiple layers but not the entire part (e.g., having been placed during the successive deposition of multiple layers). As shown in FIG. 5N, a continuous reinforcing column CRC may extend at an angle through many layers or the part, may extend through reinforcing columns in intermediate layers; or between or through or into sandwich panel laminate layer groups forming quasi-isotropic laminates and forming sandwich panel internal structures, or may be arranged to overlap, spanning only 2-10 layers each but each layer being "connected" by offset or staggered continuous reinforcing columns CRC.

In a further variation of the part of FIG. 4H of a part having an internally dense fiber infill pattern, as shown in FIG. 4J, the general approach of FIG. 4H may again be followed. In contrast, in FIG. 4J, a matrix or cellular arrangement of concentrically filled anisotropic material walls (of anisotropically deposited and oriented fiber material) 1352-CLW is arranged within the part to provide increasing fiber density and/or stiffness and/or crushing resistance. The pattern of cell walls 1352-CLW may be a honeycomb formed from reinforcement formations. Further, the pattern of cell walls of anisotropically deposited and oriented fiber material 1352-CLW may be formed by crossing or non-crossing outer concentric or inner concentric fills 1352-O.CON or 1352-I.CON. The pattern of cell walls of anisotropically deposited and oriented fiber material 1352-CLW may be a mirroring, repeating, orthogonally varying, or complementary arrangement. The cells are filled with infill material 1350-IF, in a dense or sparse arrangement. Additionally in contrast, in FIG. 4J, one or more intervening sets of quasi-isotropic fill 1352-QI (of anisotropically deposited and oriented fiber material) may be formed as an inner wafer other than at the top and bottom regions remote from the centroid. As shown in FIG. 4J, in contrast to FIG. 4H, the one or more intervening sets of quasi-isotropic fill 1352-QI (of anisotropically deposited and oriented fiber material) may be further surrounded by an outer concentric fill 1352-O.CON (in order to provide a consistent outer shell) or may instead fill a layer to an outer wall of resin material 1350-OW (as with the upper and lower sets of quasi-isotropic fill 1352-QI.

It should be further noted that the structures of FIGS. 4I and 4J may be combined by using exclusive regions or regions having a priority among them, e.g., through-holes TH-H may penetrate through or partially through a matrix or cellular arrangement of fiber fills 1352-CLW and/or 1352-QI combined with fill material 1350-IF and be nonetheless surrounded by wall-reinforcing tubes of fiber and/or fill material, e.g., as shown in FIG. 10B.

As shown in each of FIGS. 4H-4J, at least one (e.g., 1-3 or more) roof layer of resin or isotropic material or infill material 1350-R, solid, filled or densely filled in ox-row or other packed fashion, may be printed above a set of resin or fill material infill 1350-IF. The infill 1350-IF may in some cases be a sparse honeycomb pattern, and the solid, filled or densely filled roof layer(s) 1350-R provide a complete shell or layer surface upon which the anisotropic fiber swaths may be compressed and fused.

As shown in FIGS. 4A-4J, the three-dimensional geometry of the parts shown in FIGS. 4A-4J may be sliced into shells or layers as described herein. For each of a set of shells or layers defining a portion of a 3D printed part, first isotropic fill tool paths such as 1322, 1328, 1330, 1344, 1350, 1350-R, 1350-OW, and/or 1350-IW may be generated for controlling an isotropic solidifying head (e.g., head 18 or 1800 or 1616) to solidify, along the isotropic fill tool paths, a substantially isotropic fill material such (e.g., material 18a or 1604). For each of an anisotropic fill subset of the set of shells or layers defining the portion of the 3D printed part (e.g., the different fiber fills throughout a part), first anisotropic fill tool paths (e.g., 1352-QI or 1352-O.CON or 1352 I.CON) may be generated for controlling an anisotropic solidifying head to solidify, along the anisotropic tool paths, a substantially anisotropic fill material having an anisotropic characteristic oriented relative to a trajectory of the anisotropic fill tool path. As shown with reference to FIGS. 10A-10C, from among the set of shells or layers defining the portion of the 3D printed part, a selection of an editing subset of shells or layers may be received, the editing subset including at least part of the anisotropic fill subset. For each shell or layer of the editing subset, one of second isotropic fill toolpaths different from the first isotropic fill toolpaths and second anisotropic fill toolpaths different from the first anisotropic fill toolpaths may be regenerated.

Similarly, a printer for additive manufacturing of a part may include an anisotropic solidifying head (e.g., head 10, or 199) that solidifies, along anisotropic fill toolpaths, fiber swaths from a supply of anisotropic fiber reinforced material including a plurality of fiber strands extending continuously within a matrix material, the fiber swaths having an anisotropic characteristic oriented relative to a trajectory of the anisotropic fill tool paths. An isotropic solidifying head (e.g., head 18 or 1800 or 1616) may solidify, along isotropic fill toolpaths, a substantially isotropic material from a supply of solidifiable isotropic material. A motorized drive as shown in FIGS. 1A-1D and 2A-2H may relatively move at least the anisotropic deposition head and a build plate supporting a 3D printed part in three or more degrees of freedom. A controller 20 may be operatively connected to and configured to control the motorized drive, the anisotropic solidifying head and the isotropic solidifying head, and may control these to build the 3D printed part by solidifying the isotropic material along the isotropic fill tool paths, and/or solidifying the anisotropic fill material in fiber swaths tracking a non-concentric set (e.g., quasi-isotropic set 1352-QI, or any of the non-concentric complementary sets in FIGS. 12-14, all suffixes inclusive) of the of anisotropic fill tool paths for at least a first sequence of parallel shells. Further, the controller may control these elements to solidify the anisotropic fill material in fiber swaths tracking an outer concentric set (e.g., 1352-CON, or any of the concentric layer types shown herein) of anisotropic fill tool paths for at least a second sequence of parallel shells. Each of the non-concentric set and the outer concentric set of anisotropic tool paths may be located at least partially radially outward from the centroid of the 3D printed part, as shown in FIGS. 4H-4J.

With respect to the described structures, including all of those discussed with respect to FIGS. 4A-4J and 5A-5J, the reinforcement volume may include a combined volume of reinforcement fiber and a resin matrix within which the reinforcement fiber is additively deposited, and the reinforcement volume is less than 20 percent of the entire reinforced molding. With reference to embodiments shown herein, the continuous reinforcing fiber may be additively deposited simultaneously by a plurality of deposition heads (i.e., in parallel or substantially in parallel).

As discussed with reference to FIGS. 4A-4J and 5A-5J, the method of fabricating a continuous fiber reinforced injection molding, may include forming a first shape in a support material to form a support preform, e.g., using the structures of FIGS. 1A-1D, 2A-2H, and 3. As shown in FIG. 6B, the printer may additively deposit continuous reinforcing fiber in a second shape following a contour of the support preform to form a continuous fiber reinforcement preform. Further as shown in FIG. 6B, the continuous fiber reinforcement preform may be located within a mold of a molding apparatus. The mold may be loaded with flowable and substantially isotropic molding material, and the mold material may be hardened the molding material to overmold the continuous fiber reinforcement preform. As a result, a fiber reinforced molding or molded article is formed, in which an internal continuous fiber reinforcement preform is surrounded by a hardened substantially isotropic molding material.

The support preform may be formed from, and/or the support material may include, a soluble material (e.g., a polymer and/or salt soluble in a solvent), and further comprising dissolving the preform. The support preform may be dissolved before locating the continuous reinforcement fiber shell within the mold. The support preform may also be dissolved by the mold loading, where the support preform material is displaced, melted, or dissolved by the mold loading. The support preform may also be dissolved after the mold material is hardened (in which case at least one part of the preform shape may extend to be contiguous with a surface of the fiber reinforced molding). The support preform may be dissolved in a combination of these steps (e.g., partly or in one part before location in the mold, and partly or in a second part after the reinforced molding is hardened).

The support preform may be formed in a rotationally symmetric shape or mandrel for winding the continuous fiber reinforcement preform. Alternatively, the support preform is formed in a non-looped shape permitting winding the continuous fiber reinforcement preform upon the support preform. In this case, a robot arm supporting the fiber deposition printhead may reach concave areas of the support preform to deposit or wind the continuous fiber reinforcement preform.

The support preform may be injection molded. The support preform may be injection molded as a honeycombed structure, with a contiguous outer surface shell suitable as a winding substrate (alternatively, without the contiguous outer surface shell). The support preform and continuous fiber reinforcement preform may be formed in successive additive and injection molded stages. For example, a honeycomb structure I-HW may be additively formed from either a substantially isotropic material additive deposition or by fiber deposition, followed by insertion of the honeycomb I-HW into an injection mold for overmolding a substantially isotropic material contiguous outer surface shell of the support preform, followed by winding or surface-following raster/coverage continuous fiber deposition to cover the contiguous outer surface shell of the preform as the continuous fiber reinforcement preform, followed by one of additive or molding deposition of a final outer shell of substantially isotropic hardened material of the reinforced molding. Winding may use at least two translational and one rotational relative degrees of freedom between a continuous reinforcement fiber deposition head and the support preform, and/or or surface-following coverage additive deposition may use at least three translational and one rotational relative degrees of freedom between a continuous reinforcement fiber deposition head and the support preform.

The second shape and/or the continuous fiber reinforcement preform may embed at least one sandwich panel structure E-SP1 (e.g., a first laminate of fiber reinforcement L-CFL, an intermediate honeycomb I-HW or solid material either of fill material or fiber reinforcement, and a second laminate of fiber reinforcement U-CFL substantially parallel to the first laminate but spaced therefrom). As shown in FIGS. 5K and 5L, the sandwich panel structure E-SP1 may be a foldable structure, e.g., with the second laminate U-CFL being continuous and the first laminate L-CFL and the intermediate material I-HW having linear gaps formed therein opposite fold line(s) in the second laminate to form hinges LH1 (e.g., living hinges if the fiber reinforcement is readily bent, or separation/snapping guides if the fiber reinforcement is more brittle). Optionally the preform itself embeds at least one sandwich panel structure E-SP1.

The support preform may be relatively moved in at least one rotational degree of freedom with respect to a deposition head that additively deposits the continuous reinforcing fiber in the second shape following the contour of the preform to form the continuous fiber reinforcement preform.

The overmolding and/or molding may be performed at a molding material pressure which removes air voids within the fiber reinforcement matrix material. The continuous fiber reinforcement preform may be bent or deformed from its formation shape to a deformed shape within the mold. Two or more continuous fiber reinforcement preforms may be bonded to one another before location within the mold. The support preform may be bent or deformed from its formation shape to a deformed shape for depositing the fiber reinforcement to form the continuous fiber reinforcement preform.

The mold may be an injection mold, and pack pressure of the injection molded material during molding compresses and/or consolidates the fiber reinforcement preform into a final shape and/or removes voids within the fiber reinforcement preform. At least in the case where the mold is an injection mold, heat from the injected mold material remelts a matrix material of the fiber reinforcement preform.

The fiber deposition or winding of the continuous fiber reinforcement preform may be additively deposited thermoplastic continuous fiber reinforced prepreg tape or prepreg tow having a width at least three times its height.

The described techniques may further include arranging a wide prepreg sheet against or on the soluble preform before additively depositing continuous fiber tow or tape thermoplastic prepreg.

The described techniques may further include applying a vacuum during formation of the continuous fiber reinforcement preform and/or the molding to remove voids. The vacuum may be applied at the part perimeter and if the molding material is injected or pressurized into the middle of the part. The continuous fiber reinforcement preform may include ribs or air channels to help air escape.

In a variation, in a method of fabricating a continuous fiber reinforced injection molding, continuous reinforcing fiber is additively deposited by the devices of FIGS. 1A-1D, 2A-2H and 3 in a second shape following a contour to form a first continuous fiber reinforcement preform as a flat or curved "A" panel. The first continuous fiber reinforcement preform may be located within a mold of a molding apparatus along a first mold plate, and a second mold plate formed with a honeycombed cavity may be located opposite the first continuous fiber reinforcement preform. The mold may be loaded with a flowable and substantially isotropic molding material. The molding material may be hardened to overmold a honeycomb of the substantially isotropic molding material against the continuous fiber reinforcement preform, thereby forming a fiber reinforced molding including a hardened substantially isotropic molding material honeycomb integrated with the continuous fiber reinforcement preform (optionally the continuous fiber reinforcement preform is further enclosed within the molding material). Subsequently, a complementary "B" side reinforced fiber panel may be deposited by continuous fiber deposition against the honeycomb. Alternatively, a "B" side may be formed as a mirror process (e.g., first a continuous fiber reinforced preform, then a honeycomb overmold) then joined or overmolded honeycomb-to-honeycomb (preferably with other locating or indexing or interlocking features). Further alternatively, the honeycomb mold cavity may be formed in as a soluble preform upon which the fiber reinforced preform is deposited, simplifying the second mold plate to the match contours of the honeycomb soluble preform shape. The soluble material is removed before the A and B sides are joined.

Tubular Framework Example

Figure 6A:
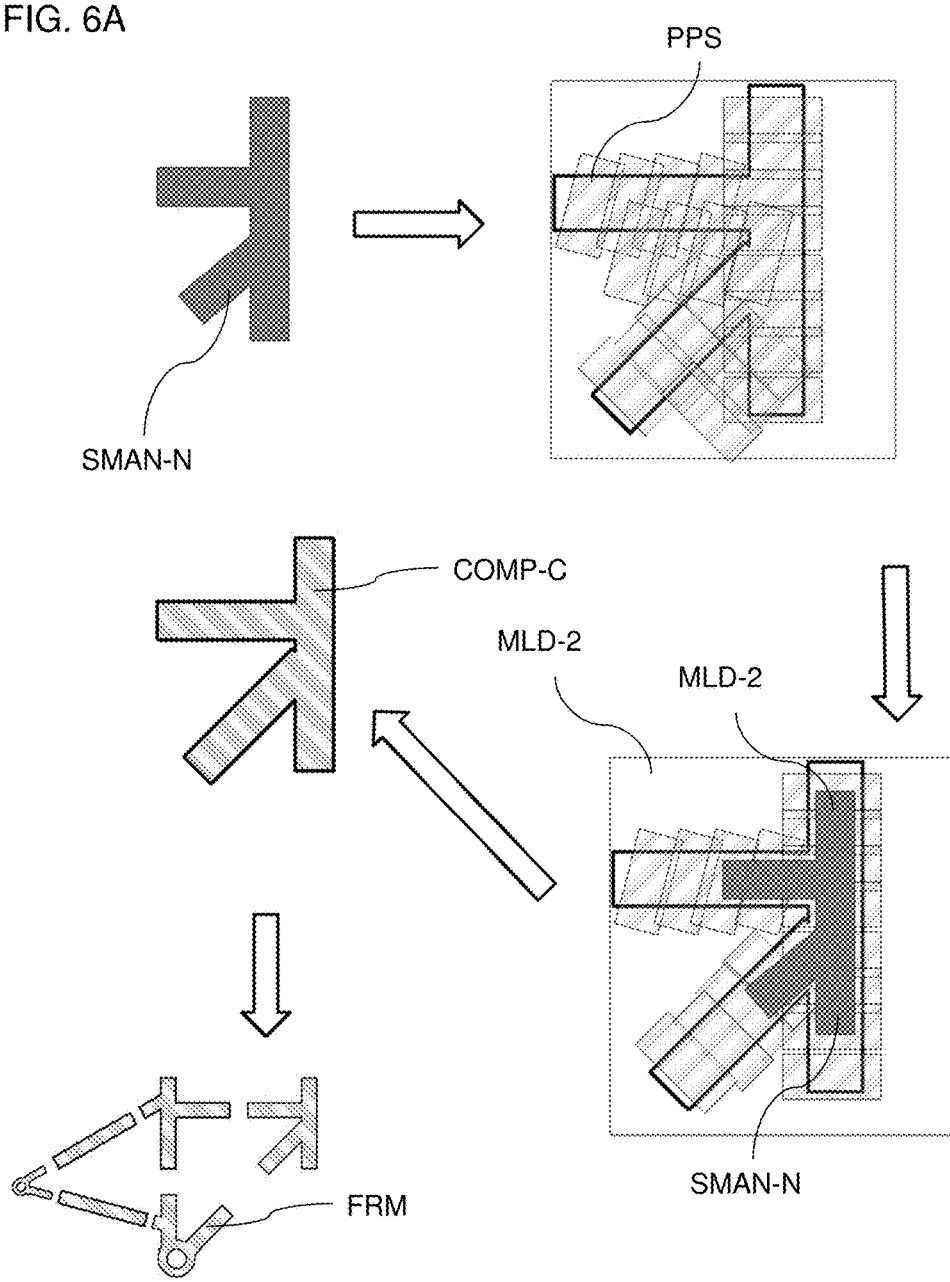

As shown in FIGS. 6A and 6B, in composite lay-up of a bicycle frame, in step CL2 mandrels SMAN-N may be prepared for one or more (N) junctions of tubes (e.g., head tube joining the top tube and down tube; bottom bracket joining the seat tube, down tube, and chain stay; or seat post joining the top tube, seat tube, and seat stay; or rear dropout joining the seat stay and chain stay). Often, as in step CL4, seven (N=1 . . . 7) parts are laid up and compression molded about mandrels SMAN-N or other defining shapes as in steps CL6 and CL8 into molded components COMP-C and finally as in step CL10 bonded into a unitary frame FRM (left and right dropouts, bottom bracket assembly, seat post assembly, head tube assembly, and v-shaped chain stay frame, and v-shaped seat stay frame).

Figure 6D:
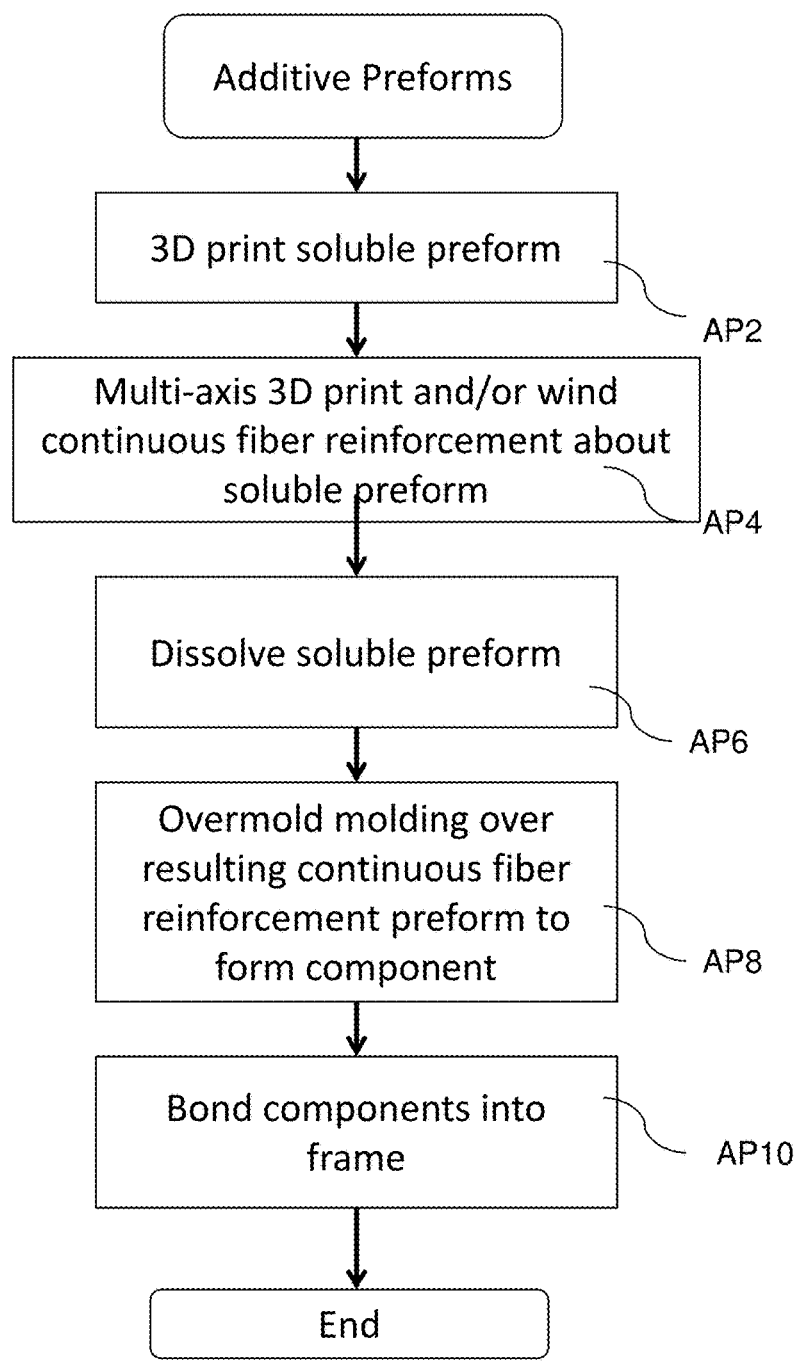

As shown in FIGS. 6C and 6D, in an example of contrasting in-mold assembly of a reinforced molding RM2 formed by resin overmolding OV3a a fiber reinforced preform 1342a, in the present embodiments, an additively deposited soluble preform 1340a may be printed as in step AP2 to take the place of a steel mandrel that defines the shape and surfaces of a frame component formed as a reinforced molding RM2, and steps may take place in a different order or different form.

For example, each component (e.g., head tube junction component) may have a soluble mandrel (soluble preform 1340a) additively deposited (3D printed) by the printer 1000 as in step AP2. Pressurizable nylon bladders or heat-activated foam inserts may be integrated at this time, or may have been printed over (or printed in an appropriate material). In a second stage as in step AP4, a printhead 1402 deposits and/or winds and/or wraps continuous fiber over the soluble preform(s) 1340a including bladders or heat-activated foam inserts as appropriate, including printing inner or outer guard layers of plastic about the continuous fiber. During overmolding, bladders or heat-activated foam may help pressurize the continuously wound fiber, optionally against a mold wall, to eliminate internal voids.

At this stage, as shown in FIGS. 6C and 6D, a component assembly includes a fiber reinforcement preform 1342a wrapped about a soluble preform, optionally with the pressure-increasing features integrated. The soluble preform 1340a, in weight-sensitive applications, may be dissolved away as in step AP6. In other cases the role of the soluble preform 1340a to allow winding of the reinforcement preform 1342a is instead taken by a honeycomb, foam, or low-density preform that will remain in the final assembly (in addition to any heat-activated mold cores). The pressure-increasing features may be left in place.

As in step AP8, a component including at least the fiber reinforcement preform 1342a may be placed inside a mold MLD-2 substantially in the shape of the final reinforced molding RM2 (absent molding features such as sprues, runners, etc.). As in step AP8, the mold MLD-2 is closed, and any bladders may be connected to pressurized air fittings. As in step Ap8, the mold MLD-2 is filled with molding material and pressurized or heated as appropriate for the molding technique (e.g., injection molding). Pressure is increased by the bladders and/or reacting heat-activated foam cores. If necessary, curing is performed on the reinforced molding RM2.

In an alternative, before or instead of overmolding the fiber reinforced preform 1342a, a heat-shrinking tape may be printed or wound about the fiber reinforcement preform 1342a. In this case, the soluble preform 1340a may be left to provide internal resistance versus pressure created by heating and/or curing the heat-shrinking tape. If the component 1342a is not to be overmolded, once cured, the tape may be removed and the hardened part may be sanded to its final diameter and shape (additional layers may be additively printed before sanding and/or additively sprayed after sanding). As in step AP10, the components may be bonded into a whole (e.g., frame FRM).

In this framework example, as with any frame or truss example, the junction components, whether they have long arms extending from them or short, are distinct from the entire frame in that they can be wound or externally traced or printed without a weaving operation, i.e., the external surface does not connect with itself in a loop or ring (although the internal surface may be a hollow tube or a junction of hollow tubes).

It should be noted with this example, as with any frame or truss example, that the overmolding may be performed on each junction component, and then the reinforced moldings RM2 or 1342a joined (e.g., by nesting tubes or shapes, smaller diameter within larger diameter, and adhesive or fastener bonding). In an alternative, the fiber reinforcement preforms RM2 or 1342a may be first joined to one another (again by nesting tubes or shapes, smaller diameter within larger diameter or otherwise interlocking, and adhesive or fastener bonding), and then the joined assembly overmolded in an entire assembly mold (not shown).

As discussed herein with reference to the continuous fiber reinforcement preform, in the case of one, two, or more holes, airflow holes, negative contours, embedded contours, or overmolded contours in any reinforced molding component, in many cases different kinds of reinforcement will be possible. For example:

(1) Reinforcement of inner walls and hole walls may closely follow the walls, with or without layers of fill material shielding the innermost wall to prevent print-through of fiber. "Holes" include negative contours and embedded (e.g., overmolded) contours.

(2) Reinforcement of outer walls may closely follow the walls, with or without layers of fill material shielding the innermost wall to prevent print-through of fiber, e.g., "outer" reinforcement formations.

(3) Reinforcement may extend along load lines or stress lines, e.g., outer reinforcement formation.

(4) Reinforcement for tension load purposes may include multiple straight composite swaths between the sites at which the tension load is supported.

(5) Reinforcement for torsion, torque, or pressure load purposes may include multiple circular composite swaths along directions of hoop stresses.

(6) Reinforcement for compression load purposes may include multiple neighboring composite swaths to provide low aspect ratio cross sections and/or squat structures, and/or anchors at ½, ⅓ fractional, e.g. harmonic lengths to guard vs. buckling; and/or e.g., more composite swaths for compression struts than for tension struts.

(7) Reinforcement for twisting may include angular cross bracing in triangle or X shapes.

(8) Reinforcement for bending or combination load purposes may include embedded high moment of inertia (cross section) structures such as sandwich panels, tubes, boxes, I-beams, and/or trusses formed from embedded composite swaths. These may be made in layers spaced from the centroid of the component cross section, or in outer toolpaths spaced from the centroid of the component cross section, depending on the load and the orientation of the reinforced molding during printing.

In general, it is preferable to apply strategies in which compression and/or layer height interference of an overlapping or crossing layer (e.g., which may correspond in part to layer height) may be set to deposit two highly compressed layers of composite swaths $2c$-$2$, $2c$-$1$, and to square up corresponding fill material $18a$ at a height of close to twice the highly compressed composite swath height. It may also be preferable to permit or create crossings of toolpaths of composite swaths $2c$-$1$, $2c$-$2$, and to square up corresponding fill material $18a$ at a height of close to twice the highly compressed composite swath height. Crossings of highly compressed composite swaths with one another, and/or crossings of highly compressed composite swaths with lightly compressed composite swaths may be used. As shown in the CFF patent applications, toolpaths for deposition of core reinforced fiber may be generated within contours and sub-contours, and in order to maintain parallel paths, and often follow offsets of the contours and sub-contours.

Figure 7A:
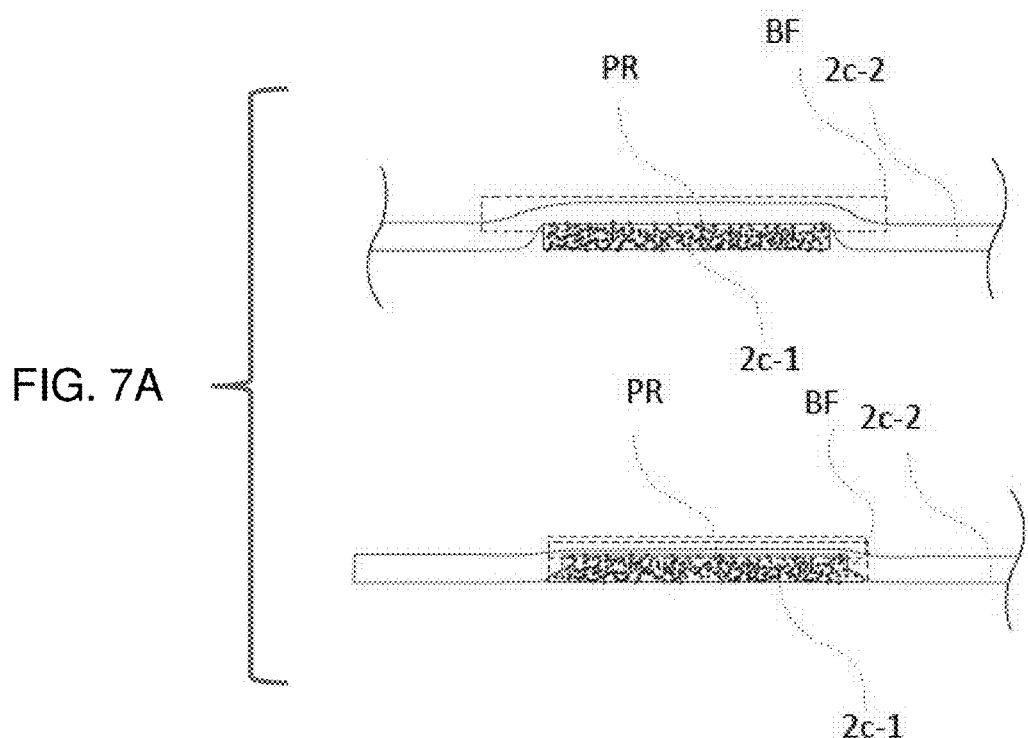
FIG. 7A shows crossing points or crossing turns of two fiber swaths in two forms.

It should be noted that only some toolpaths, composite swaths $2c$, and/or multi-swath fiber tracks form "loops", closed "loops", or "crossing turns" as continuously deposited in a single layer of an additive manufacturing process. FIG. 7A shows crossing points or crossing turns of two fiber swaths in two forms. Any of these loops, crossing points, closed loops, or crossing turns may form a portion of a continuous fiber reinforcement preform as discussed herein, and may be printed together with fill material and/or onto soluble material or a soluble preform.

FIGS. 7A-7F show three examples of crossing turns, i.e., loops or crossed loops that are made about internal geometry, such as a hole within a layer (a hole represented as a negative contour); and FIGS. 7B-7C show two examples that may be crossing turns but could also be distributed between two layers. Each represented crossing turn may depict either a single composite swath, or a multi-swath track of parallel composite swaths. "Track" in this context means closely arranged (often touching), and often parallel swaths, which may be printed concentrically, spirally, or in parallel. A track need not have all swaths parallel throughout its entire length. The followed hole H0 is in each case circular, but may be any shape having a perimeter that can be followed by a toolpath (e.g., hexagonal or square). In FIGS. 7A-7F, single layer or double layer overlaps (i.e., locations where a swath or multi-swath track is directly over an underlying swath or multi-swath track within the same printing layer) are depicted as darker shade and single swaths or multi-swath tracks as comparatively lighter shade/transparency). In several cases, parallel or neighboring entering and exiting swaths or multi-swath tracks are depicted as cleanly separated and cleanly on either side of the center line, but may overlap and/or cross a center line.

Crossing points made in a same layer, which may be one continuous composite swath or different composite swaths, may be referred to as "intra-layer" crossing points. Crossing points made between two layers, which in most cases may be different continuous composite swaths are referred to as "inter-layer" crossing points. It should be noted that a raster pattern crossed with another raster pattern on another layer produces a dense array of inter-layer crossing points, but these crossing points do not particularly reinforce any neighboring feature or contour. As such, a single inter-layer crossing point (e.g., such as that in FIG. 7E or 7F) or a small group of inter-layer crossing points are herein discussed as "isolated crossing points". As discussed herein, intra-layer crossing points tend to create protrusions at the crossing point layers in the case of composite swaths, less so in the case of extruded fill material alone; while inter-layer crossing points do not create such protrusions unless otherwise described.

FIG. 7B shows a crossing turn made about a hole H0—such as a lace aperture, airflow aperture, mesh gap, through-hole, in upper, insole, sole, or orthotic—in which (i) the swath or multi-swath track approaches the hole H0 approximately parallel to an (imaginary) line through its center, axis or centroid, (ii) crosses the line to an opposing side of the hole, (iii) closely follows the perimeter of the hole H0, (iv) crosses itself and the line, and (v) departs from the hole H0 approximately parallel to itself and the line. A diamond-shaped overlap PR13 is formed, which may extend above the height of a single swath $2c$. A buffer-zone BF15 may be created or marked about the overlap. This type of crossing turn closely follows and reinforces a hole wall for greater than 300 degrees of arc, and may be the end loop of a larger pattern. It should be noted that the entering and exiting swaths $2c$ or multi-swath tracks are depicted as cleanly separated and cleanly on either side of the center line, but may overlap and/or cross the center line.

FIG. 7C shows a crossing turn made about a hole H0—such as an airflow aperture, mesh gap, or through-hole—in which (i) the swath $2c$ or multi-swath track approaches the hole H0 approximately parallel to an (imaginary) line parallel to a tangent to a perimeter of the hole H0, (ii) crosses the line to follow a perimeter of the hole H0, (iii) closely follows the perimeter of the hole H0, (iv) crosses itself and (v) departs from the hole H0 approximately along the same line from which it approached, continuing the entry toolpath. A C-shaped overlap BF16 is formed, which may extend above the height of a single swath $2c$. A buffer-zone BF16 may be created or marked about the overlap. This type of crossing turn closely follows and reinforces a hole wall for greater than 360 degrees of arc, and may be a middle loop in a larger pattern. It should be noted that the entering and exiting swaths $2c$ or multi-swath tracks are depicted as along the same line, but may be offset or exit at an angle to the approaching swath $2c$ or track. FIG. 7D shows a crossing turn similar to FIG. 7C, except that (i) the approaching swath $2c$ or multi-swath track is more offset from the (imaginary) tangent to the hole, and so turns slightly in an S-shape to approach the tangent at an angle, and similarly (v) departs from the hole H0 in a manner mirroring the entry. The C-shaped overlap PR15 and buffer zone BF17 may be of different or more concave shape.

FIGS. 7E and 7F show overlaps or crossing points adjacent a hole—such as an airflow aperture, mesh gap, or through-hole—in which a bight, open loop or touching loop may be made away from the reinforced hole H0 from which the swath 2c or multi-swath track returns toward the hole H0. A different swath 2c or multi-swath track within the same layer may also form the return path. In the case of FIG. 7E, (i) the swath 2c or multi-swath track approaches the hole H0 approximately parallel to an (imaginary) line through its center, axis or centroid, separated by approximately a track width, (ii) follows the perimeter of the hole H0, then (iii) crosses the line to an opposing side of the hole H0, and (iv) departs from the hole H0 approximately parallel to itself and the line. Upon returning from the pattern away from the hole H0, the swath 2c or multi-swath track (v) crosses itself and the line to an opposing side of the hole H0, (vi) closely follows the perimeter of the hole H0, and (vii) departs from the hole H0 approximately parallel to itself and the line, again separated by a swath or track width. A diamond-shaped overlap PR16, PR is formed, which may extend above the height of a single swath. A buffer-zone BF18, BF19 may be created or marked about the overlap PR16, PR17. This type of crossing point closely follows and reinforces a hole wall for 240 degrees of arc, and may be the end loop of a larger pattern. A crossing point may be complemented by a vertically mirrored version of itself in a complementary layer without stacking overlaps or buffer zones. A crossing point may, in contrast, approaches the hole closer to the center line and crosses itself at both sides of the hole.

At least the following strategies are available for accommodating the protrusion PR in a reinforced molding 14 where successive layers are nominally of a consistent height—for example, 0.1 mm height. These strategies would in many cases be applied during slicing and toolpath or reinforcement formation planning for the reinforced molding 14, in part so that inter-layer accommodations may be made. Where the protrusion PR scale (e.g., height and/or width) is modeled/predicted/empirically known and stored as an absolute or relative value or a function of system variables, the overlap PR or a buffer zone BF larger than the overlap PR may be marked or planned in the current layer $LA_n$. The protrusion or protrusions may be one or more continuous transverse or fiber columns injected, inserted, drilled, drawn, lain, stitched, guided, or otherwise deposited to join layers in the Z-axis direction and resist Z-axis delamination. These transverse columns may be orthogonal/vertical/perpendicular to one or more 2D layers $LA_n$, at an angle to one or more layers, or curving through one or more layers, or take paths joining orthogonal, angled, or curved paths.

(1) Subsequent path planning in the same layer (layer $LA_n$) may:

(a) avoid crossing the overlap within the same layer (e.g., layer $LA_n$ by planning toolpaths which do not cross the overlap, although the new toolpaths may form a crossing point, jump, crossed loop or crossing turn forming a new overlap).

(b) plan new toolpaths within the same layer (layer $LA_n$) separated by more than the buffer zone.

Subsequent or integrated path planning for a new, adjacent layer ($LA_{n+1}$) adjacent to the layer in which protrusions are formed (layer $LA_n$) may:

(c) increase the previous layer height (of layer $LA_n$) in the overall slicing approach, and/or decrease the current layer height (of layer $LA_{n+1}$). This is most applicable when no composite swaths, or composite swaths which do not cross and create protrusions, will be formed in the current layer.

(d) path plan composite swaths to avoid overlaps and/or buffer zones in the layer below (layer $LA_n$);

(e) path plan a complementary or partner patterns in the current layer ($LA_{n+1}$) which provide complementary functionality to a pattern in an adjacent or previous layer (layer $LA_n$).

FIGS. 8A-8D show patch fills and concentric fills that may be used to fill in reinforcement regions as disclosed herein. Any of these patch fills or concentric fills may form a portion of a continuous fiber reinforcement preform as discussed herein, and may be printed together with fill material and/or onto soluble material or a soluble preform.

Figure 8A:
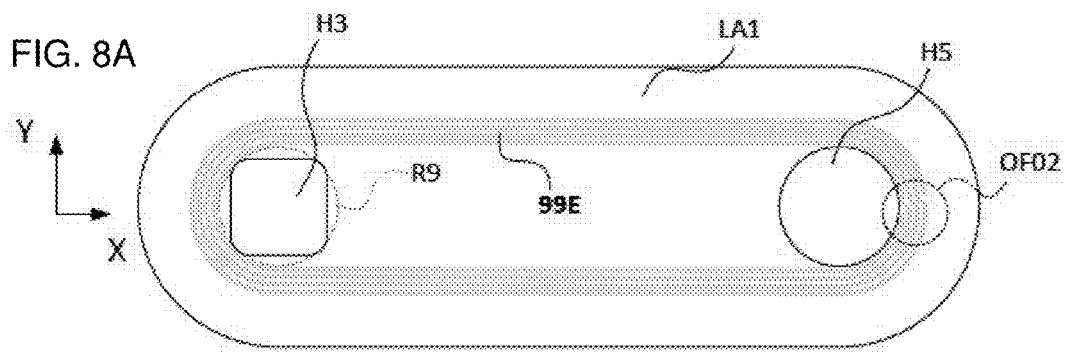
FIGS. 8A-8D show patch fills and concentric fills that may be used to fill in reinforcement regions as disclosed herein.
Figure 8B:
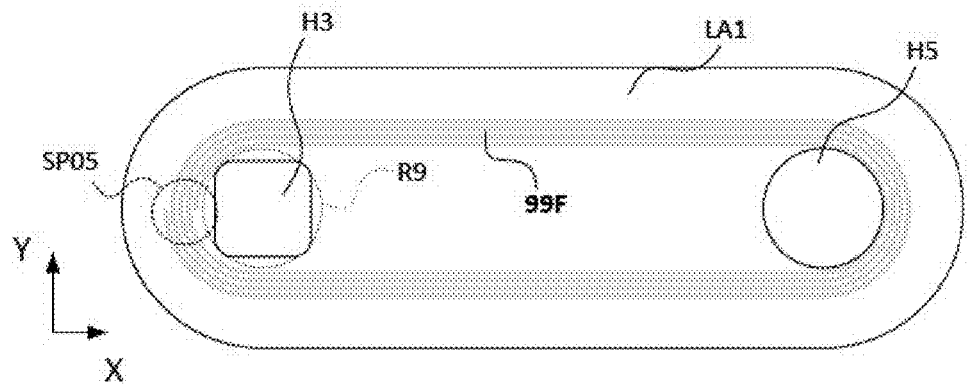

FIG. 8A shows a variation of FIG. 8B in which the toolpath, composite swath pattern, or reinforcement formation 99E is of offset approach, with crossovers OF02 at the opposite side of the reinforced molding from the spiral start and end of the spiral strategy toolpath of FIG. 8B. FIG. 8B shows a toolpath, composite swath strategy or reinforcement formation 99F, as a spiral strategy, excepting that FIG. 8B shows a paired square hole H2 and circular hole H5.

Figure 8C:
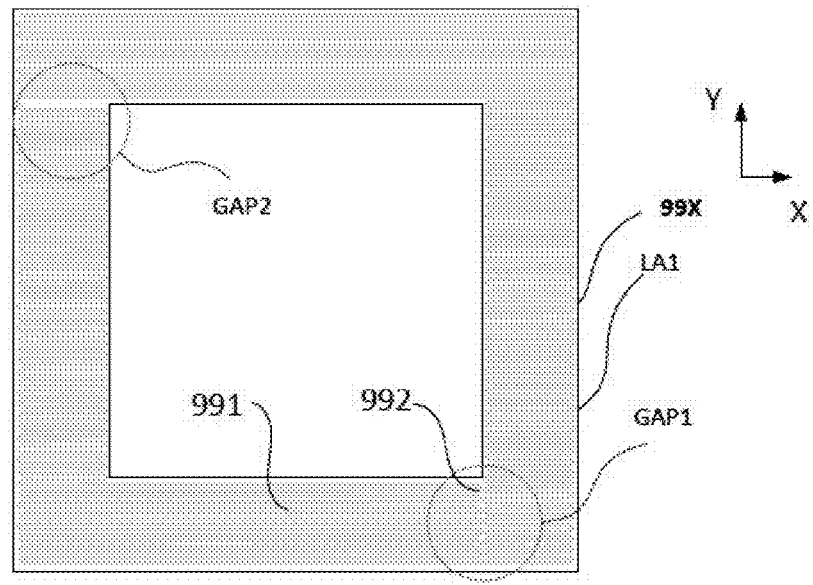
Figure 8D:
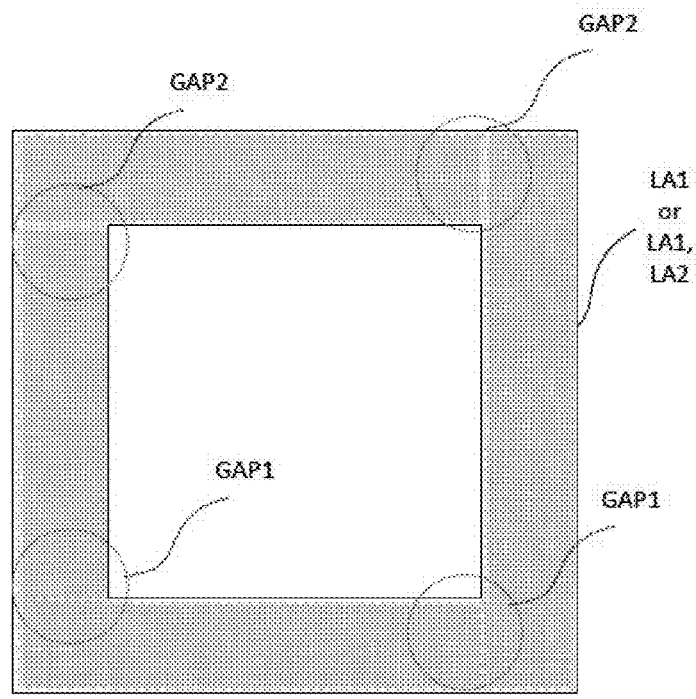

FIG. 8C shows a single layer of a densely filled square plate of four long side members, with an aperture, space for a stretchable substrate, hole or negative contour in the middle. In FIG. 8C, as shown, a lengthwise raster fill reinforcement formation 99X surrounds the contour or region in the middle. There are many turns in the raster pattern, and two gaps GAP1 and GAP2 (which may also be stress concentrations, starts, or stops are formed. GAP1 is formed where the pattern changes regional groups, and GAP 2 is formed at the end of the composite swath 2c. These gaps may also occur if the composite swath 2c length is not perfectly predicted or measured. Within the layer, the gaps may be filled with (i) fill material 18a, (ii) lengths of composite swath 2c which do not continue the raster fill (e.g., gap filling patterns, which may be concentric, wall or region following), (iii) and/or with overlapping composite swath 2c or protrusion PR. E.g. in order to fill the GAP1 or GAP2 with overlapping composite swath 2c, each raster pattern would be widened to overlap (e.g., wherein the gaps are closed with protrusions PR, which may be varied in position among layers as discussed herein). In FIG. 6D, two superimposed reinforcement formations 99X, 99X layers are shown, where the reinforcement formation 99X is rotated by 90 degrees, optionally in the subsequent layer. The reinforcement formation 99X may be rotated at 90 degrees, then again, in an additional two layers to continue to change the position of the gap, stress concentration, starts, or stops. Optionally, the pattern is rotated by 45 degrees in some intervening layers.

Figure 9:
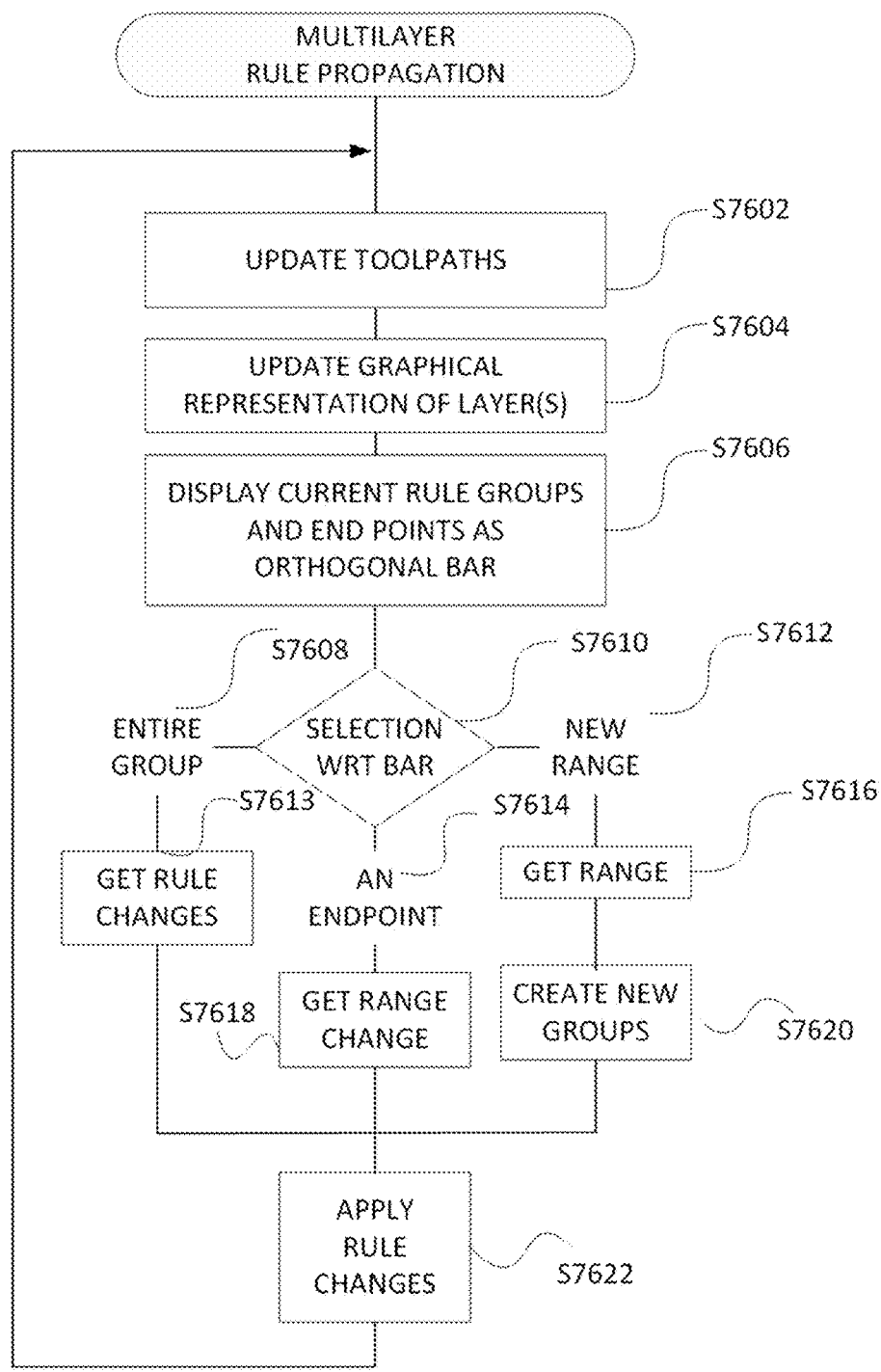
FIG. 9 depicts a flowchart for configuring 3D printer controller and/or slicer controller operations to permit multi-layer rule handling, e.g., setting rules for groups of layers or regions and changing the members of the rule groups.

FIG. 9 depicts a flowchart for configuring 3D printer controller and/or slicer controller operations to permit multi-layer rule handling, i.e., setting rules for groups of layers or regions and changing the members of the rule groups. This routine may be used in preparing a continuous fiber reinforcement preform. In step S7602, updating or re-slicing of toolpaths from any toolpath, region, or layer setting change is carried out. In step S7604, as necessary, any changes in the currently displayed graphical representation resulting from an updated toolpath (e.g., change of a layer, group of layers, or volume) are processed and displayed. In step S7606, as shown in FIGS. 10A-10C, graphical representations of rule groups and end points of the rule groups are rendered as orthogonal bar(s) parallel to an edge of a display. In step S7610, the display area of the orthogonal bar is monitored for a pointer PO1 action selecting, an entire group, an endpoint of a group, or a new range within and/or adjacent an existing group, and the input handled according to the particular case.

When an entire group is selected and retaining focus, in step S7613, one or more interface elements (e.g., a drop down menu, slider, text or number box, radio button, check box) are monitored for input reflecting a change in the rule applied to the selected entire group, and the rule change is captured from the input. When an endpoint of a group (e.g., a group will have at least two endpoints, but may have any number for non-contiguous groups) is selected per step S7614 and retains focus, in step S7618 one or more interface elements (e.g., a drop down menu, slider, text or number box, radio button, check box) are monitored for input reflecting a change in the position of the endpoint, and therefore a change in the members in the set of layers or regions of the group, and the rule change is captured from the input. When a new range is formed or is selected per step S7612 and retains focus, in step S7616 one or more interface elements (e.g., a drop down menu, slider, text or number box, radio button, check box) are monitored for input reflecting a change in the rule applied to the selected entire group, and the rule change is captured from the input and the new group created in step S7620. If the new group is within a previously existing group, three new groups may be created (e.g., the new group selected as well as one or two fractional remainder groups reflecting that part of the previously existing group which was not changed). In each case, in step S7622, the rule change is applied and the process proceeds back to step S7602 to update the toolpaths per the rule change or range change, as well as the graphical representation (7604) and representation on the orthogonal bar (S7606).

FIGS. 10A and 10B show an embodiment of the orthogonal layer topography bar OB1.2a-OB1.2c. This interface may be used in preparing a continuous fiber reinforcement preform. As shown and described, like elements throughout the figures are often like numbered, but some numbers may be omitted in these views. The description of elements of substantially identical appearance in other drawings generally applies to FIGS. 10A and 10B, including the described associations among displays, processes, and databases. The orthogonal layer topography bar OB 1.1 is described in the context of exclusive rule sections RS1-RS4 (although it may be used with non-exclusive rule sections), FIGS. 10A and 10B are described in a context of rule sections RS7-RS9 which may overlap. As shown in FIGS. 10A and 10B, the orthogonal layer topography bar OB1.2 is formed as a set of independent orthogonal subbars OB1.2a/RS7 through OB1.2c/RS9, each subbar OB1.2a through 1.2c or rule section RS7 through RS9 being associated with adjustment handles at each end of each section.

As shown in FIG. 10A, extending across a lower part of the display 1002, the volume fill graph section VFG-B display element is a topography representation of approximately 150 layers. As shown by the position of the thumb TH1, the currently displayed layer is layer 6 within rule section RS9, within which layers 4-44 and 107-147 include approximately 25% fiber fill as shown by the volume fill graph section VFG4, VFG5. As shown, rule section RS9 is non-contiguous in two parts, i.e., the display, interface, and database may record and apply customized or default rules (toolpath, region, or layer) to non-contiguous but associated ranges of toolpaths, regions, or layers. Rule section RS9 is selected via pointer PO1, and is highlighted between rule adjustment handles HA9 and HA10, and again between handles HA11 and HA12, with annotation AN2 indicating that the common ranges of the rule of the selected rule section is layers 4-44 and 107-147, and annotation AN3 indicating that the rule selectable for an associated "Volume 1" (e.g., a volume formed by the height of the layers 4-44 and 107-147 and either an entire layer or a region within a layer) is a "CONCENTRIC FILL" rule (from among fiber fill types, with the selectable rule itself being changed, e.g., via the selection panel 1004). Reflecting the current index layer, the depicted model shows concentric fill of about 25 percent fiber content in layer 6 within the rule ranges.

FIG. 10B shows a set of changes from the state of FIG. 10A of the display state as well as corresponding processes and databases. In particular, FIG. 10B shows the addition of two additional rule sections RS8 and RS7 to the displays, processes, and databases. Rule set RS8, for example, is a rule applicable from layer 3 to 150, in this case, for example, a rule prescribing the concentric, inner negative contour following hole wall reinforcement pattern HR, surrounding the through-hole W04 which passes through the part in each layer. Rule set RS7, for example, is a rule applicable in layers 35 through 70 and 100 through 125, in which isotropic fill is prescribed for a particular defined region or volume, or for example for any area which is not otherwise subject to a higher priority rule (not that the priority of the rules could be adjusted, e.g., by restacking (rearranging) the rule layers RS7, RS8, RS9 such that the priority order is the order of the stack). As shown in FIG. 10B, the position of the thumb TH1 is shifted to layer 61. The currently displayed layer is layer 50 spanning rule sections RS7, RS8, and RS9, within which the displayed layers includes the 25% volume outer perimeter following concentric fill of rule RS9, the 10% volume circular negative contour perimeter following concentric fill of rule RS8, and the 75%+ volume isotropic fill IF, at this level a 45 degree boustrophedon fill, of rule RS7. As noted, an isotropic fill IF will have a different angle depending on the level (e.g., rotating among 0, +45, −45, and 90 degrees to form repeating quasi-isotropic wafers). As shown by the volume fill graph section VFG6, the 10%, 25%, and 75% volume fill are additive on layers where rules overlap, indicating the simultaneous operation of the rules. Interface element IE1 is selected via pointer PO1, and is shown in a configuration in which the layers indicated by annotation AN2, i.e., layers 35-70 and 100-125, may have a common rule selected for them, in this case isotropic fill. Similarly to the FIG. 10B, annotation AN2 indicates that the rule is selectable for an associated "Volume 3" (e.g., a volume formed by the height of the layers 35-70 and 100-125, and either an entire layer or a region within a layer) is an "ISOTROPIC FILL" rule (from among fiber fill types, with the selectable rule itself being changed, e.g., via the selection panel 1004).

In the case where rules may "overlap" per layer, this may occur in at least two forms. First, within a layer, different regions may have independent rules (e.g., as shown in FIG. 10B, each of three regions—outer perimeter of three fiber rings, hole reinforcement of three fiber rings, and boustrophedon fill of the remainder—may be defined by region). Second, for any path, region, layer, or volume, rules may take precedence by a predetermined priority. One possible priority for rule category precedence is toolpath rules being of highest priority, followed by region rules, then layer rules, then volume or global rules. Within each category, user customizations are of higher priority than default rules, other than safety or minimum functionality defaults.

FIG. 10C shows an alternative display approach to that of FIG. 10A-10B. This display may be used in preparing a continuous fiber reinforcement preform. The bottom portion of the display 1002 is similar to that of FIG. 10A, with the volume fill graph section VFG-B display element as a topography representation of approximately 150 layers, the same as or similar to the volume fill graphs of FIGS. 10A-10B. As shown by the position of the thumb TH1, the currently displayed layer is layer 38 within rule section RS9, within which layers 4-44 and 107-147 include approximately 25% fiber fill as shown by the volume fill graph section VFG4, VFG5. A 3D rendering of the accumulated layers of the part is shown instead of a 2D layer plan view. Optionally, the 3D rendering is more transparent with respect to fill material, walls; and comparatively less transparent for fiber material; optionally with additional luminance for highlighted sections of fiber material. As shown, section RS9 is selected via pointer PO1, and a fiber highlight FHL corresponding to the fiber tracks of rule section RS9 is arranged and/or highlighted within the 3D rendering of the part.

Accordingly, a machine implemented method for displaying 3D printable model shells on a display 1002 may include displaying a multidimensional shell of a sliced model (such as the 2D additive manufacturing layer representations of FIGS. 10A through 10C, or the 3D rendered additive manufacturing model, mesh, or accumulation of layers representation of FIG. 10C) on the display. An orthogonal bar OB1.1, OB1.2 is displayed together with the displayed shell(s) parallel to an edge of the display. A first proportional grouping bar RS1~RS9 is displayed relative to a first range, similarly/respectively RS1~RS9 of the orthogonal bar OB1.1, OB1.2, the first proportional grouping bar RS1~RS9 representative of a first toolpath rule (e.g., no fiber, concentric, isotropic) common to a first range of shells at index positions within the range. A movement of a pointer PO1 in a direction relative to the display and/or an actuation of the pointer is detected (e.g., a mouse click; a touchscreen tap; a button press associated with pointer). In response to detecting the movement and/or the actuation of the pointer PO1, one or both of the toolpath rule or the range is changed. For example, in response, the printer or its slicer processing may be configured to change the first toolpath rule common to the first range of shells to a different, second toolpath rule common to the first range of shells. In the alternative or in addition, the printer or its slicer processing may be configured to change the first range of shells to a different, second range of shells having the first toolpath rule common thereto. Subsequently or simultaneously, the printer or its slicer processing may be configured to change the displayed multidimensional shell of the sliced model so that the change of the toolpath rule and/or the change of the range of shells is one of highlighted or displayed.

Fiber reinforcement strategies, which may in some cases be used in combination and which may have sub-strategies, include Concentric Inward, Boustrophedon (ox rows, also known as raster, or as isotropic, or quasi isotropic when the direction of rows is rotated or alternated in adjacent layers), Concentric Outward, or Sandwich Panel.

Concentric fill is performed within a layer by first obtaining 80-105% (preferably 85-99%) fiber-width offsets from an outer perimeter of a region of the layer. That is, the offsets form concentric paths that are 80-105% (preferably 85-99%) of the fiber-width as laid. One advantageous globally set region is the non-wall region adjacent a shell or wall thickness region (e.g., 1-3 bonded ranks thick). Fiber is deposited by controlling the deposition head to stroke the center of the concentric fiber fill offsets. When the offset has been looped, an S-shaped, L-shaped or U-shaped crossover or bend lays fiber into the neighboring offset. Concentric fill is suitable for bending and tension loads in particular, and is efficient (fewer turns) as well as inherently strong (no fiber separation permits more force to be transmitted and distributed along the fiber length). As a global setting, concentric fiber fill may be set to be adjacent a floor and or a roof, and/or at a set number of layers from the top and/or bottom of the part. In the alternative, spiral or concentric fill may have no particular orientation, as its direction depends on the perimeter of the part. Optionally, the concentric fill algorithm may be used for other strategies (e.g., for surrounding holes or hole splines for reinforcement). As noted, other settings can be used in combination to, e.g., migrate the crossover or bend between layers, locate crossovers in a particular place, or repeat or vary concentric fill patterns.

Ox-row fill or Raster fill is performed in back and forth rows. U.S. Pat. No. 6,934,600, herein incorporated by reference in its entirety, discloses various implementations of raster fill for nanotube impregnated three dimensional printing. Ox-row fill is performed by specifying an orientation of rows (e.g., lengthwise, widthwise, or at a specified angle) and a region. One advantageous globally set region is again a non-wall region adjacent a shell or wall thickness region. Parallel straight rows, offset by 80-105% (preferably 85-99%) of the fiber width as laid, are calculated side by side traversing the region. If a cutter is available sufficiently close to the tip of the deposition head, the fibers may be cut at each turn, alternating turns, every 3 turns, according to a desired fiber length, and so on. However, a boustrophedon path is optional. Boustrophedon paths can be connected at end rows by 180 degree curved fiber paths of the same diameter as the offset, and/or by folded paths of two right angles (these may alternate). Fiber is again deposited by controlling the deposition head to stroke the center of the concentric fiber fill offsets. When the offset has been looped, an S-shaped crossover lays fiber into the neighboring offset. As a global setting, ox-row fiber fill may be set to be adjacent a floor and or a roof, and/or at a set number of layers from the top and/or bottom of the part. Ox-row fill may be set to substantially repeat a direction of fill (for increased cumulative strength in that direction, or to provide arbitrary or predetermined patterns of two, three, four or more varying directions to increase multi-directional strength (e.g., 90-90 would represent two adjacent 90 degree perpendicular layers; 60-60-60 three adjacent layers each rotated 60 degrees, 45-45-45-45 or 90-45-90-45 four layers following a repeating pattern of reinforcing crisscrossing layers).

In this regard, successive layers of composite may, like traditional lay-up, be laid down at 0°, 45°, 90°, and other desired angles to provide part strength in multiple directions and to increase the strength-to-weight ratio. The controller 20 may be controlled to deposit the reinforcing fibers with an axial alignment in one or more particular directions and locations. The axial alignment of the reinforcing fibers may be selected for one or more individual sections within a layer, and may also be selected for individual layers. For example, as depicted in FIGS. 11C and 12 a first layer 1200 may have a first reinforcing fiber orientation and a second layer 1202 may have a second reinforcing fiber orientation (as may further layers 1204 . . . 1206). Additionally, a first section 1204 within the first layer 1200, or any other desired layer, may have a fiber orientation that is different than a second section 1206, or any number of other sections, within the same layer.

Concentric fiber outward fill is distinct in from concentric fill in that (i) the fiber loops are offset from an inner perimeter formed by an envelope about features or parts to be spanned, rather than outside in. Otherwise, the description with respect to concentric fill applies as would be understood by one of ordinary skill in the art. Fill is performed within a layer by first determining an interior region to be surrounded, e.g., first obtaining an envelope about two features to be circled. Offsets are generated at 80-105% (preferably 85-99%) fiber-width from an outer perimeter of the envelope. Fiber is deposited by controlling the deposition head to stroke the center of the concentric fiber fill offsets. Any S-shaped, L-shaped or U-shaped crossovers may be concentrated on the lengthwise ends, i.e., the curves. of the loops. Alternatively, as with concentric, a "spiral" offset of linearly increasing offset distance may be used to avoid crossovers, but a spiral offset typically does not fully wrap features such as holes. Optionally, the envelope generation and inner perimeter start may be used for other strategies. Through-hole fill, as an example, may treat each hole as an envelope, and extend the fill from top to bottom of the part, lining a hole along greater than 80 percent of its top-to-bottom length. As noted, other settings can be used in combination to, e.g., migrate the crossover between layers, locate crossovers in a particular place, or repeat or vary concentric fill patterns.

As an example, the embodiment of a part rendered and processed include, but are not limited to, the operation of the following rules:

(i) concentric fiber fill in the region R08 between the outermost wall region R06 and the neighboring region R10;

(ii) pure polymer, fill material, or fiber triangular infill in the region R10, which may be a remainder region (set after the other regions are defined) extending between the limits of the fiber fill region R08 and the negative contour W02, W04 outlining wall regions R02, R04.

(iii) a sandwich panel, outer shell, inner shell, outer/inner shell, or cellular rule as discussed below; and (iv) a rule to outline or reinforce holes as discussed below, among other rules.

In some embodiments, a core reinforced filament 1854 is used to form a hole (or surround a protrusion, including a Z-axis direction continuous fiber column orthogonal to, angled with respect to, or curving through a layer) directly in a part, soluble preform, or continuous fiber reinforcement preform, see FIGS. 11A and 11B. More specifically, the core reinforced filament 1854 comes up to the hole (or protrusion or continuous fiber column), runs around it, then exits from the direction it came, though embodiments in which the filament exits in another direction are also contemplated. A benefit associated with this formation method is that the hole is reinforced in the hoop direction by the core in the core reinforced filament. As illustrated in FIG. 11A, the core reinforced filament 1854 enters the circular pattern tangentially. Entering tangentially is good for screws that will be torqued in. In another version illustrated in FIG. 11B, the core reinforced filament 1854 enter the circular pattern at the center of the circle. Of course, it should be understood that other points of entering the pattern are also possible. In one embodiment, the entrance angle may be staggered in each successive layer. For example, if there are two layers, the entering angle of the first layer may be at 0 degrees while the entering angle for the second layer may be at 180 degrees. This prevents the buildup of a seam in the part. If there are 10 layers, the entering angle may be every 36 degrees (e.g., staggering the entering angle by 360 degrees/10 layers) or any other desired pattern or arrangement.

Figure 15:
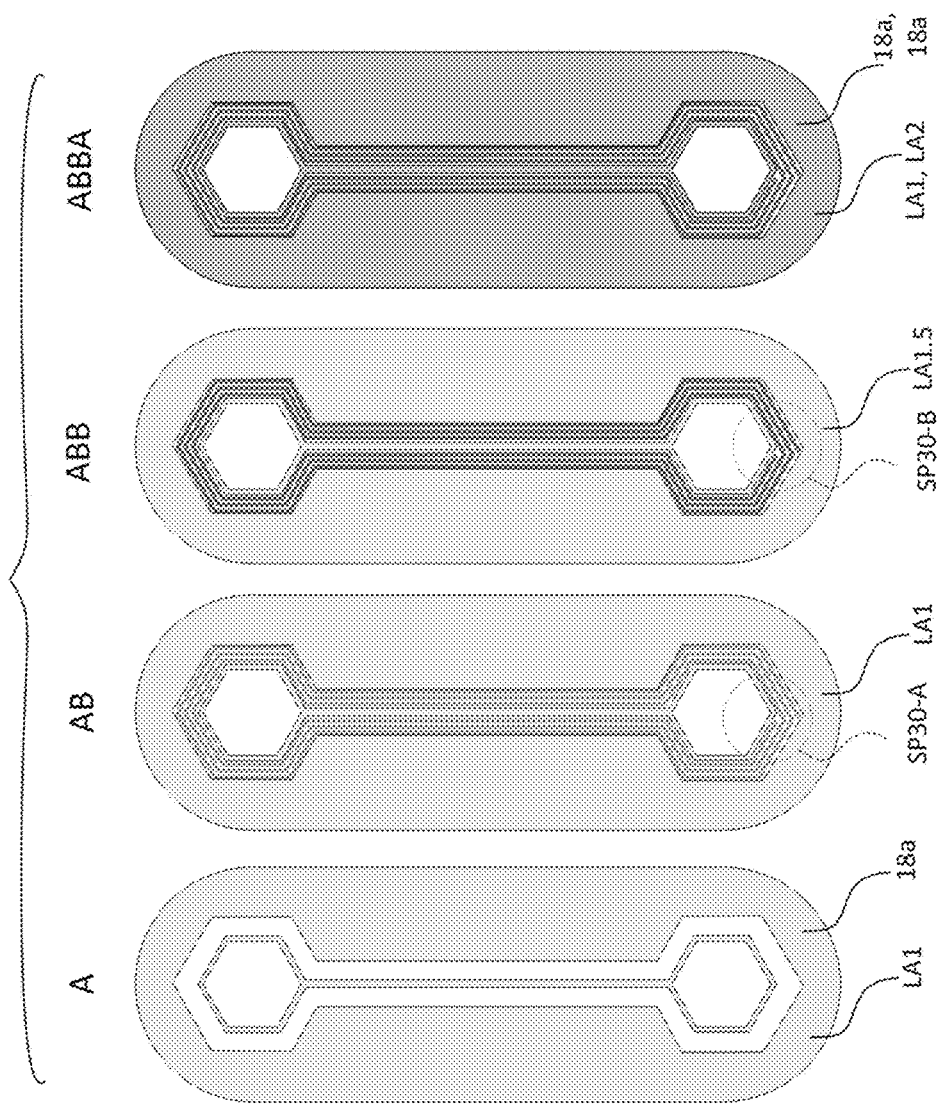
FIG. 15 shows a composite swath 2c of a reinforcement formation in a layer $LA_n$ continuously deposited end-to-end with an adjacent reinforcement formation continuing into the next layer $LA_{n+1}$, i.e., without cutting the composite swath 2c as the part 14 is indexed to the next layer.

Still further alternative or additionally, with reference to FIG. 15, the controller 20 of the printer 1000 may control the actuators and heaters such that depositing the first consolidated composite swath 2c and the second consolidated composite swath 2c as a continuous composite swath 2c spanning (e.g., via inter-layer continuous traverse SP30-A, SP30-B) two shells $LA_n$, $LA_{n+1}$ of an additive manufacturing process. That is, the fiber is not cut but is continuous between two additive fill material layers. This technique may be used in preparing a continuous fiber reinforcement preform.

Still further alternative or additionally, the controller 20 of the printer 1000 may control the actuators and heaters such that the first consolidated composite swath 2c is deposited in a first reinforcement formation 99A-99Z that has a higher strength in tension between a first negative contour (or hole $H_a$) and a second negative contour (or hole $H_b$) than the second reinforcement formation 99A-99Z.

The secondary print head 18 prints fill material or soluble material to form walls, infill, protective coatings, and/or support material on each layer, and as described herein, to smooth over protrusions into neighboring layers, and/or to form a soluble preform.

Consolidation, Compression and/or Flattening of Composite Swaths

A preferred technique for depositing a core-reinforced filament to become a fused composite swath includes compressing a core reinforced filament exiting a conduit nozzle to form a flattened shape (as discussed in the CFF patent applications).

The flattened shape is of variable height-to-width proportion, e.g., in cross-section from 1:2 through about 1:12 proportion. Preferably, the height of a compressed composite swath 2c substantially corresponds to the fill material layer height in the same layer $LA_1$, so that neighboring composite swaths 2c in the vertical direction can be tightly packed, yet be built up as part of the same or adjacent layers as the surrounding, complementary and/or interstitial fill material 18a.

Inter-layer interaction among composite swaths 2c and fill material 18a may be more involved than interlayer interaction among layers of fill material 18a. In most cases, an optional requirement for adjacent layers of fill material 18a is that they are satisfactorily fused in the vertical direction to avoid delamination, and in many cases the fill material 18a is fused (melted, or cured) under ambient or room pressure.

A core-reinforced multi-strand composite filament 2 may be supplied, for example, as a circular to oval cross section, and/or of approximately ⅓ mm in diameter and/or "13 thou" diameter.

As shown in Table 1 below, a circular cross-section filament 2 compressed during deposition becomes a progressively wider composite swath 2c. The table uses an example dimensionless diameter of 3 units for "round numbers".

As shown in the table, for any size of substantially circular cross section core reinforced filament 2, flattening to about ⅓ of its diameter becomes about 2.2-2.5 times as wide as its original diameter, and if flattened to about ½ its diameter becomes about 1.4-1.7 times its original diameter.

TABLE 1

Example Diameter (Circle): 3 units
Rectangle Compression

|  | H | W |
|---|---|---|
| ⅔ D height | ~2 | ~3½ |
| ½ D height | ~1½ | ~4½ |
| ⅓ D height | ~1 | ~7 |
| ¼ D height | ~¾ | ~9½ |

For example, to complement an additive manufacturing layer height of 0.1 mm, a ⅓ mm diameter core reinforced filament 2 may be flattened to a composite swath 2c of roughly rectangular shape of proportion 1:6 through 1:12 (herein "highly compressed"), e.g., about 0.7-1.1 mm wide by about 0.07-0.12 mm high. One preferred ratio is roughly 1:9. Even higher compression may be possible, e.g., 1:12 to 1:20, but may demand significant system stiffness in the printer 100.

In contrast, to complement an additive manufacturing layer height of 0.2 mm, a ⅓ mm diameter core reinforced filament 2 may be flattened to a composite swath 2c of roughly rectangular shape of proportion 1:1.5 to 1:4 (herein "lightly compressed"), e.g., about a roughly rectangular shape of about 0.4-0.6 mm wide by about 0.2 mm high.

However, a fiber-embedded rectangular cross section of 1:1.5 to 1:3 is not as compressed or consolidated as one of 1:6 to 1.12 proportion, and in many cases, an relatively higher amount of consolidation is preferable to reduce voids and improve mingling of fibers in adjacent ranks 2c-2c or 2c-2d.

It should be noted that a supplied fiber reinforced filament 2 may have a constant cross-sectional area as supplied and as deposited (unless coextruded or supplemented); while a supplied FFF filament 18a has both a very different cross-sectional area as supplied and as deposited (having a much larger diameter as supplied), as well as variable cross-sectional area as deposited (having a bead size depending on extrusion rate). Given that a highly compressed composite swath is preferable to a lightly compressed one, combining a larger FFF extrusion rate layer height (e.g., 0.3 mm) with a highly compressed composite swath (e.g., 1:9 ratio) may be challenging. Accordingly, when a fill material height is such that the amount of compression is unacceptably reduced, more than one layer of fiber may be arranged per layer of fill material (e.g., 2 or 3 1:9 sublayers of 0.1 mm composite swath 2c per one respective 0.2 or 0.3 mm layer of fill material 18a). In this case, most or all fill material 18a is deposited after the composite swaths 2c; although in an alternative mode self-collision detection may be used to avoid contacting the nozzles to the part and the order of deposition thereby varied. In addition, in a modification of this process, the fill material height and compression amount may be selected to match stacks of 1:6-1:12 "highly compressed" composite swaths 2c (e.g., for a fiber of ⅓ mm diameter, the matching fill material 18a layer height capped at approximately 0.24 mm, because the highest acceptable "highly compressed" stack of two fibers is 1:6 ratio×2, or 0.12 mm×2).

It should be noted that the cross-sectional representation of reinforcing strands 4a within filament 2a and deposited swaths 2c are schematic only. In most cases, the reinforcing strands are in the hundreds to thousands of parallel strands within the filament 2a or swaths 2c.

Extrusion Toolpaths and/or Extrudates

In general, in the "FFF" or "FDM" extrusion method of additive manufacturing, extrusion beads in adjacent layers LA$_n$, LA$_{n+1}$ may be arranged to run either parallel or transverse to one another, without crossing while within a layer. A "retract" may be performed in the filament feed path to stop nozzle flow and move from one isolated area to another to restart extrusion, but the active printing beads tend to remain uncrossed. This is reasonable, because continuing to extrude while crossing a previously printed bead may cause extrudate to jet out horizontally and unpredictably as the nozzle is partially blocked. Additionally, any time spent extruding with a blocked nozzle reduces the amount of active deposition of extrusion. Slicing software generally avoids creating extrusion toolpaths which cross one another.

However, in the FFF printer discussed herein, extrusion toolpaths may cross one another in the same manner as described with respect to core reinforced fiber toolpaths, partially enabled by a fast-response clutching in the filament supply for the extrusion head 18, e.g., a low motor current or other slippable drive. This is also the case when the fill material or fiber will form part of a continuous fiber reinforcement preform. In such a case, crossing extrusion toolpaths should cross at a high angle (e.g., from 45-90 degrees) and/or limited to short periods of time or narrow existing beads (e.g., for ¹⁄₁₀ to ¹⁄₁₀₀ of a second, e.g., for a printing extrusion speed of 300 mm/s, crossing no more than 1 mm of previously solidified extrudate, and preferably ¼ to ½ mm of solidified extrudate). This is particularly advantageous in the case of honeycomb fills of patterned lines (e.g., triangular tessellation, e.g., of 60-60-60 degree crossing straight paths, either with all paths intersecting (e.g., triangular honeycomb or two paths intersecting with one path offset (e.g., Star of David network or honeycomb).

Generally, even the fast-response buffered crossing of a newly extruded bead or road of fill material 18a across a previously printed extrusion bead or toolpath may not change the layer height of the current layer LA$_n$ either on top of the solidified bead crossed or in the currently deposited row, i.e., neat plastic does not generally vertically accumulate as beads are crossed. Rather, fluidized fill material 18a tends to find a least resistance direction to escape horizontally or downward when the extrusion nozzle 18 is blocked by a previously deposited bead[0190] As discussed herein, metal and ceramic matrices are also possible, for example as a matrix with either the chopped fiber rods, short fiber, long fiber, or continuous reinforcing fiber, in approximately 0.1-25% (preferably approx. 5-15%) volume fraction of carbon fiber strands, each fiber strand coated with a metal that does not react with carbon at, e.g., sintering temperatures or below (e.g., nickel, titanium boride). In the case of a 3D printing deposition that is sintered while or after printing, the ceramic or metal material of the matrix holds the fiber filler. Carbon fiber is not the only reinforcing material, e.g., a chopped fiber rods, short fiber, long fiber, or continuous reinforcing fiber having approximately 2-10 times the elastic modulus of the metal or ceramic matrix material is beneficial. In addition or as an alternative to the chopped fiber rods, short fiber, long fiber, or continuous reinforcing fiber, other reinforcing particles (e.g., particles, whiskers, nanostructures, spheres or irregular dispersed material) of a material having approximately 2-10 times the elastic modulus of the metal or ceramic matrix material may also be beneficial.

A comparison of elastic modulus may be found in the following table, of matrix vs. reinforcement:

| Matrix | Elastic Modulus ($10^9$ N/m², GPa) | Fill/Fiber | Elastic Modulus ($10^9$ N/m², GPa) |
|---|---|---|---|
| Steel | 180-200 | Carbon Fiber | 200-600 |
| Aluminum | 69 | Graphite Fiber | 200-600 |
| Copper | 117 | Boron Nitride | 100-400 |
| Titanium | 110 | Boron Carbide | 450 |
| Alumina | 215 | Silicon Carbide | 450 |
| Cobalt | 209 | Alumina | 215 |
| Bronze | 96-120 | Diamond | 1220 |
| | | Tungsten Carbide | 450-650 |
| | | Graphene | 1000 |
| | | Carbon Nanotube | 1000+ |

Some candidate matrix-filler combinations that may be deposited by a 3D printer include cobalt or bronze matrix with tungsten carbide coated graphite (carbon) fibers; aluminum matrix with graphite (carbon) fibers; steel matrix with boron nitride fibers; aluminum matrix with boron carbide fibers; aluminum matrix with nickel coated carbon fibers; alumina matrix with carbon fibers; titanium matrix with silicon carbide fibers; copper matrix with aluminum oxide particles (and carbon fibers); copper-silver alloy matrix with diamond particles. Those fibers that may be printed via the techniques of the present application and the CFF patent applications may also be embedded as continuous fibers. Carbon forms for particles or fibers include carbon nanotubes, carbon blacks, short/medium/long carbon fibers, graphite flakes, platelets, graphene, carbon onions, astralenes, etc.

As discussed herein, the 3D printer may additively deposit one or more of the continuous reinforcing fiber, soluble preform, or non-soluble support preform in a reinforcement volume to form a continuous fiber reinforcement preform. The soluble preform may be dissolved before any overmolding. As an additively manufactured body, the preform may be far more complex than simply a sheet, panel, or curved panel, the preform may be a "complex solid", i.e., produced by combining and/or removing parts of three dimensional shapes including at least some of cuboids, cylinders, prisms, pyramids, spheres, and cones. The continuous fiber reinforcement preform (optionally with a non-soluble support preform) may be located within a mold of a molding apparatus, and the mold loaded with molten molding material. The molding material is hardened to overmold the continuous fiber reinforcement preform (optionally with a non-soluble support preform), thereby forming a reinforced molding surrounding an internal continuous fiber reinforcement preform (optionally with a non-soluble support preform) with a hardened molding material, wherein the reinforcement volume is smaller than a volume of the entire reinforced molding. The continuous fiber reinforcement volume may include a continuous/random fiber reinforced composite filament including (a) a plurality of axial fiber strands extending substantially continuously within a matrix material of the fiber reinforced composite filament (b) a multiplicity of chopped fiber, fiber rods, short fiber, and/or particulates dispersed throughout the matrix material. The non-soluble support preform may include the matrix material and a multiplicity of chopped fiber, fiber rods, short fiber, and/or particulates dispersed throughout the matrix material. The matrix may be plastic, resin, or polymer (e.g., of 1-5 GPa elastic modulus), metal or ceramic.

The continuous fiber reinforcement volume may include the continuous/random fiber reinforced composite filament and a matrix that may be heated to a liquid state (e.g., a crystalline material having a melting temperature, an amorphous material having a glass transition temperature, or a semi-crystalline material having both) within which the continuous/random fiber reinforced composite filament is additively deposited, and the reinforcement volume is less than 20 percent of the entire reinforced molding volume.

Alternatively, or in addition, the molding is performed at a molding material pressure which removes air voids within the fiber reinforcement matrix material. Further, the continuous fiber reinforcement preform including the continuous/random fiber reinforced composite filament may be bent or deformed from its formation shape to a deformed shape within the mold. Further optionally, two or more continuous fiber reinforcement preforms may be bonded to one another before location within the mold.

In some embodiments, the mold is an injection mold, and pack pressure of the injection molded material during molding consolidates the fiber reinforcement preform into a final shape and removes voids within the fiber reinforcement preform. If the mold is an injection mold, and heat from injected molding material may remelt a matrix material of the fiber reinforcement preform. In some examples, the fiber deposition is an additively deposited thermoplastic continuous fiber reinforced prepreg tape having a width at least three times its height, which may also include the multiplicity of chopped fiber, fiber rods, short fiber, and/or particulates dispersed throughout the matrix material. Optionally, vacuum may be applied during at least one of formation of the continuous fiber reinforcement preform and the molding to remove voids.

In one optional approach, a support material is formed in a first shape as a support preform, and the continuous reinforcing fiber is additively deposited in the reinforcement volume in a second shape following a contour of the removable support preform to form a continuous fiber reinforcement preform. Optionally, at least one part of the support preform extends to be contiguous with a surface of the reinforced molding. In another example, the support preform is formed in a non-looped shape for permitting additively depositing the continuous fiber reinforcement preform by winding about the support preform. The support preform may itself be injection molded, and may be injection molded as a honeycombed structure, with a contiguous outer surface suitable as a winding substrate. The support preform and continuous fiber reinforcement preform may be formed in alternating successive additive and injection molded stages. The support preform may be formed from an additively deposited or injection molded matrix material, such as plastic, resin, or polymer (e.g., of 1-5 GPa elastic modulus), metal or ceramic, and including the multiplicity of chopped fiber, fiber rods, short fiber, and/or particulates dispersed throughout the matrix material.

Optionally, the support preform is formed in a substantially rotationally symmetric shape or mandrel for permitting additively depositing the continuous fiber reinforcement preform by winding about the support preform. In one embodiment, the support preform is relatively moved in at least one rotational degree of freedom with respect to a deposition head that additively deposits the continuous and/or continuous/random reinforcing fiber in the second shape following the contour of the preform to form the continuous fiber reinforcement preform.

A continuous fiber reinforcement preform may embed at least one sandwich panel structure. The sandwich panel structure is optionally a foldable structure, having a linear gap formed therein opposite a fold line to form a hinge.

Further optionally, the support preform is formed including a soluble material, and further comprising dissolving the preform. The support preform may be dissolved before locating the continuous reinforcement fiber preform (optionally including the continuous/random reinforcement fiber material) within the mold, and/or the support preform may be one of displaced, melted, or dissolved by the mold loading. Alternatively, or in addition, the support preform may be dissolved after the mold material is hardened. The support preform may be dissolved at least in part before location in the mold, and at least in part after the reinforced molding is hardened. The support preform may be bent or deformed from its formation shape to a deformed shape for depositing the fiber reinforcement to form the continuous fiber reinforcement preform. In one embodiment, a wide prepreg sheet is arranged against the support preform before additively depositing continuous fiber tape prepreg.

Optionally, the continuous reinforcement preform is located in the reinforcement volume following a contour to form the continuous fiber reinforcement preform as a first reinforced panel. In this case, a further step or act may be locating a honeycombed panel of molding material alongside the first reinforced panel, wherein the molding material is hardened to overmold the honeycombed panel against the first reinforced panel, thereby forming a fiber reinforced molding including a molding material honeycomb and a continuous fiber reinforcement. Optionally, a second reinforced panel is additively continuous fiber deposited upon the honeycombed panel. The second reinforced panel may be formed having a joining surface mirroring a surface of the first reinforced panel. A honeycomb structure may be formed as a support preform upon which the second fiber reinforced preform is deposited.

In each case, the molding material may be substantially isotropic in tensile strength (e.g., a resin, metal, or ceramic, including some reinforced with additives), and the continuous reinforcing fiber as well as the continuous/random reinforcing fiber are substantially anisotropic in tensile strength (e.g., carbon, glass, aramid, basalt, UHMWPE, or other continuous and/or long fibers). According to one aspect of embodiments of the present invention, a method for manufacturing a part may include supplying a continuous/random fiber reinforced composite filament including a matrix material, a plurality of axial fiber strands extending substantially continuously within the matrix material, and a multiplicity of fiber rods between 0.2-10 mm long dispersed throughout the matrix material. The continuous/random fiber reinforced composite filament is received in a cutter, and may be cut there. The continuous/random fiber reinforced composite filament is received in a nozzle. A dragging force is applied from the part via the axial fiber strands but not via the dispersed fiber rods. Pressure is applied with the nozzle to continuously spread and fuse the continuous/random fiber reinforced composite filament into the part, and also to continuously embed a proportion of the short chopped fiber rods against previously deposited portions of the part.

Alternatively, or in addition, the fiber rods at or near the surface of a previously deposited layer of the part may be forced to interact with one or more of a fill material, matrix material, axial fiber strands or neighboring fiber rods. Optionally, the continuous/random fiber reinforced composite filament is supplied with fiber rods forming a 1-20% volume fraction of the continuous/random fiber reinforced composite filament. The continuous/random fiber reinforced composite filament may be supplied with axial fiber strands of a different material from the fiber rods, and/or with the axial fiber strands formed from glass and the fiber rods formed from carbon. The continuous/random fiber reinforced composite filament may supplied with the fiber rods oriented in random directions, and/or with the fiber rods oriented at least in part non-randomly. The continuous/random fiber reinforced composite filament may be supplied with fiber rods having an aspect ratio from 20:1-200:1, and/or with the fiber rods including fiber chopped to 0.05-10 mm length (preferably 0.2 to 2 mm length to be managed in a slightly larger, e.g., 0.25 to 2.5 mm diameter, nozzle without clogging).

Further optionally, the deposition head may be driven to force the second proportion of the fiber rods to bridge successive layers of continuous/random fiber reinforced composite filament.

In a further aspect of embodiments of the present invention, a continuous/random fiber reinforced composite filament may be supplied similarly with a matrix material, a plurality of axial fiber strands extending substantially continuously within the matrix material, and a multiplicity of fiber rods between 0.2-10 mm long dispersed throughout the matrix material, at least some of the dispersed fiber rods being oriented transversely to the axial fiber strands. A fill material may be supplied separately from the continuous/random fiber reinforced composite filament, including second dispersed fiber rods between 0.2-10 mm long. The continuous/random fiber reinforced composite filament may be deposited within a first region formed in an outward portion of a part that is closer to an outer wall of the part than to a centroid of the part, and the fill material may be deposited within a second region formed in a portion of the part that is positioned inward from the first region. Heated pressure may be applied to continuously melt and spread the core reinforced filament, and/or to continuously embed a proportion of the first dispersed fiber rods against a previously deposited continuous/random fiber reinforced composite filament, and/or to continuously embed a proportion of the first dispersed fiber rods.

In a still further aspect of embodiments of the present invention, a three dimensional printer for additive manufacturing of a part may include a supply of a continuous/random fiber reinforced composite filament including a matrix material, a plurality of axial fiber strands extending substantially continuously within the matrix material, and a multiplicity of fiber rods between 0.2-10 mm long dispersed throughout the matrix material. The printer may further include a deposition head including a conduit transitioning to an ironing lip, a deposition head drive driving the ironing lip, and a filament drive pushing an upstream portion of the continuous/random fiber reinforced composite filament to force an unattached terminal end of the filament to exit the conduit at the ironing lip. A controller operatively connected to the filament drive and the deposition head drive may drive the deposition head to spread the continuous/random fiber reinforced composite filament against previously deposited portions of the part to (a) flow the matrix material and a first proportion of the fiber rods interstitially among the axial fiber strands, and/or (b) force a second proportion of the fiber rods against previously deposited portions of the part.

In a still yet further aspect of embodiments of the present invention, a method for manufacturing a part may include supplying a continuous/random fiber reinforced composite filament including a matrix material, a plurality of axial fiber strands extending substantially continuously within the matrix material, and a multiplicity of fiber rods between 0.2-10 mm long dispersed throughout the matrix material. The continuous/random fiber reinforced composite filament may be deposited in successive layers. Pressure may be applied to continuously spread and fuse the continuous/random fiber reinforced composite filament to previously deposited layers and to continuously embed a proportion of the short chopped fiber rods against previously deposited layers. A fiber reinforced preform may be formed by the application of pressure to successive layers of continuous/random fiber reinforced composite filament, and may be inserted in a mold. The fiber reinforced preform may be overmolded into a fiber reinforced molding.

In an additional aspect of embodiments of the present invention, a continuous fiber reinforced composite filament may be supplied including a matrix material, with a plurality of axial fiber strands extending substantially continuously within the matrix material. The continuous fiber reinforced composite may be received in a cutter, and cut there. The continuous fiber reinforced composite may be received in a nozzle. Pressure may be applied to continuously spread and fuse the continuous/random fiber reinforced composite filament into the part. Negative contours may be formed in successive layers of the part, and continuous reinforcing columns bridging multiple successive layers of the part inserted through the negative contours.

Wear Resistance

Thermoplastic composites can cause wear on any soft metal (brass, aluminum, copper) and even on conventional or softer steels. Glass fiber filler may have a Mohs hardness substantially of 5 to 7, where carbon fiber may have a Mohs hardness substantially of 2 or 3, and tool steels of approximately 4. Parts that must resist the abrasive effect of carbon or glass fiber filler may be made with resistant tool steel, such as A-2 or D-2 tool steel hardened to Rockwell C58-C60, or tool steels S-7 or H-13. These materials may be further or alternatively hardened with abrasion resistant electroless nickel plating, slow deposition dense chrome, Nye-Carb (nickel silicon carbide) plating, chrome plating, or physical vapor deposition plating (PVD). Hardening the material, e.g., the A-2 or D-2 tool steel, to Rockwell C ~60+, may resist most wear.

Accordingly, in a three dimensional printer 1000 which prints composite material, the non-matrix fiber (continuous or chopped) or filler (e.g., also continuous or chopped or particulate) may have an abrasive effect on the mechanical components of the system, wearing down these components. As the non-matrix filler or fiber 6a, 6b, 18b is harder, the abrasive effect may be more significant. Additionally, higher speeds (e.g., in a nozzle throat vs. a nozzle body) and higher pressures (e.g., for compressed or consolidated continuous fiber) may also increase the abrasive effect.

Some representative hardnesses for filler material and nozzle and other part material are in the following Table. Hardness Scales with Approximate Equivalency for the Present Application.

| Rockwell C | Vickers | Knoop | Mohs | Example(s) |
|---|---|---|---|---|
| | | 1300+ | 7.5+ | Tungsten Carbide, other carbides and nitrides |
| 66-68 | ~900-1100 | ~900 | 6.5 | Some W tool steels, powder metallurgy tool steels |
| 60 | ~700 | ~700 | | A-2, D-2 Tool Steel |
| 50 | ~500 | ~500 | 5 | H-13 as quenched, Harder stainless steels |
| 40 | ~400 | ~400 | | Beryllium 25 Copper |
| 35 | ~350 | ~350 | 4.2 | Some stainless steels |
| 30 | ~300 | ~300 | | Softer stainless steels |

In a system with one nozzle which prints a composite material, the material supply path may include guide tubes or Bowden subject to wear, one or more drive wheels subject to wear, a nozzle throat subject to wear, all of these being worn by the material itself 2 or 18a being transported through the system. In addition, where a continuous fiber prepreg 2 or other material is cut (e.g., continuous core material as described herein), the cutter blade 8a may become worn. Further, as the nozzle tip 1803 moves back and forth upon previously printed lines, roads or swaths 2c, the tip 1803 may also wear. In a system with two or more nozzles, one of which prints a composite material, even if one or more of the nozzles prints non-abrasive material, the same effects occur, except that the non-composite or non-abrasive nozzle may become worn at the tip 1803 by rubbing against previously deposited rows of the composite material. In a system with two or more nozzles in which at least two print a composite material, each non-composite and composite nozzle tip may be worn by at least two types of previously deposited composite material.

With reference to FIGS. 1A-1F and 16-20, a three dimensional printer 1000 may include a supply of material, the material including a matrix material (e.g. a polymer, metal, or ceramic) and a filler or fiber material, in which the filler or fiber material has a Mohs hardness greater than 3, or a Knoop/Vickers hardness greater than substantially 300 kg/mm$^2$, or a Rockwell C hardness greater than substantially C30 (e.g., continuous fiber 6a and/or chopped fiber 6b or 18c, such as carbon or glass fiber, and the like as described herein). A drive wheel 40, 42 or 1830 may for advance the material 2, 2a, or 18a. Material may be deposited through a heated conduit nozzle 708 or extrusion nozzle 1802 through which the material is dispensed. The heated nozzle may include a nozzle body 1802a through which heat is applied to the material, a nozzle throat such as the small channel at the end of nozzle 1802 or 714, distal within the nozzle body 1802a, and a nozzle tip such as 726 or the lower face 1803 of nozzle 1802 also distal within the nozzle body.

The material passing through the nozzle throat is deposited past the nozzle tip, and as shown in FIGS. 16-20, the nozzle tip 1803 may contact a top surface of previously deposited lines 18a or 2d of material (extruded or deposited continuous fiber swaths 2c, 2d) adjacent the currently deposited line of material. A nozzle body 1802a including a material having a thermal conductivity of substantially 35 w/M-K or higher (for example, steel, beryllium 25 copper, brass, tungsten carbide, or copper, or similarly heat conductive materials) permits heat to be transferred to the melt zone 1804 or nozzle tip 726 or 1803 sufficient to melt material, while a nozzle throat (such as the fine channel at the very tip of nozzle 1802) of a material having a Rockwell C hardness substantially C50 or higher or Knoop/Vickers hardness substantially 500 or higher (for example hardened tool steel A-2, D-2, tungsten carbide, or similarly hard materials) permits the nozzle throat to resist abrasion and wear from the material passing through the nozzle throat. In one configuration, for example in which a non-abrasive or non-composite extrusion material and an abrasive composite continuous fiber material are used in a system, a first supply of a first material, the first material may be a composite material including a matrix material and a filler or fiber material (e.g., continuous fiber), in which the filler or fiber material has a Mohs hardness greater than 1 (carbon fiber considered to be Mohs 2 or 3 for the purposes of the present disclosure), or a Knoop/Vickers hardness greater than substantially 300 kg/mm$^2$, or a Rockwell C hardness greater than substantially C30. In this case, the cutter 8a for the continuous fiber material 2 may be arranged along a material supply path from the first supply of first material. It should be noted that for the purposes of this description and the claims, a chopped carbon filler is considered to have a Mohs hardness of greater than 1, and in many cases greater than 2 or 3.

In another configuration, for example in which a composite filler extrusion material and an abrasive composite continuous fiber material are used in a system together, the first supply of a first material may include a matrix material and a filler or fiber material, in which the filler or fiber material has a Mohs hardness greater than substantially 1 (in some cases greater than 2 or 3), or a Knoop/Vickers hardness greater than substantially 300 kg/mm$^2$, or a Rockwell C hardness greater than substantially C30. The second supply may also include abrasive material. In this case, in order to responsively control temperature for printing the composite extrusion material as well as from the continuous fiber material, either or both nozzle bodies 1802 or 1802a may include a material having a thermal conductivity of substantially 35 w/M-K or higher (for example, steel, beryllium 25 copper, brass, tungsten carbide, copper, or similarly heat conductive materials). In order to resist abrasion from ongoing extrusion of material or rubbing previously deposited material, the nozzle throat and nozzle tip 1803, particularly of an extrusion system, may each include a material having a Rockwell C hardness substantially C40 or higher or Knoop/Vickers hardness substantially 400 or higher (for example, hardened beryllium 25 copper, hardened tool steel A-2, D-2, tungsten carbide). The continuous fiber conduit nozzle 199 may optionally similarly include a hardened material in order to resist wear from rubbing.

In any of these configurations, for resisting wear from the continuous fiber 6a within the matrix, the cutter 8a may include a blade having a Rockwell C hardness substantially C60 or higher or Knoop/Vickers hardness substantially 700 or higher (for example hardened and/or coated tool steel A-2, D-2, or harder tool steels, tungsten carbide, or similarly hard materials). At the same time, the tip of the extrusion nozzle 1802 may be subject to wear from previously deposited continuous fiber swaths or lines 2c, 2s. The extrusion system may include a second supply of a second material 18a, and a heated nozzle 1802 through which the second material is dispensed. The heated nozzle 1802 may include a nozzle body through which heat is applied to the second material, a nozzle throat distal within the nozzle body and a nozzle tip 1803 distal within the nozzle (the end face of the extrusion nozzle 1802). The second material passes through the nozzle throat at the tip of the extrusion nozzle 1802 to be deposited past the nozzle tip, but the nozzle tip of the extrusion nozzle 1802 may contact a top surface of a previously deposited line of first material 2c, 2d adjacent a currently deposited line of second material 18a.

Or, in the case where the material 18a is instead a composite material with abrasive filler 18b, it may also contact a top surface of previously deposited extrusion material 18a. In this case, for a well-controlled extrusion system, the nozzle body 1802, 1802a may include a material having a thermal conductivity of substantially 35 w/M-K or higher (for example, steel, beryllium 25 copper, brass, tungsten carbide, copper, or similarly heat conductive materials), and in order to resist wear from the neighboring system or itself, the nozzle tip 1802c may include a material having a Rockwell C hardness substantially C40 or higher or Knoop/Vickers hardness substantially 400 or higher (for example, hardened beryllium 25 copper, hardened tool steel A-2, D-2, tungsten carbide). One suitable construction for an extrusion nozzle 1802 capable of resisting wear from its own composite material and a neighboring composite deposition system includes a nozzle throat and nozzle tip 1803 each include a material having a Rockwell C hardness substantially C50 or higher or Knoop/Vickers hardness substantially 500 or higher.

Optionally, for any of these configurations, the nozzle tip, such as the distal end face 1803 of extrusion nozzle 1802 or nozzle tip 726, includes a material having a Rockwell C hardness substantially C40 or higher or Knoop/Vickers hardness substantially 400 or higher (for example, hardened beryllium 25 copper, hardened tool steel A-2, D-2, tungsten carbide), which permits the nozzle tip 1803 so hardened to resist abrasion by filler and/or fiber within any material previously deposited 2d or 18a.

Further optionally, for any of these configurations, the nozzle throat and tip 1802b, 1803 (or 726) may be made of a same or similar material, integral or bonded. A nozzle throat/tip 1802b of this type may resist abrasion both from material passing through it, and material against which it rubs. For example, an extrusion nozzle 1802 having a nozzle throat and nozzle tip 1802b, 1803 each including a material having a Rockwell C hardness substantially C40 or higher or Knoop/Vickers hardness substantially 400 or higher (for example, hardened beryllium 25 copper, hardened tool steel A-2, D-2, tungsten carbide) may resist abrasion from chopped or particulate filler 18b within the extrusion material 18a, but also from previously deposited material—extruded 18a or deposited 2c, 2d.

For any of these configurations, extrusion nozzles 1802 may often be made of higher thermal conductivity materials for faster and more efficient control, and the system is superior if the nozzle body 1802, 1802a includes a material having a thermal conductivity of substantially 50 w/M-K or higher (for example, brass, tungsten carbide, or copper, or similarly heat conductive materials). Moreover, the system may resist harder particulate or fiber content, or last longer, if it is harder, e.g., if the nozzle throat includes a material having a Rockwell C hardness substantially C60 or higher or Knoop/Vickers hardness substantially 700 or higher (for example hardened and/or coated tool steel A-2, D-2, tungsten carbide, or similarly hard materials).

As noted, for any of these configurations, it is more efficient and easier to manufacture systems in which at least the nozzle throat and nozzle tip 1803 are integrated with one another. One example of this would be if the nozzle throat and nozzle tip 1803 each include a material having a Rockwell C hardness substantially C60 or higher or Knoop/Vickers hardness substantially 700 or higher (for example hardened and/or coated tool steel A-2, D-2, or harder tool steels, tungsten carbide, or similarly hard materials).

In one alternative, for any of these configurations, the features of thermal conductivity and hardness are combined in one material that both permits better control of applied heat and resists wear. For example, a portion of the nozzle body 1802a (of sufficient thermal mass to participate in heating the nozzle throat and tip), the nozzle throat, and nozzle tip 1803 may be unitarily formed including a material having a thermal conductivity of substantially 60 w/M-K or higher as well as a Rockwell C hardness substantially C60 or higher or Knoop/Vickers hardness substantially 700 or higher. Materials with high thermal conductivity and high hardness are fewer than materials with only one attribute in this case, the nozzle body, sleeve, or tip may be formed from tungsten carbide and other sintered carbides, qualifying nitrides having suitable thermal conductivity and hardness, or similarly heat conductive, hard materials.

One alternative, for any of these configurations, uses a combination of very high thermal conductivity nozzle body 1802a and high thermal conductivity, high hardness insert 1802b for with a majority of the thermal mass of the nozzle body 1802 including a material having a thermal conductivity of substantially 200 w/M-K or higher (e.g., some brasses, aluminum, copper), an insert 1802b may be used. For the nozzle throat and nozzle tip 1803 may be formed within a nozzle tip insert 1802b having a thermal conductivity of substantially 100 w/M-K or higher as well as a Rockwell C hardness substantially C60 or higher or Knoop/Vickers hardness substantially 700 or higher (for example tungsten carbide and other sintered carbines carbides, qualifying nitrides, or similarly heat conductive, hard materials).

As shown in FIGS. 16-20, for any of these configurations, certain arrangements of insert may wear even more slowly. An exemplary insert 1802c is a tapered insert having a nozzle tip of a first diameter widening to a larger second diameter so that the nozzle tip 1803 wears at a lower rate as material is worn away, and optionally, includes a cavity behind the nozzle throat of larger internal diameter than the nozzle throat diameter, and/or further optionally including a chamfer leading from the larger cavity diameter to the smaller nozzle throat diameter, and/or further optionally is held within the nozzle body 1802a by one of a crimp or a braze.

For any of these configurations, other arrangements may similarly resist wear even more, or be particularly suited to either an extrusion or a continuous fiber deposition path. For example, a cutter 8A may be used with continuous fiber filament 2. The cutter 8A may be arranged along a material supply path from the supply of material to the nozzle tip 726, and in some embodiments the cutter 8A positioned following the drive wheels 40, 42 for advancing the continuous fiber reinforced material. The cutter 8A may resist wear from an abrasive fiber material if it includes a blade having a Rockwell C hardness substantially C60 or higher or Knoop/Vickers hardness substantially 700 or higher (for example hardened and/or coated tool steel A-2, D-2, or harder tool steels, tungsten carbide, or similarly hard materials), especially in the case where the cutter 8a may make a plurality of cuts per printed layer.

In another example, for any of these configurations, guide tubes or Bowden tubes may guide composite extrusion filament 18a or continuous fiber reinforced filament 2 to a print head. In this case, tight curves (such as 5 inches radius or lower) may encounter situations in which the filament may consistently rub against the same portion of interior wall of the tube(s). In such a case, at least one non-polymer curved guide tube (e.g., of a material having Rockwell C hardness substantially C25 or higher or Knoop/Vickers hardness substantially 250 or higher) arranged along the material supply path may resist wear of the guide tube system, the non-polymer curved guide tube having at least one curved or curvable section, which optionally may be formed in one or more pieces from metal such as aluminum or steel (e.g., of a material having Rockwell C hardness substantially C25 or higher or Knoop/Vickers hardness substantially 250 or higher).

In another example, for any of these configurations, drive wheels 40, 42 or 40a, 42a may also be constructed to resist wear. In this case, at least one drive wheel 40, 40a, 42 or 42a for advancing the continuous fiber reinforced filament material (or in alternative cases, advancing the extrusion material) may be formed from a material having a Rockwell C hardness substantially C25 or higher or Knoop/Vickers hardness substantially 250 or higher (for example some stainless steels). The rate of wear of a rotating drive system may not be as high as the rate of wear for a sliding contact part of the system, and so the material of the wheels need not be as hard as that of a nozzle throat or tip or a cutter. In this case, the driving capability/force may be improved if the drive wheel for advancing the material is roughened, textured, hobbed, or stepped, and the wear resistance of the driving system may be improved if both of the two opposing wheels, 40, 42, one drive and one idle, are of the hard, e.g., Rockwell C25 or higher, material (e.g., including in the case when one opposing wheel is roughened, textured, hobbed, or stepped and the other is substantially smooth).

As described herein, various hardness scales are used, substantially with reference to the below chart. The values in the chart are approximate, for example at about +/−10% between Vickers 200-500. Where two or more hardness substantially scales are indicated in the description or claims for a single component, the limitation is a non-exclusive alternative (e.g., "Rockwell C60 or Knoop/Vickers hardness substantially 700" means a "a hardness substantially of 60 on the Rockwell C scale or a hardness substantially of approximately 700 on the Knoop scale or a hardness substantially of 700 on the Vickers scale). The use of Rockwell C scale vs. Rockwell B or other scale does not indicate any preference for metallurgical or other process, annealed or not annealed, unless otherwise indicated, and any commercial, SAE, ANSI, ISO, ASTM or other recognized conversion table or formula for converting one hardness scale to another (among, but not limited to, Rockwell, Knoop, Vickers, Mohs, etc.) may be used.

FIGS. 16-20 depict schematic representations of components of the printer 1000 print head 1800, 199, etc. structures that may be hardened in a composite printing system, including examples of printing with polymer extrusion, composite extrusion with chopped or other filler 18b, fiber deposition with continuous fiber 6a, and fiber deposition with continuous fiber 6a where the matrix includes chopped or other filler 6b. As may be seen in the chart above, effectively resisting the hardest fillers such as glass fiber at Mohs 5-7, exceeding the hardness of many tool steels, may benefit from a high hardness material such as tungsten carbide (especially, as noted herein, where the thermal conductivity of the material is also very good).

Figure 16:
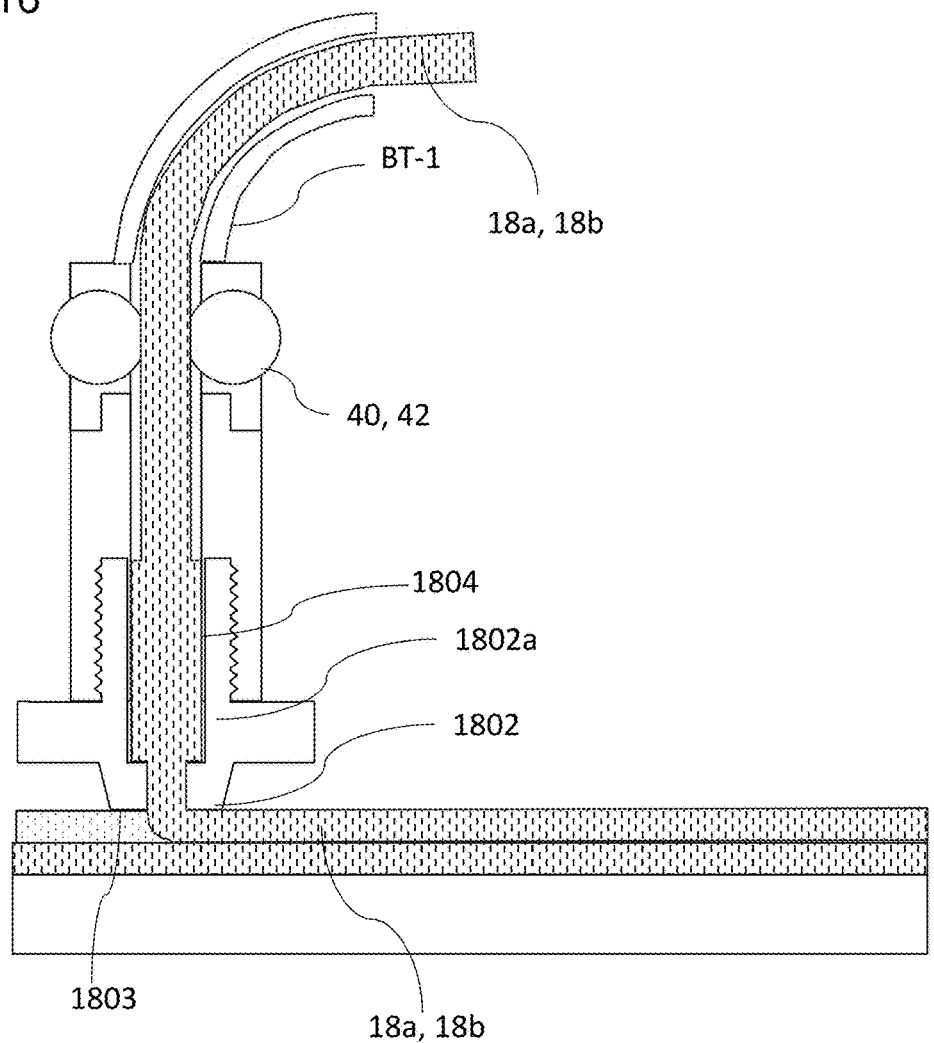
FIGS. 16-19 depict schematic representations of components of a 3D printer's print head that may be hardened in a composite printing system to resist wear from material flow through the nozzle as well as rubbing of an already deposited composite part on the nozzle.

As shown in FIGS. 16 (and 1B), a polymer filament guide tube or Bowden tube BT-1 will tend to wear internally in the filament extrusion system because an abrasive filament will continually rub against the guiding inner surfaces. For tubes BT-1 that are used to connect a filament supply with a print head moving in 3 or more degrees of freedom, the most wear will occur on those curves that have more frequent contact in different positions of the print head 1800 and different bend shapes of the Bowden tube BT-1. The material of the guide or Bowden tube BT-1 should or may have a hardness defined relative to the filler of the abrasive filament. Similarly a guide tube BT-2 for a continuous composite filament may tend to wear when a matrix of the filament includes chopped and/or abrasive filler 6b.

A filament drive wheel, cog, or hob 40, 42 or 40a, 42a will tend to wear internally in the filament extrusion system (whether "direct drive" with no Bowden tube, or where separated from the print head by a Bowden tube BT-1) because a certain amount of slip will occur between a round drive element 40, 42 or 40a, 42a and an abrasive filament 18a. The surface of the drive wheel, cog, or hub 40, 42 or 40a, 42a should have a hardness defined relative to the filler.

A melt chamber or 1804 heat break need not, in most cases, have a high hardness relative to a filler of an abrasive filament.

An extrusion nozzle 1802 will tend to wear internally to the filament extrusion system in the nozzle throat because the linear velocity of the abrasive extrudate 18a, including chopped or other filler 18b, is high in the throat. The nozzle 1802 throat should be made of a material having a hardness defined relative to that of the filler, reinforcement, or fiber 18b of a composite extrudate. An extrusion nozzle 1802 will tend to wear externally to the filament extrusion system at the nozzle tip 1803 because the tip 1803 will be abraded by adjacent, previously deposited abrasive filament in the same layer, during printing and during non-printing traverses. Similarly, a conduit nozzle 708 may tend to wear externally at the ironing lip or tip 726 as abraded by previous abrasive depositions. A tip 1803 of an extrusion nozzle 1802 may wear faster than a conduit nozzle 708 ironing lip 726 because of lower cross sectional area in contact with the previous deposition.

Figure 17:
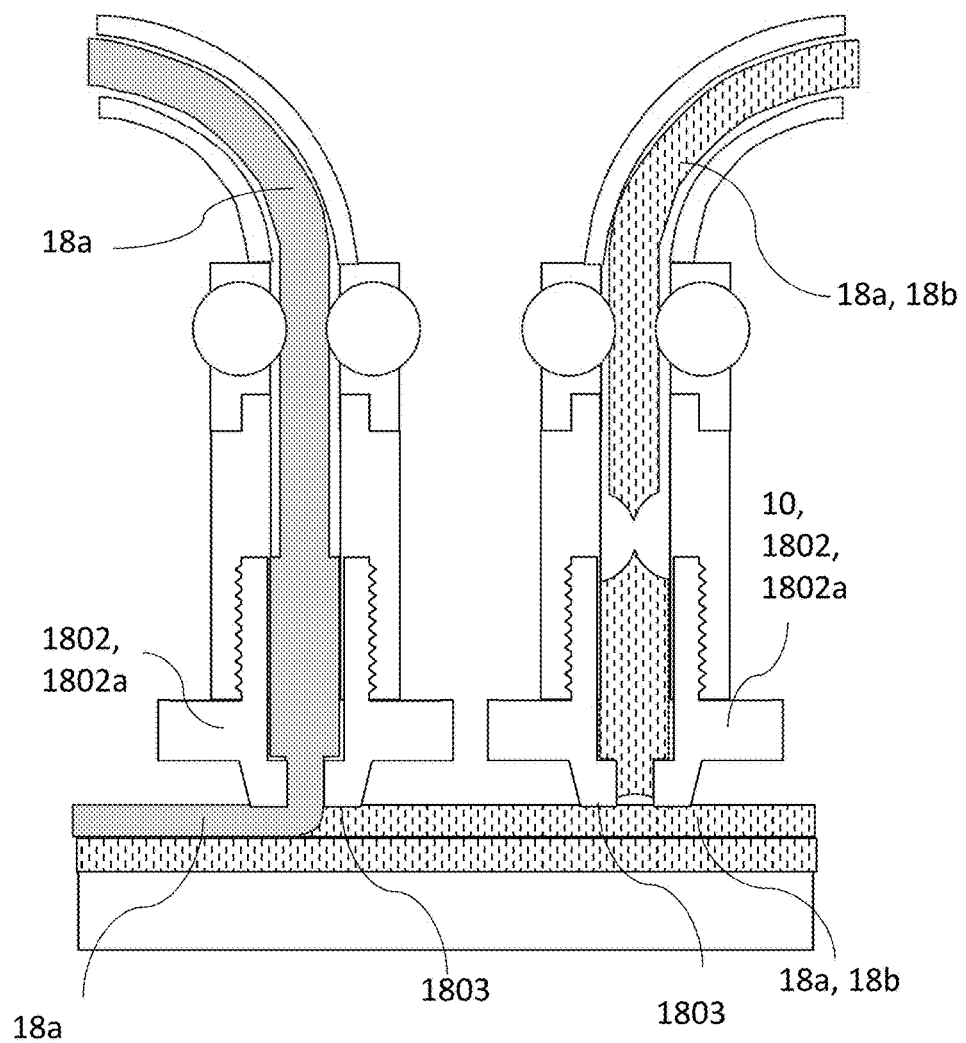

As shown in FIG. 17, in a system with two nozzles, in which at least one nozzle 18, 10, 1802, or 708 applies an abrasive material 18a including a filler 18b, but a remaining nozzle deposits a material 18a without an abrasive filler, even the non-abrasive nozzle 1802 tend to wear at the tip 1803, because the tip 1803 will be abraded by adjacent previously deposited abrasive material 18b (or 6a, or 6b) in the same layer, during printing and during non-printing traverses. If the non-abrasive material 18b (or 6a, or 6b) may always be printed first within a layer, then the non-abrasive nozzle 1802 may be lifted to avoid wear. However, if the non-abrasive material 18b (or 6a, or 6b) is printed second within a layer, both or all nozzles 18, 10, 1802, or 708 should or may have a hardness defined relative to the filler of the abrasive material 18b (or 6a, or 6b).

Figure 18:
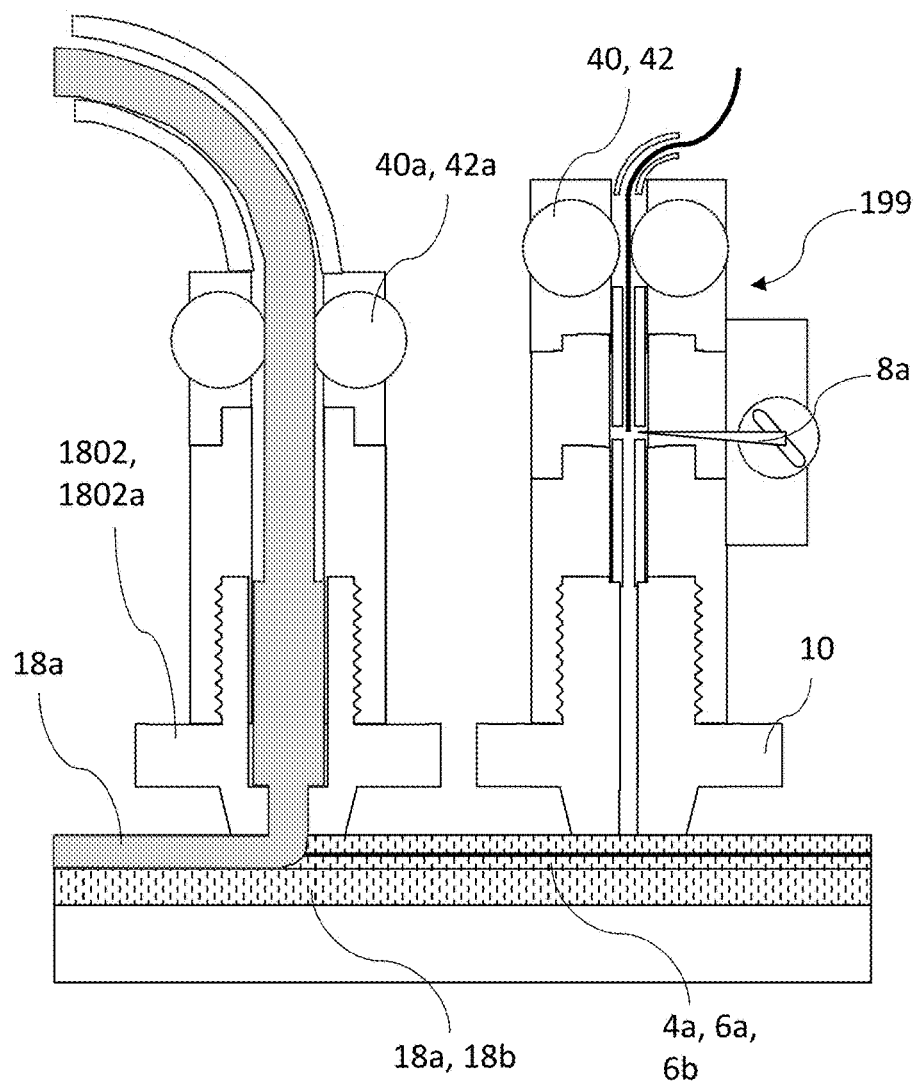

As shown in FIG. 18, even where the fill material 18a is not abrasive, the tip 1803 or end face of the extrusion nozzle 1802 may be worn by previously deposited continuous fiber 6a (and/or filler 6b). Drive wheels 40, 42 for advancing continuous fiber prepreg 2 may be hardened (e.g., steel) to resist wear from the continuous fiber material 6a (and/or filler 6b). The cutter 8A for severing continuous fiber reinforced material 2 may be hardened (e.g. tungsten carbide). Previously deposited continuous fiber swaths 2c, 2d may be abrasive to both extrusion and conduit nozzle tips 1803, 726.

Figure 19:
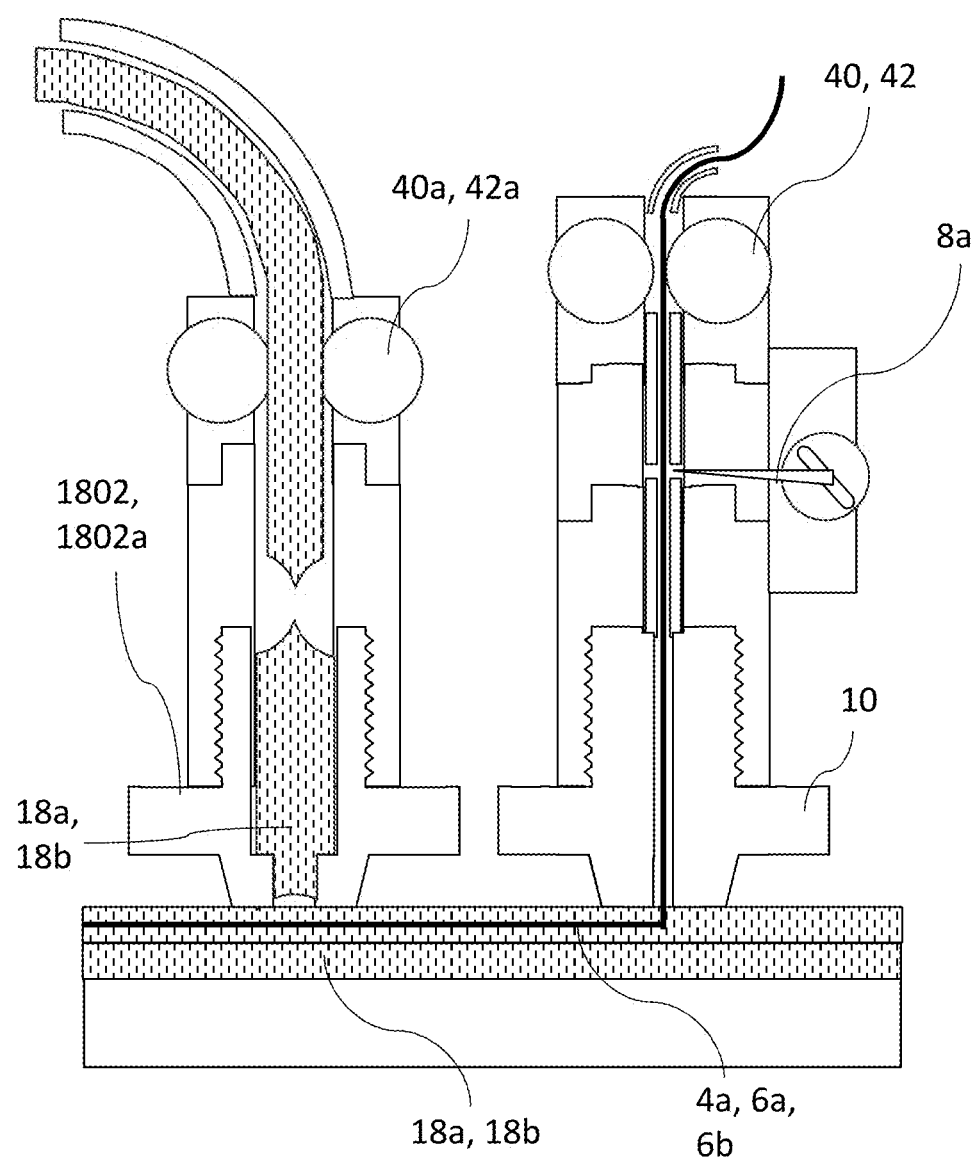

As shown in FIG. 19, previously deposited composite extruded material 18a, 18b may be abrasive to both extrusion and conduit nozzle tips 1803, 726, and the nozzle throat may be worn by the filler material 18b. Drive wheels 40, 42 for advancing continuous fiber prepreg 2, 2a may be hardened (e.g., steel) to resist wear from the continuous fiber material 2, 2a. The cutter 8A for severing continuous fiber reinforced material 2, 2a may be hardened (e.g. tungsten carbide). Previously deposited continuous fiber swaths 2c, 2d may be abrasive to both extrusion and conduit nozzle tips 1803, 726.

Figures 20A, 20B:
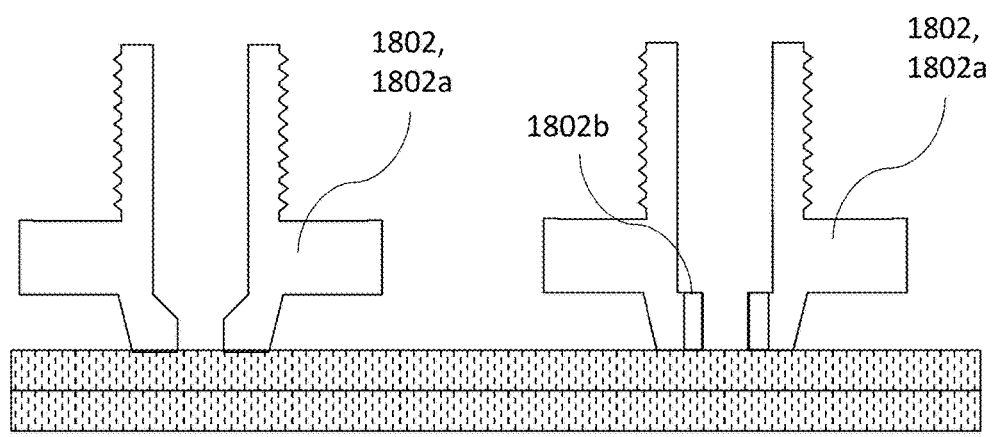
FIGS. 20A-20E depict schematic representations of components of a 3D printer's print head that may be hardened in a composite printing system to resist wear from material flow through the nozzle as well as rubbing of an already deposited composite part on the nozzle.

As shown in FIGS. 20A-20D, nozzles 1802 and nozzle tips 1803 may be hardened in the throat and/or tip a variety of ways. As shown in FIG. 20A, the entire nozzle 1802 may be made of a hard or hardened material that has sufficient conductivity, such as beryllium copper alloy, or tungsten carbide. In this case, the selection of materials is narrow because hardness and high thermal conductivity are only sometimes found together in one material. In addition, precision machining operations (such as thread cutting) are difficult with very hard materials, especially for small parts. As shown in FIG. 20B, the nozzle body 1802a of the nozzle may be made of a high thermal conductivity, readily machined material, and a throat insert 1802b of high hardness may be tightly or interference fitted or bonded or otherwise integrated with the high thermal conductivity body 1802a. In this case, the selection of materials for the throat insert 1802b is wider than would be the case for a unitary nozzle, because there is no need to cut threads in the throat insert 1802b—it must be hard, but because of its low thermal mass in comparison to the nozzle body 1802a, it may have a lower thermal conductivity than the nozzle body 1802a.

Figure 20C:
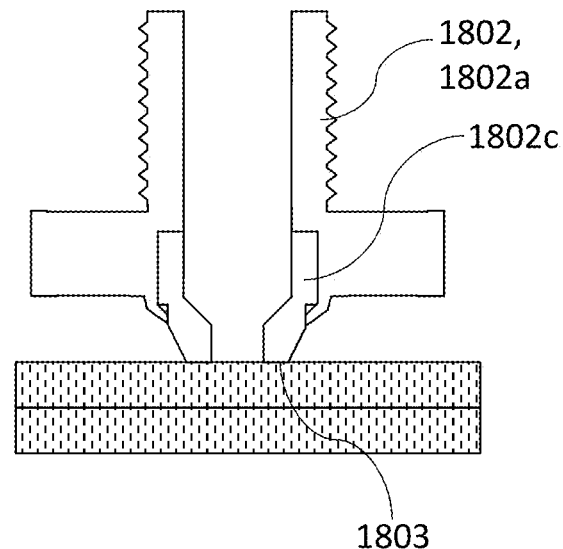

As shown in FIG. 20C, the nozzle body 1802a may be made of a high thermal conductivity, readily machined material, and a throat and full tip insert 1802c of high hardness may be fitted, bonded, crimped, or otherwise integrated with the high thermal conductivity body 1802a. Similar to the throat insert 1802b, the selection of materials is wider because of the low thermal mass of the insert 1802c in comparison to the nozzle body 1802a. In addition, the throat with full tip insert 1802c resists both internal and external wear. The nozzle throat/tip insert 1802c may be constructed with two internal diameters, large then small, so that back pressure to push plastic through nozzle throat is reduced. The larger internal diameter and length permits a larger holding surface for machining and retaining. A ring shape may be preferably only so tall as the throat length. In addition, or in the alternative, the outer external rim or outer edge may be made with a small radius outer edge (not sharp; e.g., larger than 0.01 mm radius), which avoids damaging previously printed materials, especially continuous fiber 6a. A tip insert 1802b, 1802c may seal the insert vs. back pressure using a crimp or braze forcing the top of the insert 1802b, 1802c against the nozzle body 1802a.

Figure 20D:
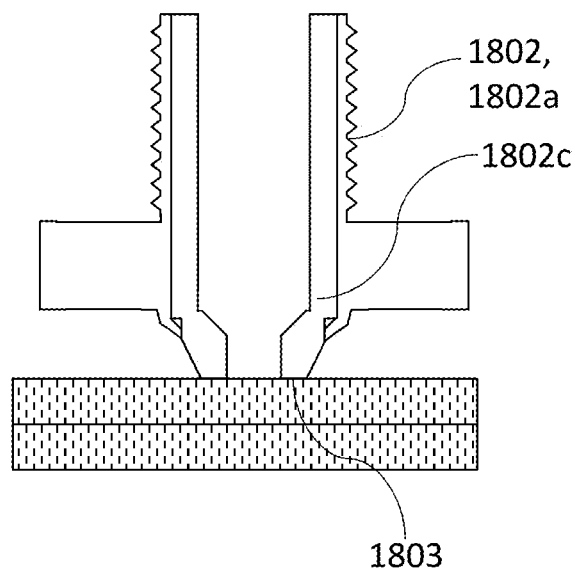

In contrast, as shown in FIG. 20D, in an alternative insert, the majority of the thermal mass of the nozzle body 1802a is made of a relatively high thermal conductivity material (e.g., brass, copper) while the insert 1802c is a through sleeve of a material hard both in the nozzle throat and tip. In this case, the seal formed by the crimp does not retain the pressurized fill material, but instead retains the insert so that upward force may be applied by tightening the nozzle body, for example, sealing the upper part of the nozzle insert as a butt or other end joint, to a heat break or other upstream channel member.

Figure 20E:
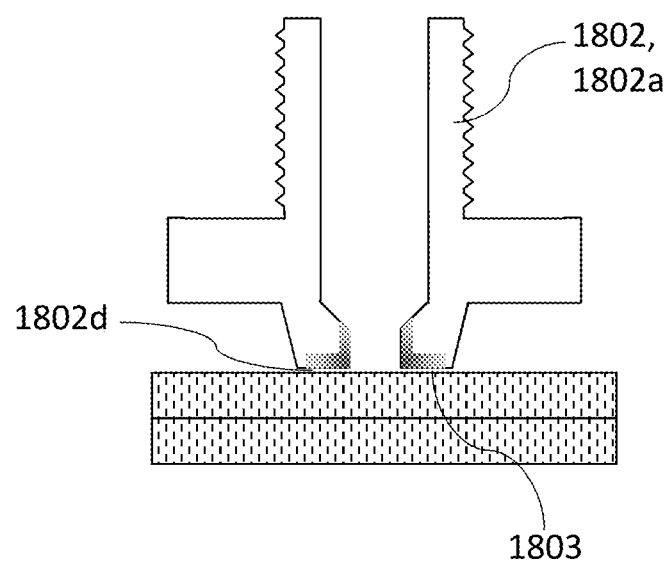

As shown in FIG. 20E, the entire nozzle 1802 may be alternatively made of a surface hardenable material that has sufficient thermal conductivity, and a hardening treatment or coating 1802d applied to the nozzle tip 1803 and/or throat. In this case, the selection of materials is narrow because coating and hardening operations are difficult in very small sizes (e.g., nozzle throats may be 0.15-1.00, e.g., 0.25 mm in diameter). In addition, few hardening or coating operations are capable of reaching a hardness sufficient to resist very abrasive materials. Possible operations include chrome plating, electroless-nickel plating or low temperature physical vapor deposition (PVD).

Section headings used herein are dependent upon following content which they describe, and can only broaden the content described.

Terminology

A "composite swath" or "composite swath" may refer to a deposited fiber-reinforced composite filament, having been compressed, consolidated and widened by ironing during deposition. Extending within the composite swath are a plurality of individual fibers, from 50-5000, preferably 100-2000, within a matrix material.

A "multi-swath track" may refer to a set of parallel swaths that generally follow parallel paths, although individual swaths may deviate to avoid obstacles or achieve reinforcement goals.

A "fold" may refer to a composite swath which folds, twists, or bunches over itself along a curved segment of composite swath (such as a corner). A "fold" is not limited to sheet-like or tape-like folds, but includes path changes in which different fibers within the composite swath may cleanly switch sides of a swath, but may also cross, twist, or bunch along the curved or angled segment (such as a corner).

A "continuous fiber column" generally means a continuous fiber element (two, tape, prepreg, or strands) extending between two or more 3d printed layers (orthogonal, at any angle, transverse, or curved), with at least part of the continuous fiber strands having a Z direction component bridging two or more layers.

"Fill material" includes material that may be deposited in substantially homogenous form as extrudate, fluid, or powder material, and is solidified, e.g., by hardening, crystallizing, transition to glass, or curing, as opposed to the core reinforced filament discussed herein that is deposited as embedded and fused composite swaths, which is deposited in a highly anisotropic, continuous form. "Substantially homogenous" includes powders, fluids, blends, dispersions, colloids, suspensions and mixtures, as well as chopped fiber reinforced materials. In any case herein where "fill material" may be replaced with some soluble material or form a soluble preform, this disclosure so contemplates. In such a case, as discussed herein, once the soluble material is removed, a continuous fiber reinforcement preform remains formed from continuous fiber deposition patterns. It should be noted that a coating, wall, shell, roof, ceiling or other buffer of non-soluble fill material may remain or be deposited even when the fill material discussed is partially or largely substituted with soluble material.

"Honeycomb" includes any regular or repeatable tessellation for sparse fill of an area (and thereby of a volume as layers are stacked), including three-sided, six-sided, four-sided, complementary shape (e.g., hexagons combined with triangles) interlocking shape, or cellular.

A "Negative contour" and "hole" are used herein interchangeably. However, either word may also mean an embedded contour (e.g., an embedded material or object) or a moldover contour (e.g., a second object with surfaces intruding into the layer).

"Outwardly spiraling" or "outwardly offsetting" meaning includes that a progressive tracing, outlining, or encircling is determined with reference to an innermost, generally negative or reference contour, not necessarily that the composite swath mush begin next to that contour and be built toward an outer perimeter. Once the toolpath is determined, it may be laid in either direction. Similarly, "inwardly spiraling" or "inwardly offsetting" means that the progressive tracing is determined with reference to an outer, generally positive contour.

"3D printer" meaning includes discrete printers and/or toolhead accessories to manufacturing machinery which carry out an additive manufacturing sub-process within a larger process. A 3D printer is controlled by a motion controller 20 which interprets dedicated G-code (toolpath instructions) and drives various actuators of the 3D printer in accordance with the G-code.

"Extrusion" may mean a process in which a stock material is pressed through a die to take on a specific shape of a lower cross-sectional area than the stock material. Fused Filament Fabrication ("FFF"), sometimes called Fused Deposition Manufacturing ("FDM"), is an extrusion process. Similarly, "extrusion nozzle" shall mean a device designed to control the direction or characteristics of an extrusion fluid flow, especially to increase velocity and/or restrict cross-sectional area, as the fluid flow exits (or enters) an enclosed chamber.

A "conduit nozzle" may mean a terminal printing head, in which unlike a FFF nozzle, there is no significant back pressure, or additional velocity created in the printing material, and the cross sectional area of the printing material, including the matrix and the embedded fiber(s), remains substantially similar throughout the process (even as deposited in bonded ranks to the part).

"Deposition head" may include extrusion nozzles, conduit nozzles, and/or hybrid nozzles. "Solidifying head" may include the same, as well as laser melting and solidifying, laser curing, energy curing. A material need not be liquefied to be solidified, it may be cured, sintered, or the like.

"Filament" generally may refer to the entire cross-sectional area of an (e.g., spooled) build material, and "strand" shall mean individual fibers that are, for example, embedded in a matrix, together forming an entire composite "filament".

"Alternating", with respect to reinforcement regions, generally means in any regular, random, or semi-random strategy, unless the pattern is described, specified, or required by circumstances, for distributing different formations within or among layers. E.g., simple alternation (ABABAB), repeating alternation (AABBAABB), pattern alternation (ABCD-ABCD), randomized repeating groups (ABCD-CBDA-CDAB), true random selection (ACBADBCABDCD), etc.

"Shell" and "layer" are used in many cases interchangeably, a "layer" being one or both of a subset of a "shell" (e.g., a layer is an 2.5D limited version of a shell, a lamina extending in any direction in 3D space) or superset of a "shell" (e.g., a shell is a layer wrapped around a 3D surface). Shells or layers may be nested (within each other) and/or parallel (offset from one another) or both. Shells or layers are deposited as 2.5D successive surfaces with 3 degrees of freedom (which may be Cartesian, polar, or expressed "delta"); and as 3D successive surfaces with 4-6 or more degrees of freedom. Layer adjacency may be designated using descriptive notations "$LA_1$", "$LA_2$" or "$LA_n$, $LA_{n+1}$", etc., without necessarily specifying unique or non-unique layers. "$LA_1$" may indicate the view shows a single layer, "$LA_2$" indicating a second layer, and "$LA_1$, $LA_2$" indicating two layers superimposed or with contents of each layer visible. For example, in a top down view, either of "$LA_1$, $LA_2$, $LA_3$" or "$LA_n$, $LA_{n+1}$, $LA_{n+2}$" may indicate that three layers or shells are shown superimposed. "$LA_1$, $LA_2$ ... $LA_m$" may indicate an arbitrary number of adjacent layers (e.g., m may be 2, 10, 100, 1000, or 10000 layers).

Some representative Ultimate/Tensile Strength and Tensile/Young's Modulus values for reinforcing fibers, core reinforced fiber matrix materials, fill materials, and comparative materials are in the following Table.

Representative Ultimate/Tensile Strength and Tensile/Young's Modulus Values

| MATERIAL | Ultimate Strength MPa | Young/Tensile Modulus GPa |
|---|---|---|
| reinforcing strands—UHMWPE—Dyneema, Spectra | 2300-3500 | 0.7 |
| reinforcing strands—Aramid or Aramid Fiber—Kevlar, Nomex, Twaron | 2000-2500 | 70.5-112.4, 130-179 |
| reinforcing strands—Carbon Fiber | 4000-4500 | 300-400 |

-continued

| MATERIAL | Ultimate Strength MPa | Young/Tensile Modulus GPa |
|---|---|---|
| reinforcing strands—Glass Fiber (E, R, S) | 3500-4800 | 70-90 |
| reinforcing strands—Basalt fiber | 1300-1500 | 90-110 |
| Carbon Fiber reinforced plastic (70/30 fiber/matrix, unidirectional, along grain) | 1600 | 170-200 |
| Glass-reinforced plastic (70/30 by weight fiber/matrix, unidirectional, along grain) | 900 | 40-50 |
| Steel & alloys ASTM A36 | 350-450 | 200 |
| Aluminum & alloys | 250-500 | 65-80 |
| matrix, fill material, solidifiable material—Epoxy | 12-30 | 3.5 |
| matrix, fill material, solidifiable material—Nylon | 70-90 | 2-4 |

What is claimed is:

1. A three dimensional printer for printing a part with a composite material including a thermoplastic matrix and a chopped fiber filler having a hardness more than two times the hardness of the thermoplastic matrix, comprising:
   a drive wheel for advancing the composite material;
   a heated nozzle through which the composite material is deposited, the heated nozzle including:
      a nozzle body through which heat is applied to the composite material, the nozzle body being formed from a material having a thermal conductivity of at least substantially 35 w/M-K;
      an interior nozzle throat within the nozzle body through which the composite material exits, the interior nozzle throat formed from a material having a Rockwell C hardness of at least substantially C50 and configured to resist abrasion from the chopped fiber filler of the composite material exiting the interior nozzle throat; and
      an exterior nozzle tip having an exterior surface formed from a material having a Rockwell C hardness of at least substantially C40 and configured to rub against a top surface of a previously deposited part and to resist abrasion from the chopped fiber filler in the composite material of the previously deposited part; and
   a cutter arranged along a composite material supply path from a supply of the composite material to the exterior nozzle tip, the cutter positioned following the drive wheel for advancing the material and including a blade having a Rockwell C hardness of at least substantially C60.

2. The three dimensional printer according to claim 1, wherein the nozzle body is formed from a material having a thermal conductivity of substantially 50 w/M-K or higher.

3. The three dimensional printer according to claim 1, wherein the nozzle throat is formed from a material having a Rockwell C hardness at least substantially C60.

4. The three dimensional printer according to claim 3, wherein the nozzle throat and nozzle tip each are formed from a material having a Rockwell C hardness at least substantially C60.

5. The three dimensional printer according to claim 1, wherein a portion of the nozzle body, the nozzle throat, and the nozzle tip is unitarily formed from a material having a thermal conductivity of at least substantially 60 w/M-K as well as Rockwell C hardness of at least substantially C60.

6. The three dimensional printer according to claim 1, wherein a portion of the nozzle body, the nozzle throat, and nozzle tip is unitarily formed from one of a sintered carbide and a sintered nitride.

7. The three dimensional printer according to claim 1, wherein a majority of the thermal mass of the nozzle body includes a material having a thermal conductivity of substantially 200 w/M-K or higher, and the nozzle throat and nozzle tip are formed within a nozzle tip insert having a thermal conductivity of at least substantially 100 w/M-K as well as at least a Rockwell C hardness of substantially C60.

8. The three dimensional printer according to claim 7, wherein the insert is a tapered insert having a nozzle tip with a surface area lower than a nozzle cross sectional area adjacent the tip, such that the nozzle tip increases in area and wears at a lower rate as material is worn away.

9. The three dimensional printer according to claim 8, wherein the nozzle body includes a cavity behind the nozzle throat of larger internal diameter than the nozzle throat diameter.

10. The three dimensional printer according to claim 9, wherein the nozzle body includes a chamfer leading from the larger cavity diameter to the smaller nozzle throat diameter.

11. The three dimensional printer according to claim 10, wherein a nozzle throat and nozzle tip are unitary in a nozzle insert held within the nozzle body by one of a crimp and a braze.

12. The three dimensional printer according to claim 1, further comprising at least one curved guide tube arranged along the material supply path, the curved guide tube having at least one curved or curvable section formed in one or more pieces from a material having a Rockwell C hardness at least substantially C25.

13. The three dimensional printer according to claim 1, further comprising at least one drive wheel for advancing the composite material, the at least one drive wheel having a drive surface including a material having a Rockwell C hardness of at least substantially C25.

14. The three dimensional printer according to claim 13, wherein the at least one drive wheel being at least one of roughened, textured, hobbed, and stepped.

15. The three dimensional printer according to claim 13, wherein the at least one drive wheel comprises one drive wheel opposing one idle wheel, in which one of the drive wheel and the idle wheel is at least one of roughened, textured, hobbed, and stepped and the remaining one of the drive wheel and the idle wheel is substantially smooth.

16. The three dimensional printer according to claim 13, wherein the at least one drive wheel comprises one drive wheel opposing one idle wheel, in which both opposing wheels are formed from a material having a Rockwell C hardness at least substantially C25.

17. The three dimensional printer according to claim 13, wherein the at least one drive wheel comprises one drive wheel opposing one idle wheel, and at least one of the drive wheel and idle wheel includes a relative or absolute encoder for measuring at least one of rotation speed and motor stall.

18. The three dimensional printer of claim 1, wherein a portion of the nozzle body, the nozzle throat, and the nozzle tip is unitarily formed.

19. The three dimensional printer of claim 1, wherein the heated nozzle is configured to increase velocity of the composite material as the composite material passes through the nozzle throat.

* * * * *